US006431475B1

(12) United States Patent
Williams

(10) Patent No.: US 6,431,475 B1
(45) Date of Patent: Aug. 13, 2002

(54) IRRIGATION SYSTEM

(76) Inventor: Christopher Guy Williams, 3135 E. 11th Ave., Spokane, WA (US) 99202

( * ) Notice: Subject to any disclaimer, the term of this patent is extended or adjusted under 35 U.S.C. 154(b) by 38 days.

(21) Appl. No.: 09/672,163

(22) Filed: Sep. 27, 2000

Related U.S. Application Data

(63) Continuation-in-part of application No. 09/383,851, filed on Aug. 26, 1999, now abandoned.

(51) Int. Cl.[7] .............................. B05B 3/00; A01G 25/09
(52) U.S. Cl. ........................ 239/750; 239/749; 239/740; 239/748
(58) Field of Search ................................. 239/740, 748, 239/749, 750

(56) References Cited

U.S. PATENT DOCUMENTS

| | | | | | |
|---|---|---|---|---|---|
| 2,750,228 A | * | 6/1956 | Engel | ......................... | 239/736 |
| 3,255,969 A | * | 6/1966 | Stafford | ...................... | 239/227 |
| 3,281,080 A | * | 10/1966 | Hogg | ......................... | 137/615 |
| 3,381,893 A | * | 5/1968 | Smith | ............................ | 239/1 |
| 3,444,941 A | * | 5/1969 | Purtell | ........................... | 239/1 |
| 3,463,175 A | * | 8/1969 | Rogers | .......................... | 239/1 |
| 4,036,436 A | * | 7/1977 | Standal | ...................... | 239/733 |
| 4,274,584 A | * | 6/1981 | Noble | ............................ | 239/1 |
| 4,295,607 A | * | 10/1981 | Noble | ............................ | 239/1 |
| 4,877,189 A | * | 10/1989 | Williams | | |
| 5,246,164 A | * | 9/1993 | McCann et al. | .............. | 239/11 |

* cited by examiner

Primary Examiner—Patrick Brinson

(57) ABSTRACT

A fully automated land irrigation system to irrigate regular and irregular shapes of land. The system includes an expanse of water delivery pipe moved laterally while irrigating adjacent to a stationary row of spaced access valves supplied by a water main. A swing arm is pivotally mounted to one end of the delivery pipe and a valve coupler is mounted to the opposite free swinging swing arm end. Valve connection is made and the delivery pipe irrigates while traveling to the next successive access valve. The coupler is then disconnected from the valve and the free swing arm end and coupler are ground pivoted to the next valve where connection is again made. Delivery pipe travel results in rotation of the swing arm about the valve connection. This rotation feature also enables the swing arm and the water delivery pipe to the pivoted about a valve as an anchor to a similar position on the opposite side of the water main. The invention includes a new apparatus for raising and lowering the swing arm end and coupler thus coupling and uncoupling to a valve. Also, vertical position measuring shortens the time spent coupling and uncoupling. A new coupler apparatus improves reliability and component life. A new delivery pipe navigator simplifies positioning of the delivery pipe relative to the row of access valves and provides geographic position information incorporated when selectively varying the amount of water being applied from along the delivery pipe length as the irrigator travels.

72 Claims, 34 Drawing Sheets

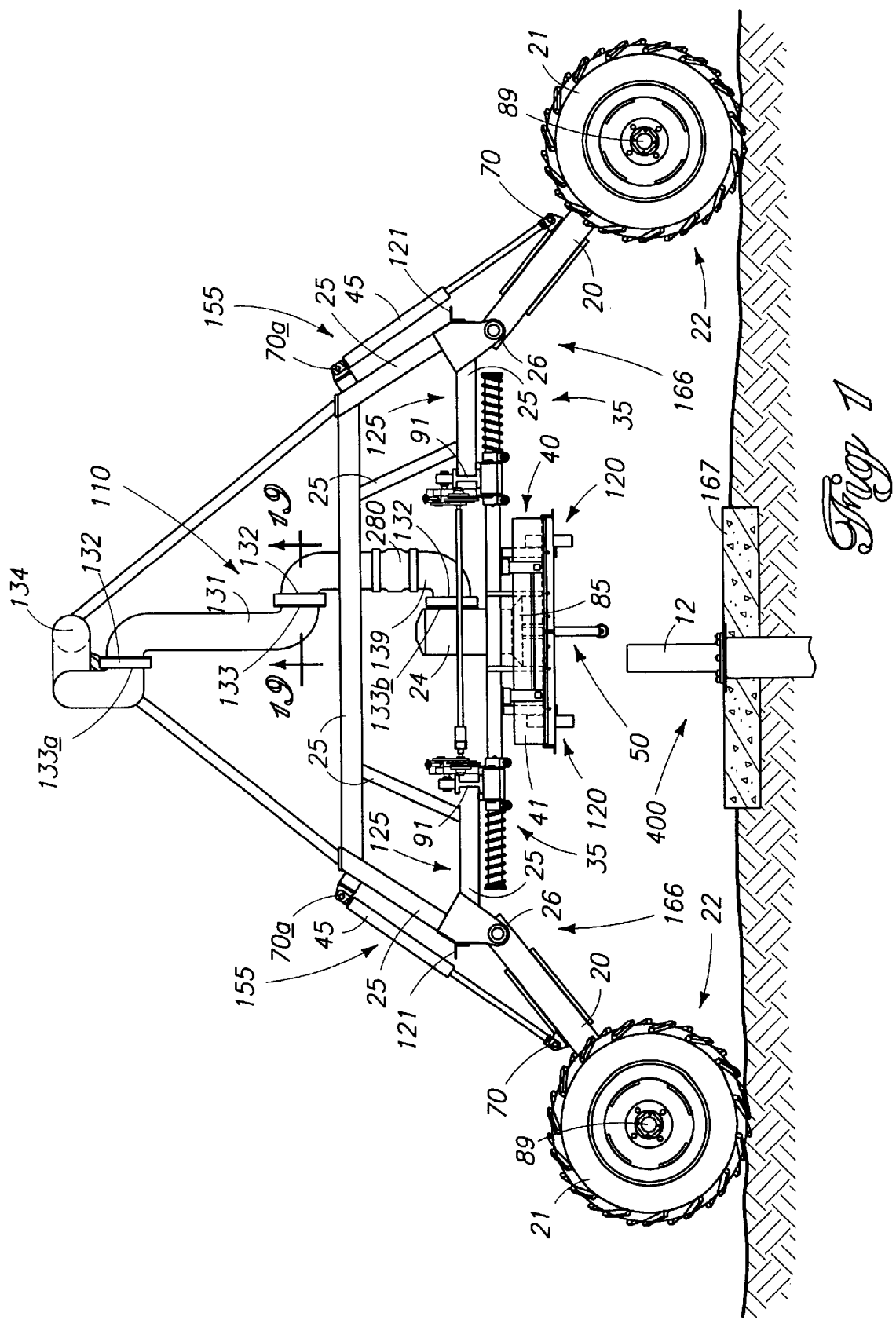

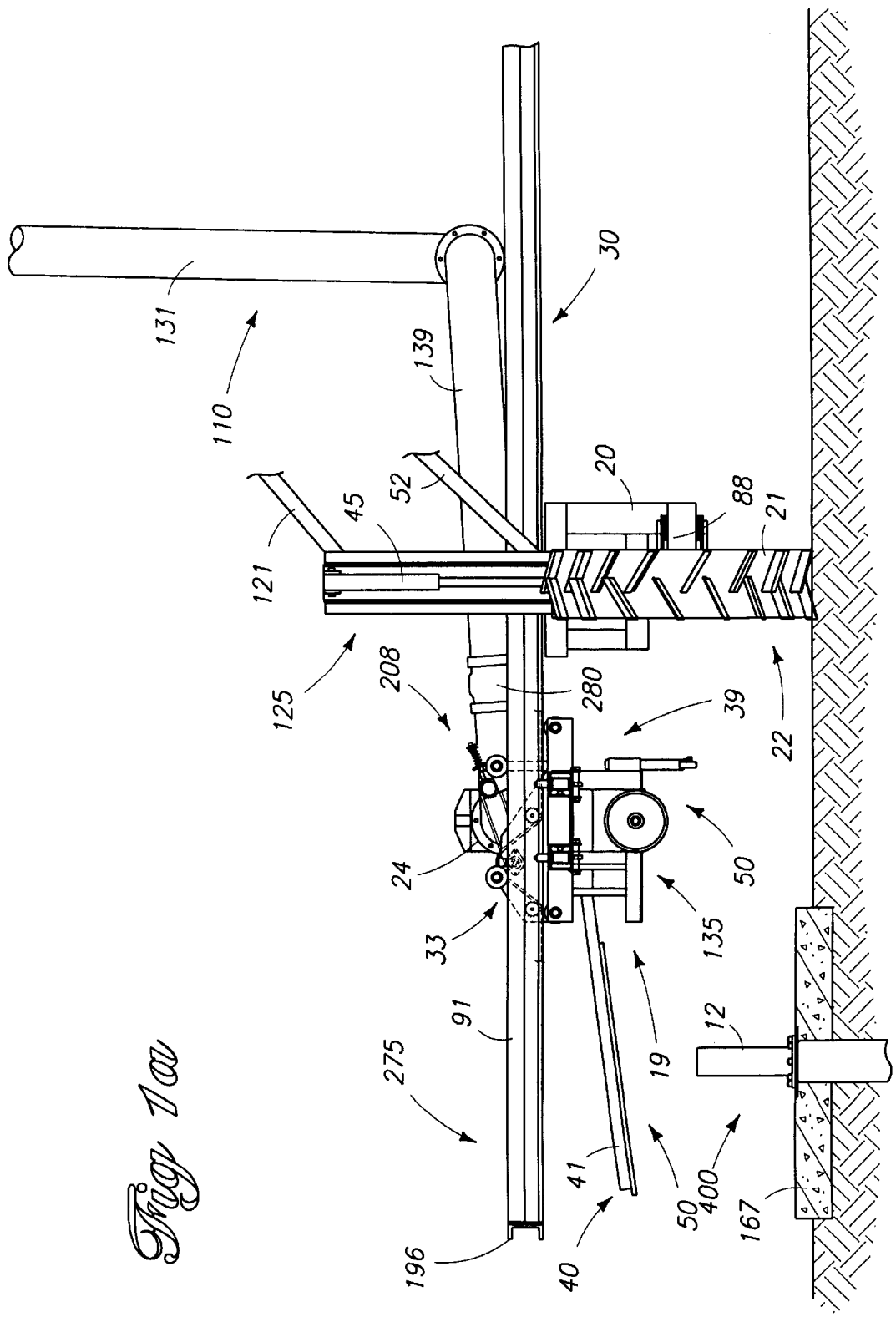

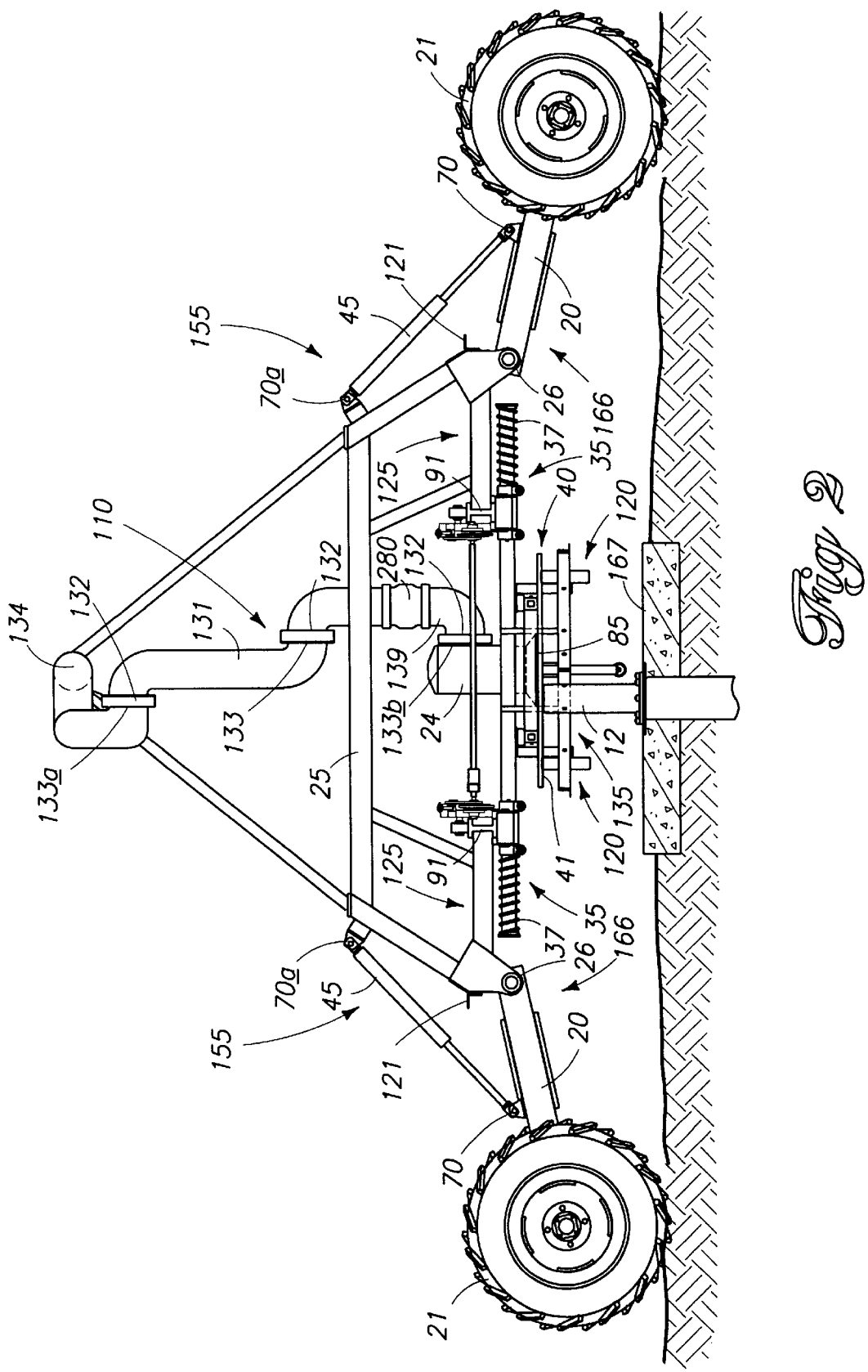

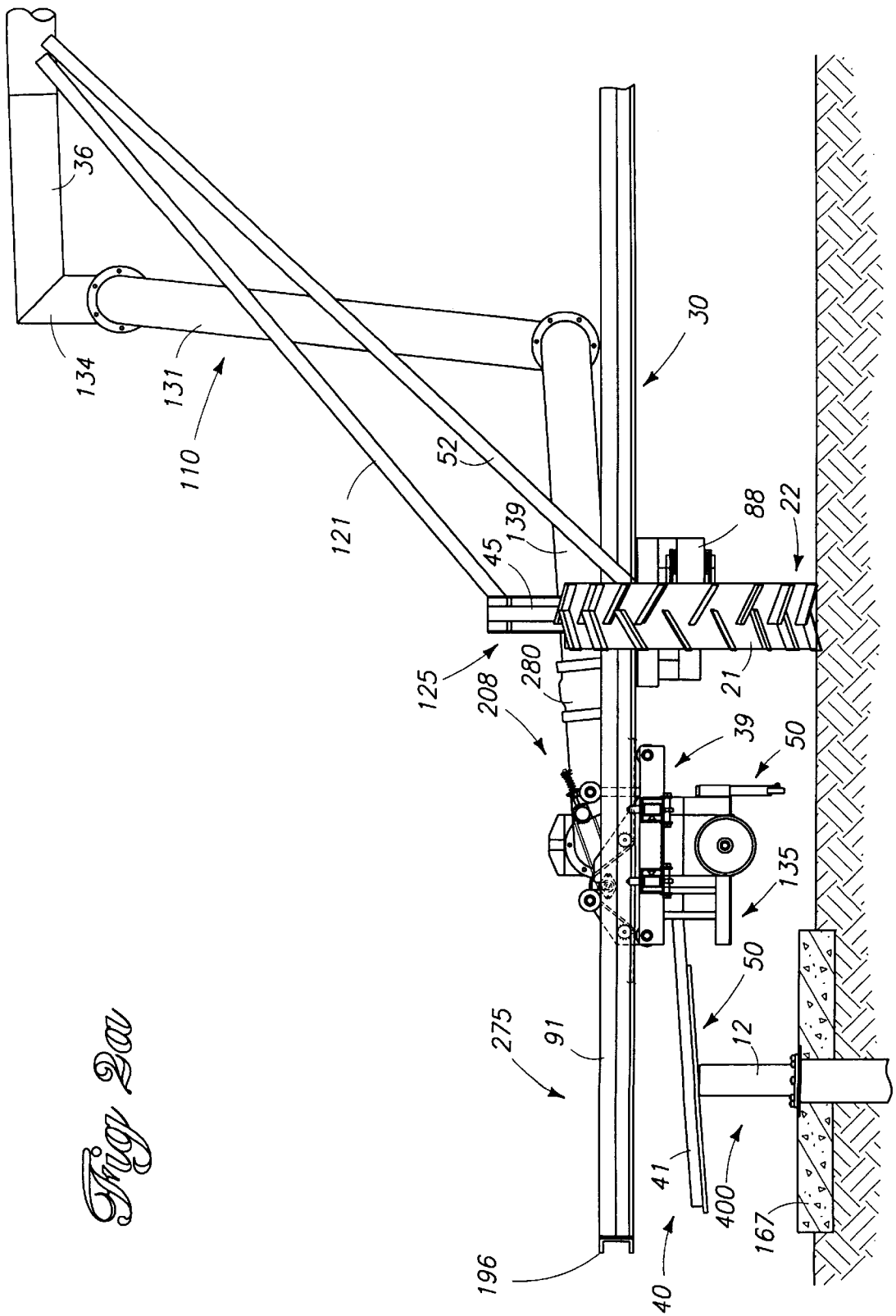

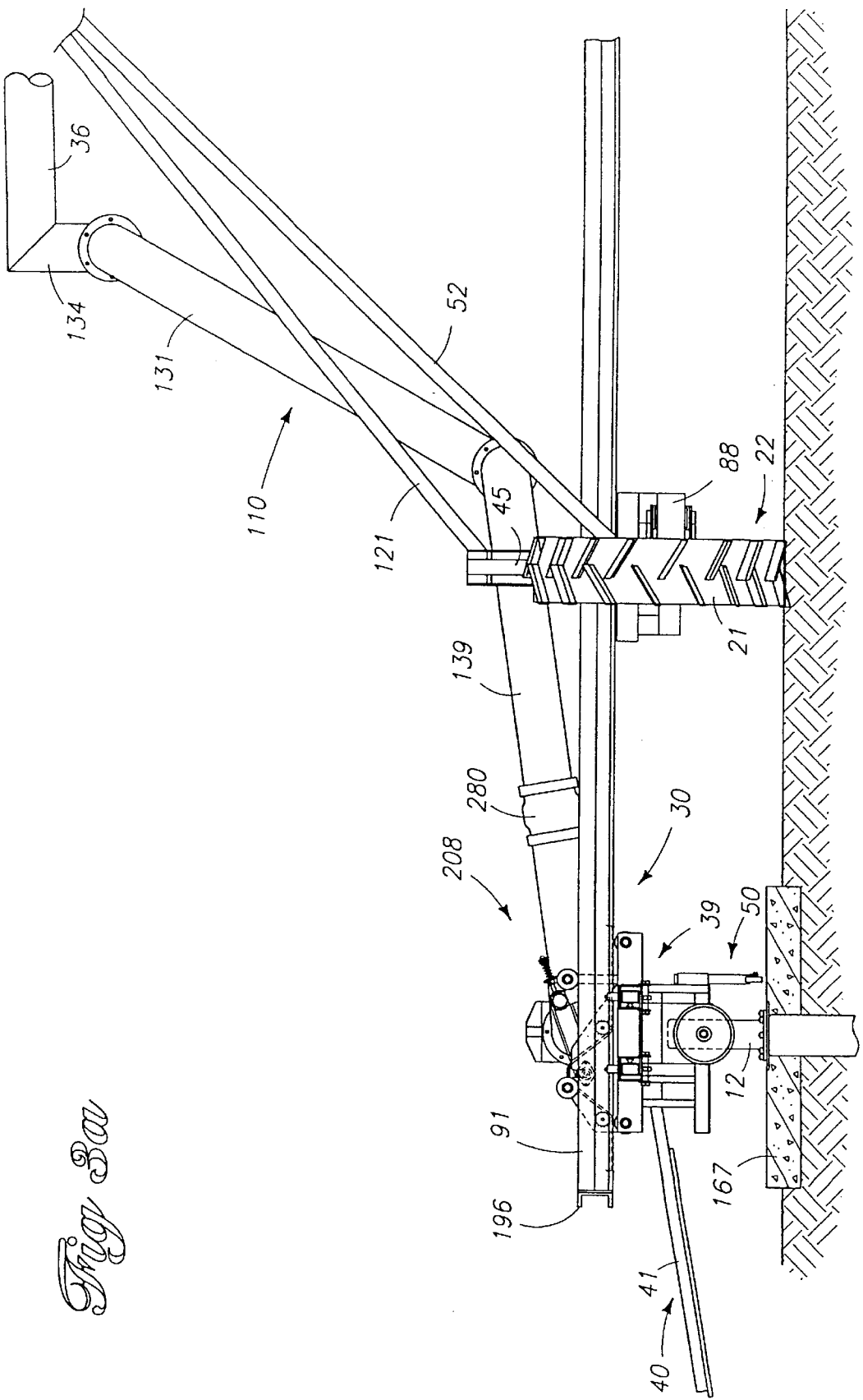

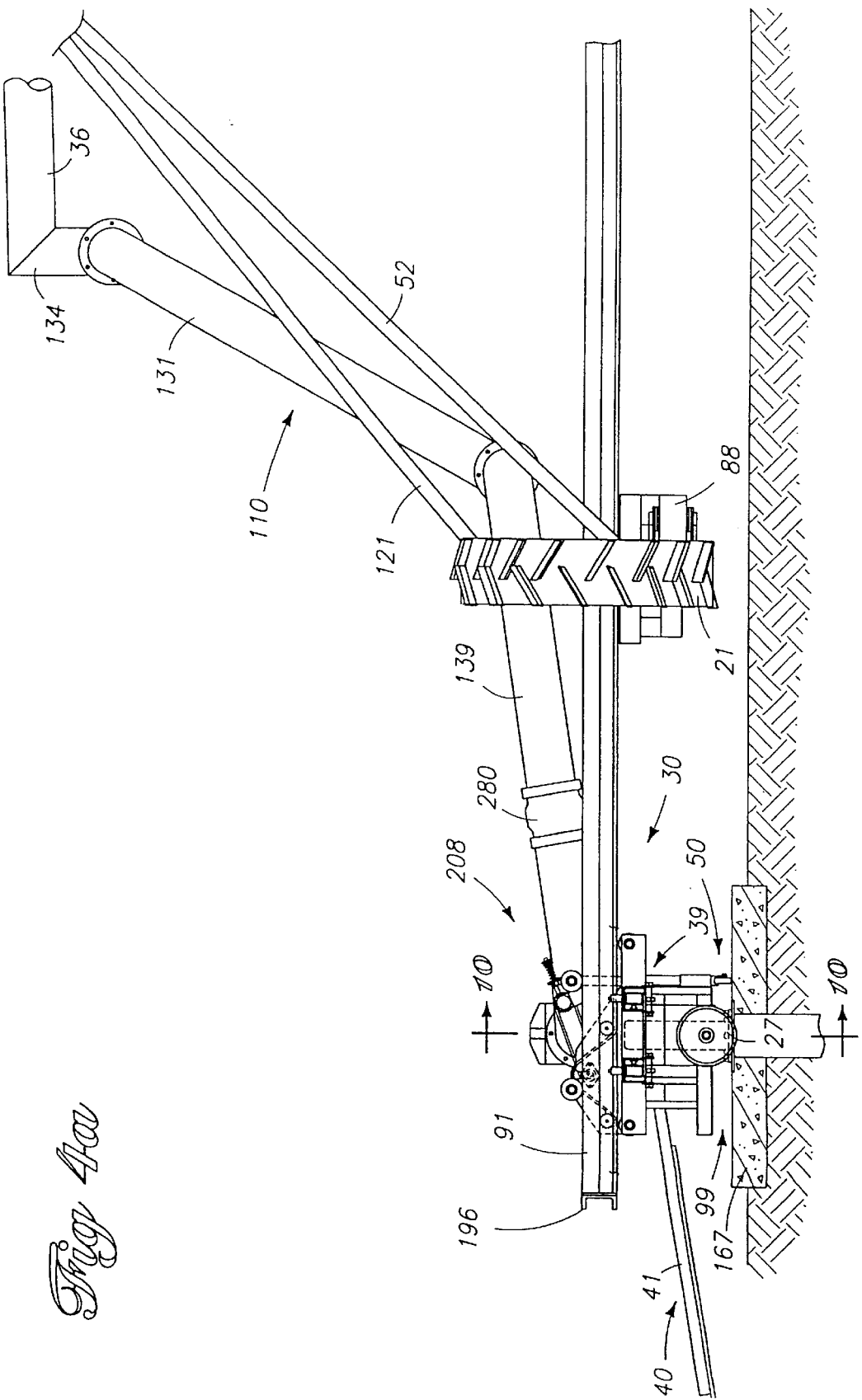

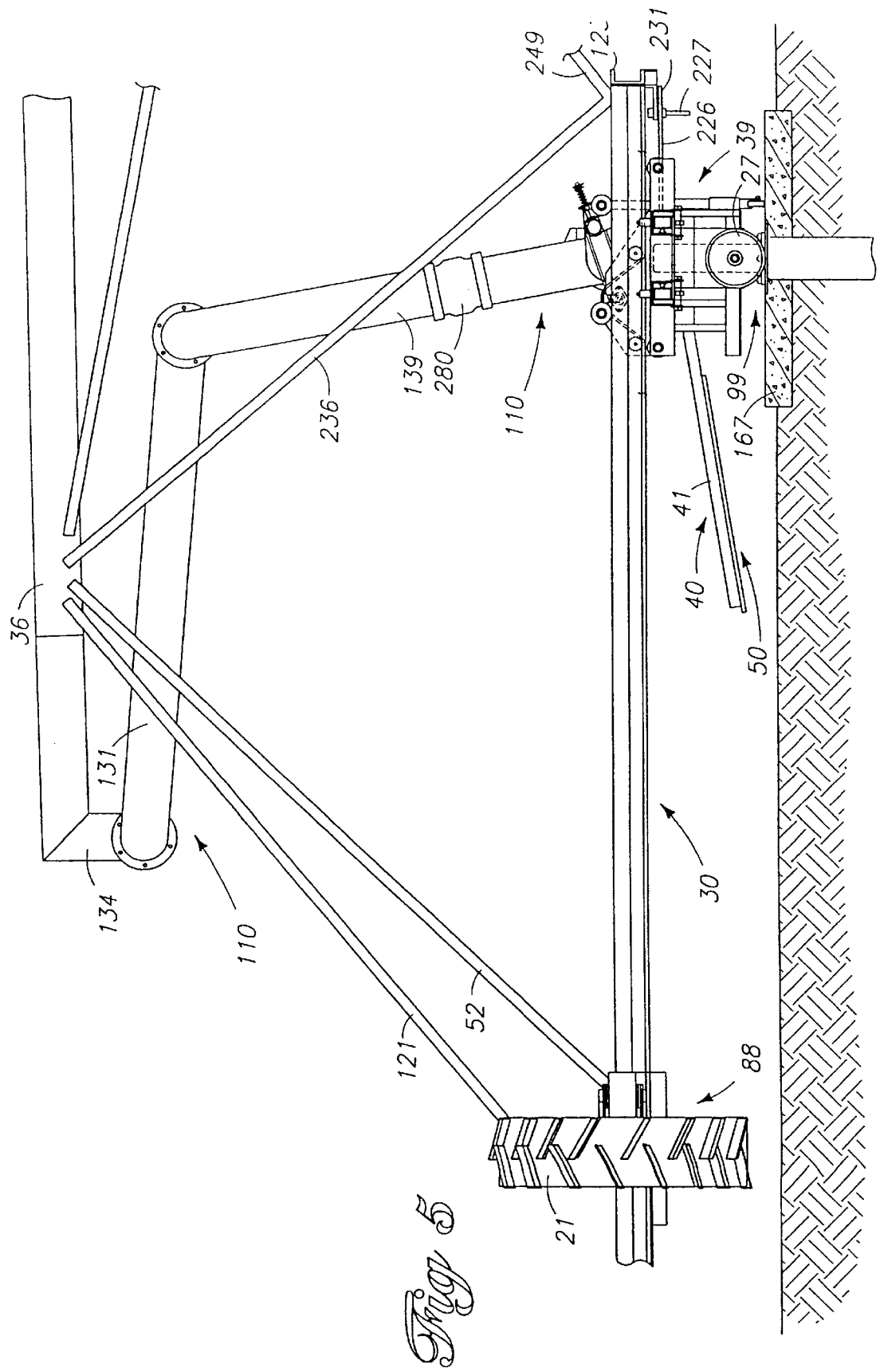

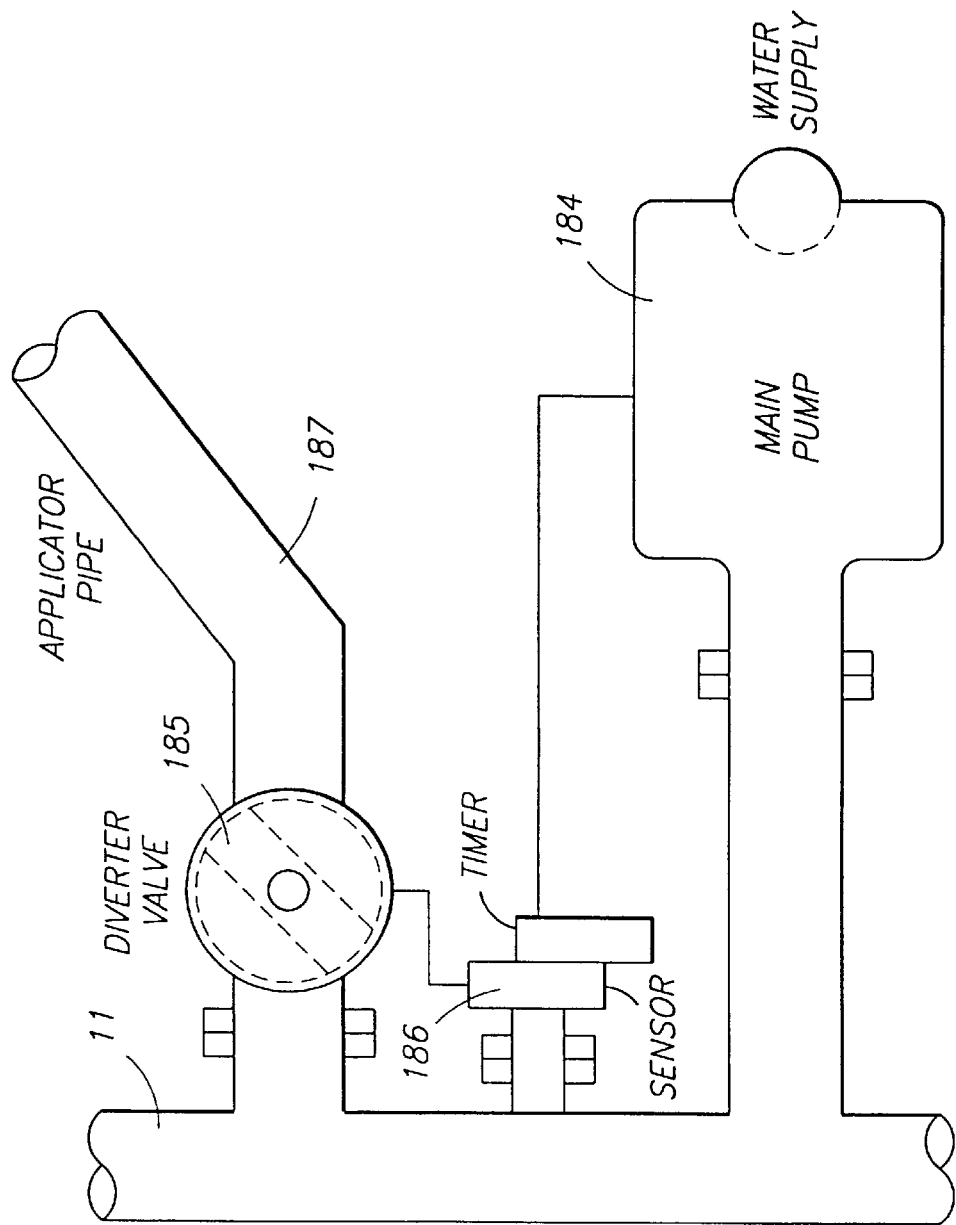

IRRIGATION SYSTEM

This application is a continuation-in-part of U.S. application Ser. No. 09/383,851, filed Aug. 26, 1999, now abandoned.

FILES OF THE INVENTION

The present invention pertains to a new automated approach toward forwarding a water main connection which as a result enables novel irrigation practices.

BACKGROUND OF THE INVENTION

Movable sprinklers, including a series of nozzles mounted along a delivery pipe that moves laterally along a series of access valves, have been in use for decades. One approach has the movable delivery pipe stationary while irrigating. After irrigating, the delivery pipe is disconnected from the water main and moved forward to a successive access valve and then reconnected to the water main. However, it is highly preferable to slowly forward the delivery pipe during irrigation.

Many ways have been suggested to manually forward the connection after intervals of forward traveling irrigation. Manually forwarding a draggable hose is today's common practice. Manual connection forwarding introduces undesirable costs, inefficiencies and operational limitations to what is otherwise the most desirable method of irrigation water application.

Many methods have been suggested to automate the forwarding of the supply main connection. Suggested methods found include: Engel U.S. Pat. No. 2,750,228; Hogg U.S. Pat. No. 3,281,080; Smith U.S. Pat. No. 3,381,893; Purtell U.S. Pat. No. 3,444,941; Rogers U.S. Pat. No. 3,463,175; Stafford U.S. Pat. No. 3,255,969; Nobel U.S. Pat. No. 4,295,607; and Nobel U.S. Pat. No. 4,274,584. All of these methods are very elaborate. Furthermore, all of these methods limit the delivery pipe to straight line travel only. Consequently, after completing an irrigation across a field, the delivery pipe must reverse travel the irrigated field in order to assume its original starting position.

U.S. Pat. No. 4,877,189 to Williams discloses a swing arm pivotably mounted to the water delivery pipe and a valve coupler mounted to the opposite free swinging swing arm end. Valve connection is made and the delivery pipe irrigates traveling the same distance found between successive access valves. The coupler is then disconnected from the valve and the free swing arm end, with coupler, is ground pivoted to the next valve where connection is again made. Delivery pipe travel results in rotation of the swing arm about the valve connection. This rotation feature also enables the swing arm and the water delivery pipe to be pivoted about a valve as an anchor to a similar position on the opposite side of the water main, representing a distinct improvement over the previous references. With Williams one length of water delivery pipe will suffice where previously two were required, greatly reducing equipment cost. Also, irrigation is circuitous and thus no backtracking is required.

The Williams apparatus offers many other distinct advantages over the previously mentioned references as well. Distance between valves is improved with Williams, reducing overall cost. In addition, simplified valve coupling as well as a unique approach to maintaining the delivery pipe aligned with the water main are evident.

The present invention serves to incorporate a number of improvements with the Williams apparatus greatly improving reliability, durability, and operating efficiency while reducing the sales price.

Williams incorporates a transporter for ground supporting and moving the free swinging end of the swing arm for travel between valves. It is advantageous to relocate the transporter so that during travel the access valve passes to the outside of the transporter rather than to the inside as suggested with Williams. It is also advantageous to improve the approach toward raising and lowering the transport wheels to eliminate a disruption of the ground surface as well as greatly lighten the required structure.

The valve coupler of Williams utilizes a set of tracks parallel to the swing arm length to allow the coupler directional alignment along the tracks during the coupling procedure as well as to facilitate straight line travel of the delivery pipe. These tracks may be improved by providing an overhang arrangement enabling much longer tracks and facilitating the aforementioned relocation of the transporter.

The Williams apparatus may be further improved by incorporating a sway inhibitor which provides great rigidity to the swing arm and maintains the tracks rectangularly configured relative to each other. The sway inhibitor thereby enables a greatly increased rate of transporter travel between valves. Typically, operation of the transporter requires a halt or diversion of water flow while a water supply pump remains in operation under a stressed or compromised condition. Therefore, increasing the rate of travel between valves reduces the stress or compromised condition to the pump.

For directional alignment perpendicular to the swing arm during valve coupling, Williams suggests moving the entirety of the swing arm apparatus via the ground surface. A further improvement is to provide an apparatus allowing coupler travel perpendicular to the swing arm length between the coupler and the tracks. Subsequently, loading on coupler and valve is greatly reduced when acting against the valve to facilitate alignment.

Typically all common day lateral move irrigators utilize one of three guidance systems to maintain the delivery pipe aligned with the water main. One method stretches a guide wire along the travel path. A second method buries a signal bearing guide wire along the travel path. For the third method, a small guidance ditch is dug along the travel path. The Williams apparatus offers an inherent less expensive way to maintain alignment between the delivery pipe and the water main and thus none of the above three options are required.

Williams suggests geographic positioning of the delivery pipe by measuring the angular alignment between the swing arm and the delivery pipe and by measuring the forward distance traveled by the delivery pipe. The appropriate position for the valve coupler along the tracks is then determined and the coupler position is then adjusted accordingly which serves to utilize the access valve as a positioning anchor. An improved approach utilizes the measured position of the coupler along the tracks and the measured forward travel direction of the delivery pipe to accurately maintain the delivery pipe a constant distance from the water main. Corrections are made by simply slightly turning the water delivery pipe toward or away from the water main as required to maintain the given distance from the main. The improved approach does not require measuring the forward distance traveled by the delivery pipe and more importantly eliminates the forces and resultant problems with utilizing the access valve as a positioning anchor.

U.S. Pat. No. 4,036,436 to Standal suggests adjusting the travel direction of a lateral moving water delivery pipe in accordance with the distance between a valve coupler and a delivery pipe at each successive engagement of the valve coupler to a water main access valve. Standal suggests that the water delivery pipe may be modified to travel while the coupler remains engaged to an access valve but gives no specific example of a mechanism for accomplishing this. Standal makes no reference to the more accurate navigation approach of measuring the travel direction of the delivery pipe and utilizing the measured travel direction in combination with the measured distance between valve coupler and delivery pipe to prescribe adjustments in the travel direction of the delivery pipe.

Williams suggests a telescoping conduit assembly to hydraulically connect the valve coupler to the swing arm. Water pressure in this arrangement will supply a large force toward extending the telescoping conduit, exerting a side force against the access valve as well as the water delivery pipe. Of further improvement, two conduit lengths pivotably connected together with one of the remaining ends pivotably connected to the valve coupler and the last end pivotably connected to the swing arm offer hydraulic connection between the coupler and the swing arm while eliminating the side force.

To the inventor's knowledge, no one has suggested a measuring device to determine the relative vertical position between components of the connector apparatus and an access valve. The advantages of such a device include speeding travel between valves and minimizing clearances required between the connector apparatus and an access valve.

Selectively varying the discharge of water along the length of a water delivery pipe has been described in U.S. Pat. No. 5,246,164 to McCann. The McCann patent discloses a system for use with center pivot irrigation in particular and suggests the approach may also be applicable to laterally traveling irrigators. McCann fails to specify a way to geographically track the position of laterally traveling irrigators other than to suggest a sprinkler line position sensor. The present invention includes novel features of the previously disclosed approach toward navigating the delivery pipe which further offer an ability to geographically track the position of a laterally traveling irrigator.

In summary, lateral move sprinkler mounted water delivery pipes, adapted for continuous travel during water application, offer superior and uniform application properties while irrigating rectangular areas. These qualities are most desirable. Unfortunately, no affordable and reliable method of automatically connecting the traveling delivery pipe to a stationary series of access valves has been developed for market to date, severely restricting use of these systems.

The present invention provides unique features to the Williams connection approach. The resultant apparatus enables affordable and reliable automated connector forwarding for continuous travel lateral move sprinklers.

BRIEF DESCRIPTION OF THE DRAWINGS

A preferred form of the invention is illustrated in the accompanying drawings in which:

FIG. 1 is an end elevation view of a valve coupler and swing arm apparatus of the present invention located above an access valve with pivot pad;

FIG. 1A is a fragmentary side elevation view of the apparatus shown in FIG. 1;

FIG. 2 is a view similar to the end elevation view of FIG. 1 with the valve coupler and swing arm apparatus having been lowered until a valve detector plank has made contact with the top surface of the access valve;

FIG. 2A is a fragmentary side elevation view of the apparatus shown in FIG. 2;

FIG. 3A is a fragmentary side elevation view of the apparatus shown in FIG. 3;

FIG. 4A is a fragmentary side elevation view of the apparatus shown in FIG. 4;

FIG. 5 is a view similar to the side elevation view of FIG. 4A with the valve coupler in a retracted position along the swing arm apparatus;

FIGS. 16A, 16B, 16C and 16D are diagrammatic top plan views of a lateral move irrigator of the present invention at various positions during forward movement;

FIGS. 17A, 17B, 17C and 17D are top plan views of a lateral move irrigator of the present invention at various positions during rotation between two fields on opposite sides of an adjacent water main;

FIG. 18 is a diagrammatic illustration of a water main flow diverter utilized with the present system;

FIGS. 20A, 20B and 20C are diagrammatic top plan views of a lateral move irrigator of the present invention at various positions during operation of a delivery pipe navigator.

DETAILED DESCRIPTION OF THE PREFERRED EMBODIMENT

Figure 11:
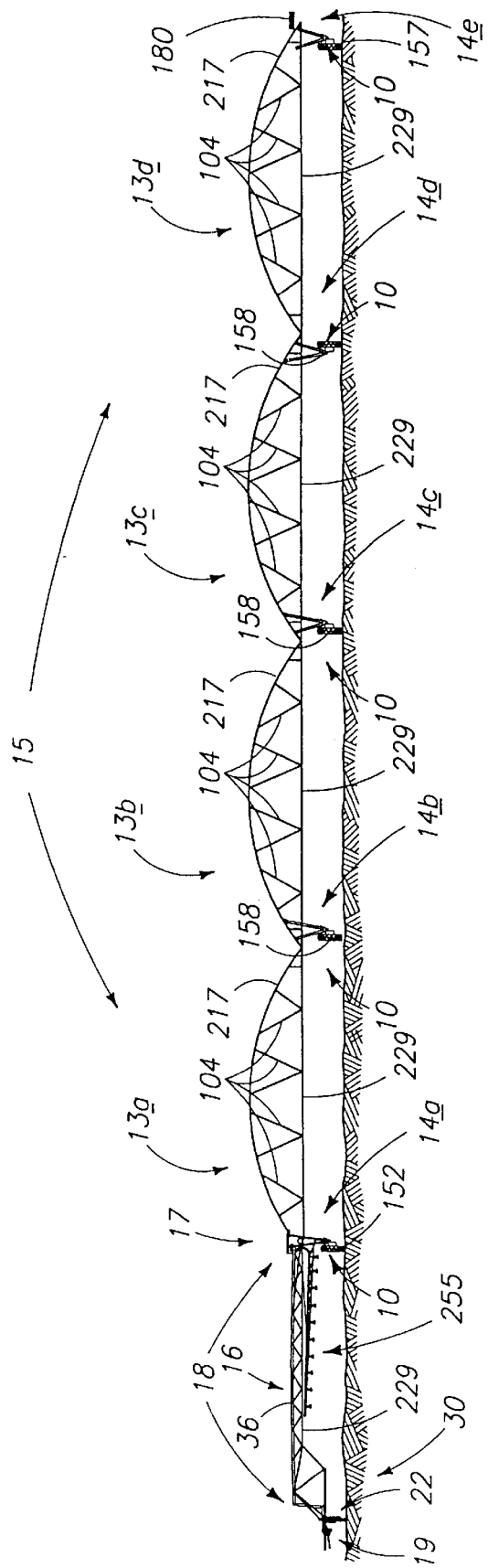
FIG. 11 is a side elevation of a swing arm apparatus of the present invention pivotably mounted at one end to a lateral move water delivery pipe with the apparatus of FIG. 6 mounted at the other swing arm end and an elevationally adjusting underboom also mounted to the lateral move water delivery pipe and extending underneath the swing arm.

The present invention generally relates to lateral move irrigators. The present invention incorporates one or more lengths of trussed water delivery pipe 13, mounted atop movable carts 14 forming a linear series of trussed water delivery pipes as shown in FIGS. 11, 16A, 16B, 16C and 16D. A drive 10 on each cart maintains linear alignment of the water delivery pipe 13 while powering each cart 14 to travel in a direction perpendicular to the lengths of the trussed water delivery pipe 13. A water applicator 143 is connected along the lengths of trussed water delivery pipe 13 for selectively applying the water supplied by the trussed water delivery pipes 13 on to the field surface (shown only in FIG. 13). The present invention may generally include trussed water delivery pipes 13, movable carts 14, drive 10 and water applicator 143. Hereafter the trussed water delivery pipes 13, movable carts 14, drive 10, and water applicator 143 will be grouped together and referred to as a lateral move water delivery pipe assembly 15 as shown in FIG. 11.

Figure 16A:
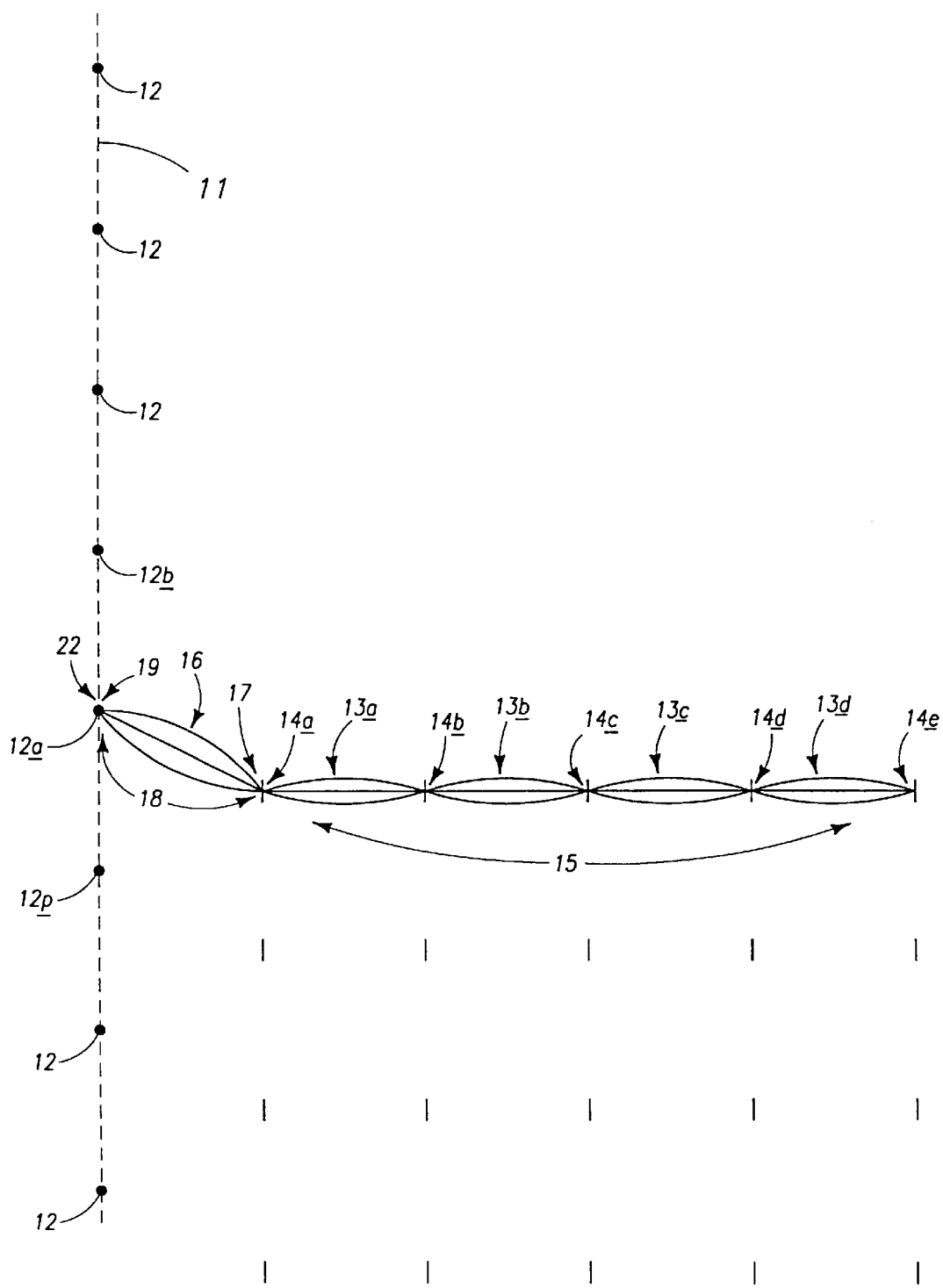

The present invention is intended for use in conjunction with a water main 11 as shown in FIG. 16A. One end of the present lateral move water delivery pipe assembly 15 is to be situated adjacent the water main 11. The water main 11 is preferably parallel to the travel direction of the water delivery pipe assembly 15. Access valves 12 are mounted at appropriate intervals along the water main 11 enabling selective access to the water therein.

The present invention also involves a water delivery pipe rotator 103 in combination with a connector for joining the water delivery pipe assembly 15 to the succession of access valves 12.

Water delivery pipe rotator 103 (shown in FIGS. 17A–17D) controls the drive 10 of water delivery pipe assembly 15 in order to automatically rotate the water delivery pipe assembly 15 from the typical lateral move irrigator position along one side of the water main 11 to a diametrically opposed position on the other side of water main 11. Rotation of the water delivery pipe assembly enables automated connector forwarding and application of water along both sides of the water main 11.

Water delivery pipe rotator 103 synergistically furnishes elements of a connector for connecting a series of spaced access valves 12 mounted along a water main 11 to the water delivery pipe assembly 15. The connector 18 is an improvement that enables successive connection of the forward traveling water delivery pipe assembly 15 to the stationary series of access valves 12.

The preferred present connector 18 includes a swing arm 16 as shown generally in FIG. 11. The swing arm 16 may be a trussed span of water supply pipe 36 of a length similar to that of the trussed water delivery pipes 13 utilized as part of the water delivery pipe assembly 15. The swing arm 16 is connected to one end of the water delivery pipe assembly 15 as shown, utilizing a pivot 17 (FIGS. 11 and 13) to allow angular movement in all directions between the swing arm 16 and the water delivery pipe assembly 15.

Figure 6:
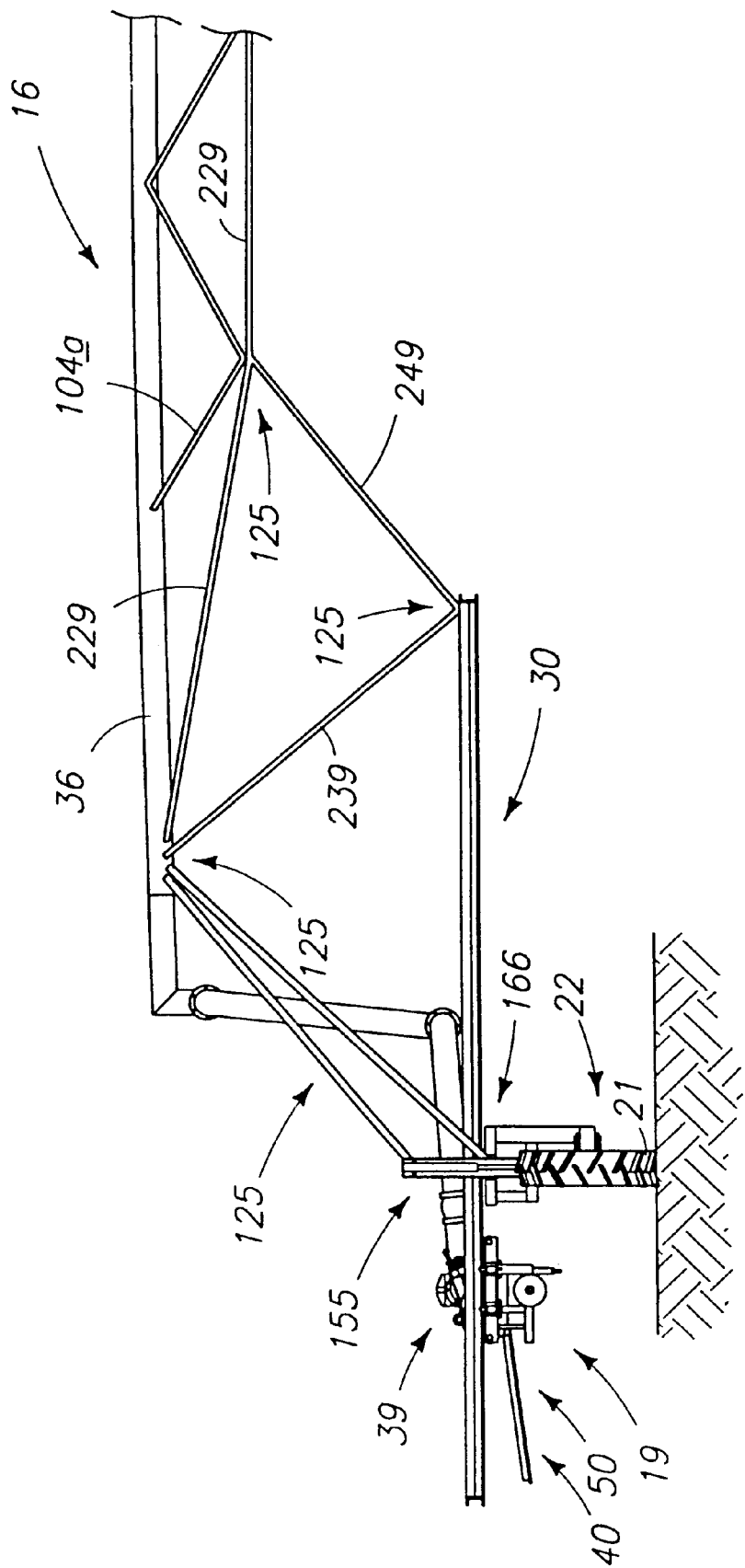
FIG. 6 is a fragmentary side elevation showing the entirety of a swing arm length adjuster with the valve coupler oriented similar to that shown in FIG. A.

The swing arm 16 has an outer end remote from the connection to the water delivery pipe assembly 15 with a valve coupler 19, transporter 22 and a swing arm length adjuster 30 mounted thereon as shown in FIGS. 1–5 and specifically illustrated in FIG. 6. The valve coupler 19 provides selective connection and disconnection along the series of access valves 12. The swing arm length adjuster 30 is employed to enable the water delivery pipe assembly 15 to travel forward in a substantially straight line transverse to the delivery pipe length.

The valve coupler 19 incorporates the available weight at the swing arm outer end to influence downward travel of the outer end to forcibly align with, connect to, and forcibly open successive access valves 12. Upward and downward travel of the valve coupler 19 is provided by an independent wheel lifter 155 as part of the transporter 22. Hydraulic cylinders 45 pivotably mount to hydraulic cylinder mounts 70 between the upper ends of a frame crossbeam 25 and transport wheel legs 20 (FIGS. 1–6). Transport wheel legs 20 mount to frame crossbeam 25 with leg pivots 26 located therebetween. Transport wheel legs 20 are thus allowed to swing up and down (in a substantially vertical plane) so as to raise or lower each transport wheel 21 mounted to the outward swinging end of each leg 20 when hydraulic cylinders 45 are retracted or extended respectively as part of a rotation lifter 166. The upward rotation of transport wheel legs 20 with transport wheels 21 has the effect of lowering the coupler body 24 with a plastic alignment cone 85, to align and forcibly open an access valve 12 (access valve 12 is shown open in FIGS. 4, 4a and 10). The lowering of transport wheels 21 serves to raise the swing arm outer end and thus disconnect the valve coupler body 24 from an access valve 12.

Valve coupler 19 includes a valve coupler adjuster 35 (shown generally in FIGS. 1, 2, 3, 4, and in greater detail in FIGS. 7, 8, and 9) for enabling the valve coupler body 24 to adjust position substantially in the horizontal plane and with a travel direction substantially parallel to that of the transporter 22 (the direction perpendicular to the swing arm length) to facilitate the process of aligning the coupler body 24 with an access valve 12. A trolley frame 31 includes two rectangular tubes 32 welded on opposite sides of coupler body 24 at the middle of the tube lengths and extending horizontally to outer ends. Each set of adjacent ends of trolley frame tubes 32 are mounted to a trolley roller assembly 33 utilizing roller bearings 34 and plastic plates 47, allowing the trolley frame horizontal linear travel in a travel direction similar to that of the transporter 22. Compression coil springs 37 slide over the outside of each end of one of trolley tubes 32 and reside between the roller assemblies 33 and the outer ends of one of the tubes 32. When trolley frame 31 has been acted upon by an access valve 12 to slide toward either of trolley roller assemblies 33, the corresponding spring 37 will compress. Subsequently, the same spring 37 will extend and serve to return trolley frame 31 back to the at-rest position, centered between roller assemblies 33 when the force acting upon trolley frame 31 is released. (Trolley frame 31 is shown off-centered in FIGS. 3 and 4.) Valve coupler 19 includes a vertical position measuring device 50 as shown generally in FIGS. 1–6 and as shown in detail in FIGS. 7–9 and 14. Vertical position measuring device 50 utilizes access valve detector plank 41 pivotably mounted to support wheel mounts 146. Support mounts 146 are bolted to trolley frame 31. Pivots 44 mount between detector plank 41 and support wheel mounts 146 so that detector plank 41 is allowed to rotate mostly vertically and remain rigid in the substantially horizontal plane. Detector plank 41 is thus positioned to extend outwardly and generally horizontally in the direction opposite pivot 17. Raising the wheel legs 20 with transport wheels 21 lowers the valve coupler 19 including detector plank 41. Detector plank 41 subsequently engages the top edge of an access valve 12 as shown in FIG. 2A. As the valve coupler 19 is lowered the detector plank 41 is forced upward until detection by a detector plank limit switch 42 (limit switch 42 shown only diagramatically in FIG. 14).

Detector plank 41 engaging the top of an access valve 12 also serves as an access valve detector 40 as part of an access valve locator 48 as shown best in FIGS. 2 and 2a. Access valve detector 40 serves to establish that an access valve 12 has in fact been located by an access valve locator 48 described below.

Figure 13:
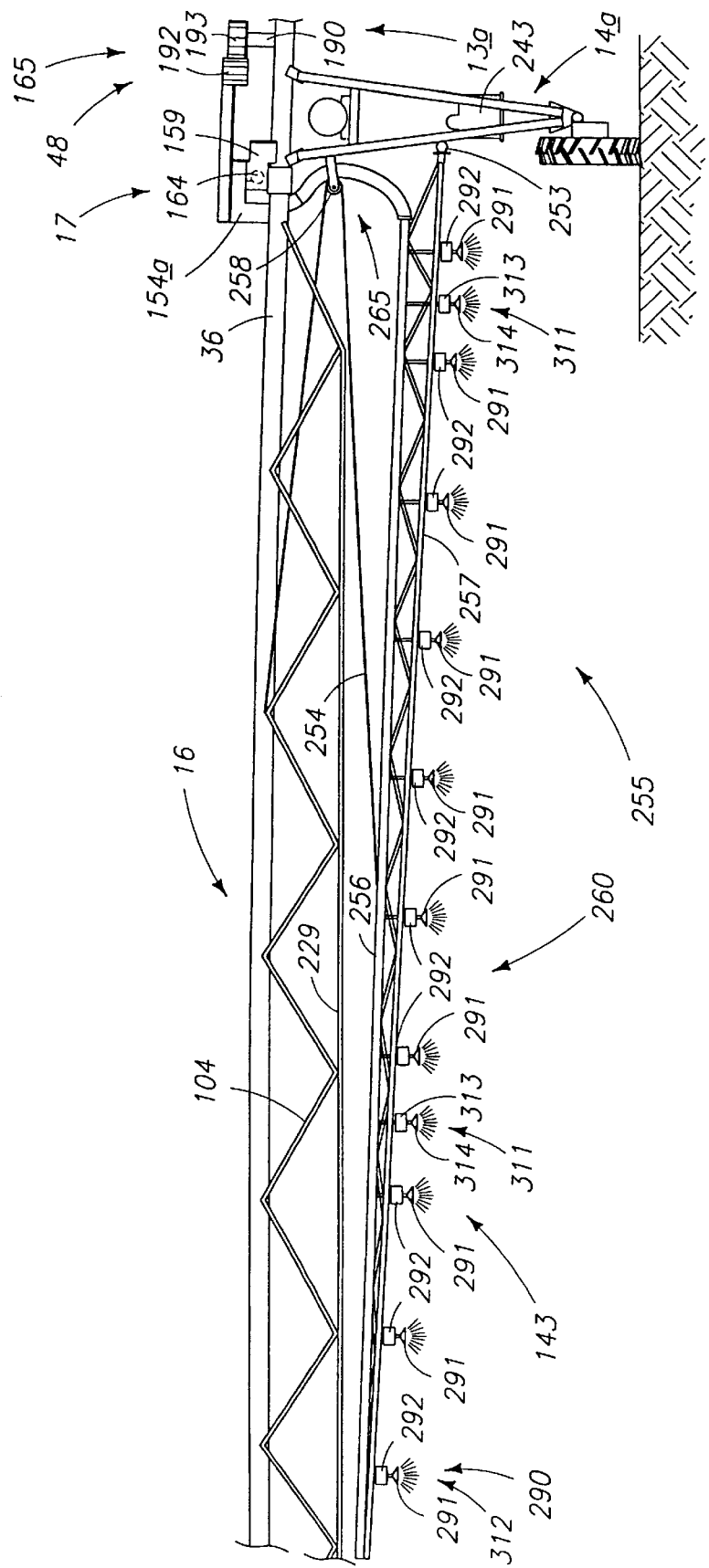
FIG. 13 is an enlarged fragmentary elevation view of the left end portion from FIG. 11 showing a universal pivot, a pivot angle measuring device, and features of the elevationally adjusting underboom.

An access valve locator 48 as shown in FIG. 13 is utilized for positioning the detector plank 41 above an access valve 12 before the detector plank 41 is lowered onto the top of the valve. Locator 48 includes a pivot angle measuring device 165 as shown in FIG. 13 and shown diagramatically in FIG. 14. Pivot angle measuring device 165 includes a curved rack gear 192 structurally mounted to the swing arm 16. A pivot angle encoder 190 is mounted to the first span 13a of the water delivery pipe assembly 15. A pinion gear 193 is affixed to the shaft of pivot angle encoder 190 which mates with curved rack gear 192. Consequently, horizontal angular movement between the swing arm 16 and the first span 13a of the water delivery pipe assembly 15 will be measured by the angle encoder 190. Access valve locator 48 utilizes this measurement of horizontal angular movement to determine when to halt forward travel of the connector 18 during transport between access valves 12 so as to position the detector plank 41 above an access valve 12.

Hardware similar to the pivot angle measuring device 165 may be utilized to linearly align the swing arm 16 with the first span 13a for operation of the previously mentioned water delivery pipe rotator 103. Hardware similar to the pivot angle measuring device 165 may also be utilized to align all of the trussed water delivery pipes 13 along water delivery pipe assembly 15. However, alignment along the delivery pipe does not require the angle measuring capabilities preferred to measure the distance between two successive access valves 12. Consequently, simpler hardware for measuring the alignment may be utilized as are commonplace to the industry.

Vertical position measuring device 50 shown in FIGS. 1–6, 7, 8 and 9 serves to determine the vertical position between the valve coupler 19 and an access valve 12 to facilitate alignment and coupling therebetween. Previously discussed as part or vertical position measuring device 50, the operation of lowering detector plank 41 onto the top of access valve 12 until detection by detector limit switch 42 serves to legislate an exact vertical positioning between access valve 12 and valve coupler 19.

Vertical position measuring device 50 also includes sliding tube 51 (FIGS. 7–9) mounted by a linear bearing 53. Linear bearing 53 is mounted to a rectangular post 136. Rectangular post 136 is mounted to one of the rectangular tubes 32 of trolley frame 31. Linear bearing 53 enables the sliding tube 51 to travel substantially vertically while restrained from all other movements. A wheel 57 is mounted by an axle bolt 58 to the bottom of sliding tube 51 such that wheel 57 is situated to contact a concrete pivot pad 167 situated at the base of an access valve 12 as the valve coupler 19 is lowered. The sliding tube 51 is therefore forced upward relative to linear bearing 53 and thus trolley frame 31. Wheel 57 is situated to roll along the surface of pivot pad 167 when the valve coupler 19 has been coupled to an access valve 12 and the water delivery pipe assembly 15 travels. Wheel 57 is shown in contact with a pivot pad 167 in FIGS. 4 and 4a. A primary vertical position limit switch 59 and a secondary vertical position limit switch 60 are shown diagramatically in FIG. 14. Limit switches 59 and 60 are positioned to detect desired positioning between sliding tube 51 and trolley frame 31 during alignment and coupling between valve coupler 19 and an access valve 12.

A valve coupler aligner 100 (FIG. 10) functions as part of the valve coupler 19. Coupler aligner 100 includes a guide 127 consisting of a plastic cone 85 attached to the bottom end of coupler body 24. Raising the transport wheels 21 lowers the coupler mounted end of the swing arm 16 including the coupler body 24 with cone 85. Plastic cone 85 engages the top edge of an access valve body 97. Further lowering places weight on the valve body 97. The engaged inclined surface of the cone 85 cams against the top lip of valve body 97 causing the cone 85 to travel horizontally to relieve the downward weight force.

Valve coupler aligner 100 enables cone 85 to travel in the substantially horizontal plane by utilizing available travel of the coupler body 24 along a horizontal axis substantially parallel to the length of the swing arm 16 as furnished by the swing arm length adjuster 30 (FIGS. 1A, 2A, 3A, 4A, 5 and 6) described later. Horizontal travel of coupler body 24 substantially perpendicular to that of the swing arm length adjuster 30 is furnished to the valve coupler aligner 100 by the valve coupler adjuster 35 described earlier. Consequently, the lowering cone 85 bears against the top edge of the access valve body 97 (FIG. 10) and subsequently serves to facilitate horizontal alignment of the coupler body 24 so as to center the coupler body 24 directly over an access valve 12.

Figure 10:
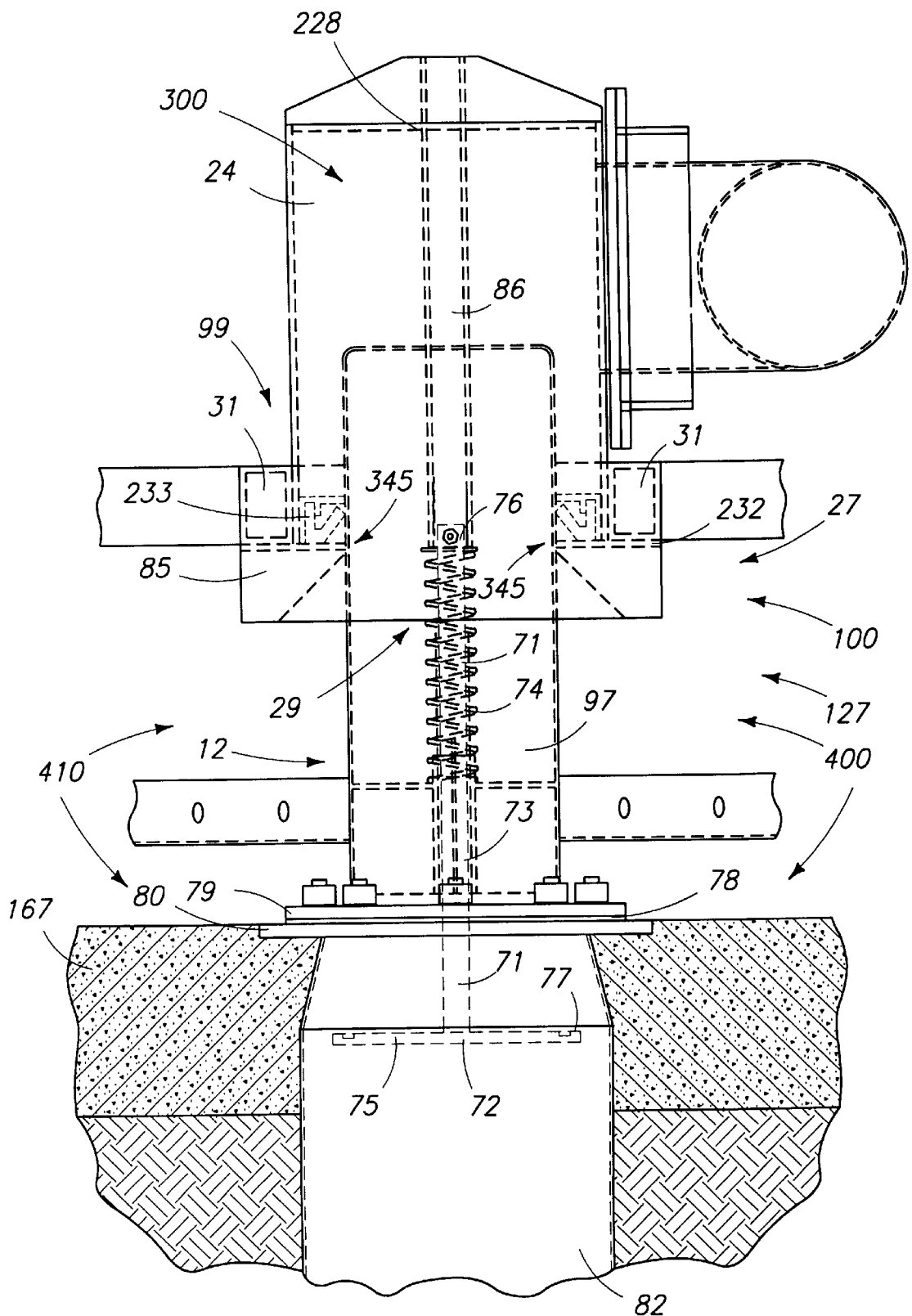
FIG. 10 is an enlarged fragmentary sectional view of a valve coupler engaged to an access valve taken on line 10—10 of FIG. 4A.

When the coupler end of the swing arm is further lowered, the valve coupler 19 incorporates a coupler lock 350 as shown in FIG. 10. The upper inner lip of plastic alignment cone 85 slides over the top edge of an access valve body 97 of access valve 12 locking the coupler body 24 from further horizontal movement.

When the coupler end of the swing arm is further lowered, the valve coupler 19 incorporates an actuator 29 as shown in FIG. 10. As the coupler body 24 continues downward, the bottom edge of inner pipe 86 becomes engaged with the top surface of a plunger rod 71. Plunger rod 71 slides linearly and vertically inside a tube bushing 73 welded to the inside of valve body 97. Plunger rod 71 is welded to a face plate 75. Plunger rod 71 and face plate 75 make up a poppet 72. Poppet 72 resides in a normally closed orientation with spring 74 positioned between tube bushing 73 and a spring retainer 76 which is pinned to the upper end of plunger rod 71. A machined face 77 of poppet 72 mates against a flat rubber gasket 78 acting to seal the closed valve from water leakage. Flat rubber gasket 78 is bolted between access valve flange 79 and riser flange 80 acting to prevent water leakage between the two flanges as well. As the coupler body 24 with inner pipe 86 is lowered, the engaged plunger rod 71 forces the poppet 72 downward, opening the access valve 12 to water flow from the water main 11. Water pressure as well as spring 74 will cause the poppet 72 to raise and subsequently close the access valve 12 when the valve coupler 19 is raised. Seal mount 232 is bolted between the bottom face of trolley frame 31 and plastic cone 85. Seal mount 232 holds the outer lip of a main seal 233. The plastic cone 85 mounts against the bottom surface of seal 233. Main seal 233 provides a rotatable, water seal between the outside surface of valve body 97 and coupler body 24. The rotatable water seal is part of a valve coupler rotator 99 described later.

Swing arm 16 can include swing arm length adjuster 30 (FIGS. 1A, 2B, 3A, 4A, 5, 6, 7, 8 and 9). Adjuster 30 functions to vary the distance between coupler body 24 and pipe 15 when body 24 is engaged to a valve 12 so that pipe 15 can travel in a straight line. A trolley assembly 39 includes coupler body 24 as part of trolley frame 31 which is mounted by trolley roller assemblies 33. Roller assemblies 33 engage rails 91 to carry trolley assembly 39 between an inner end closest to pivot 17 and an outermost end away from the pivot 17. Roller assemblies 33 utilize nylon rollers 92 formed of nylon or another appropriate low friction noncorrosive material which serve to support and move the bottom surface of rails 91. The rails move along the top of the nylon rollers 92 when a ground support 120, described later, has engaged a pivot pad 167. Pallet rollers 93 are also provided and offer support and travel along the top of the rails 91 for the trolley assembly 39 when ground support 120 is not in contact with pivot pad 167. Four cam followers 102 are mounted to each roller assembly 33 so as to roll along the inside and outside lower edges of rails 91 to maintain each roller assembly 33 in alignment with the corresponding rail 91.

A trolley drive 84 as part of swing arm length adjuster 30 (FIG. 7) propels the trolley assembly 39 along rails 91. Trolley drive 84 includes a roller assembly 33a. Roller assembly 33a has a self aligning flange mount bearing block 94a. A driveline 95 extends through bearing block 94a with a nut 96 threaded onto one end of driveline 95. A splined axle 98 extends through two bearing blocks 94 of roller assembly 33 with a splined stub end 129 protruding from an end of the driveline 95 toward roller assembly 33a. Splined stub end 129 is mounted by ball spline coupler 151 such that the ball spline coupler 151 freely travels along the length of splined stub end 129 while being rigid to rotation about the axis of the axles between them. The end of ball spline coupler 151 facing roller assembly 33a is welded to the remaining end of driveline 95. Consequently driveline 95 and splined axle 98 are locked so as to rotate together but are extendible along the axis of rotation.

One sprocket 107 is mounted to driveline 95 and another to splined axle 98. Two idler sprockets 106 FIG. 8) are mounted to each roller assembly 33 in alignment with each sprocket 107 so that a roller chain 108 may wrap under the idlers 106 and over a sprocket 107 (best shown in FIG. 8) and extend end to end along side each rail 91. Each sprocket 107, idler sprockets 106 and roller chain 108 are oriented to enable both roller assemblies 33 to be driven simultaneously via driveline 95 and splined axle 98. The sprockets and chain maintain the trolley assembly 39 perpendicularly aligned with the rails 91. To the inside of one of the sprockets 107, driven sprocket 109 mounts to splined axle 98 (best shown in FIG. 7). A drive motor 111 mounts to a pivoting mount with a drive sprocket mounted to the drive shaft of drive motor 111. A drive chain 114 extends over the drive sprocket and driven sprocket 109 and is linked back to itself to form a closed loop to be tensioned by adjustment of the pivoting mount. When drive motor 111 is operated, splined axle 98 and driveline 95 rotate forcing sprockets 107 against the linearly stationary roller chain 108, forcing the roller assemblies 33 in the desired direction along the rails 91.

Figure 7:
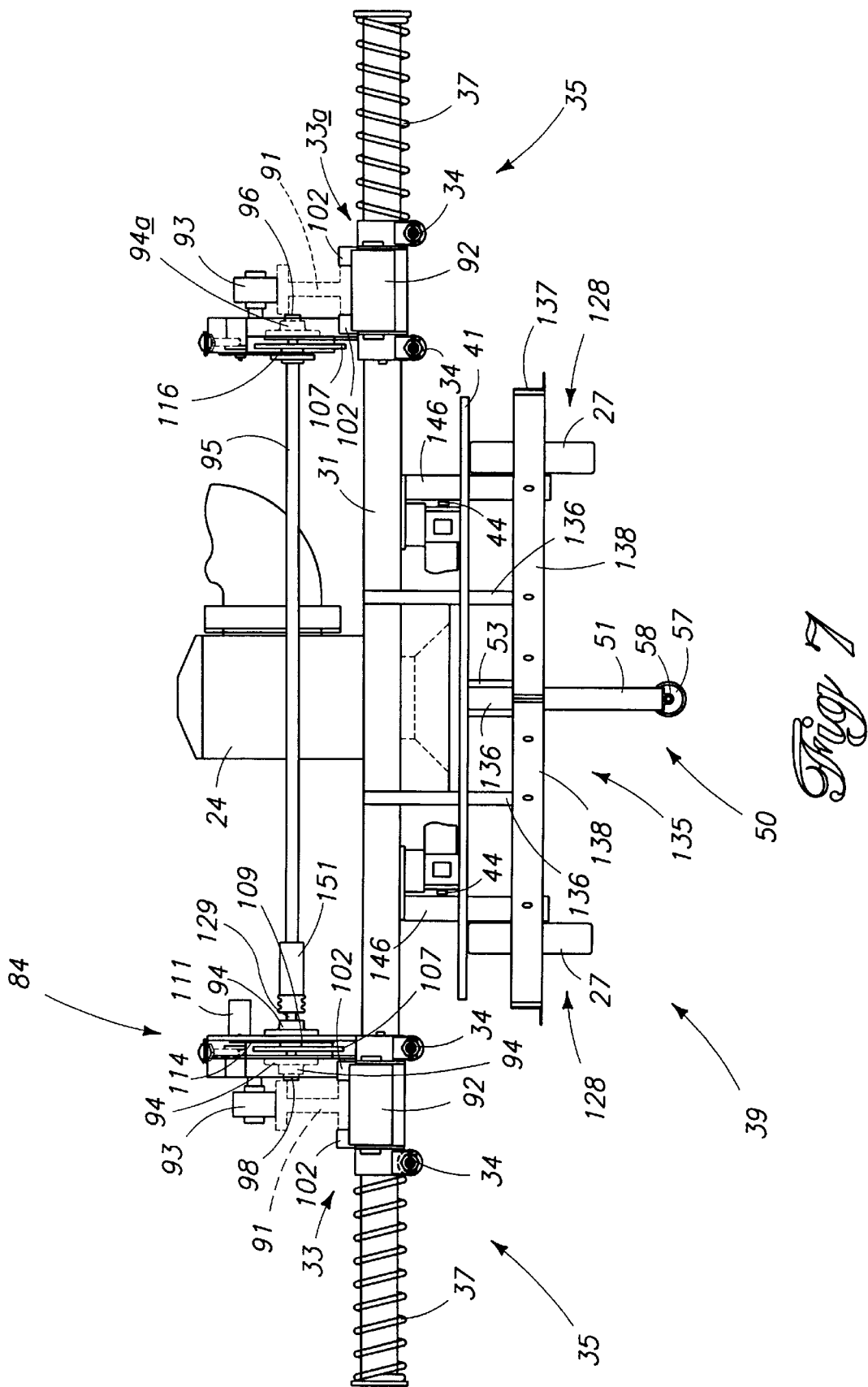
FIG. 7 is an end elevation view of a valve coupler trolley assembly with a vertical position detector wheel assembly extended and the valve detector plank shown in a mostly horizontal orientation.
Figure 14:
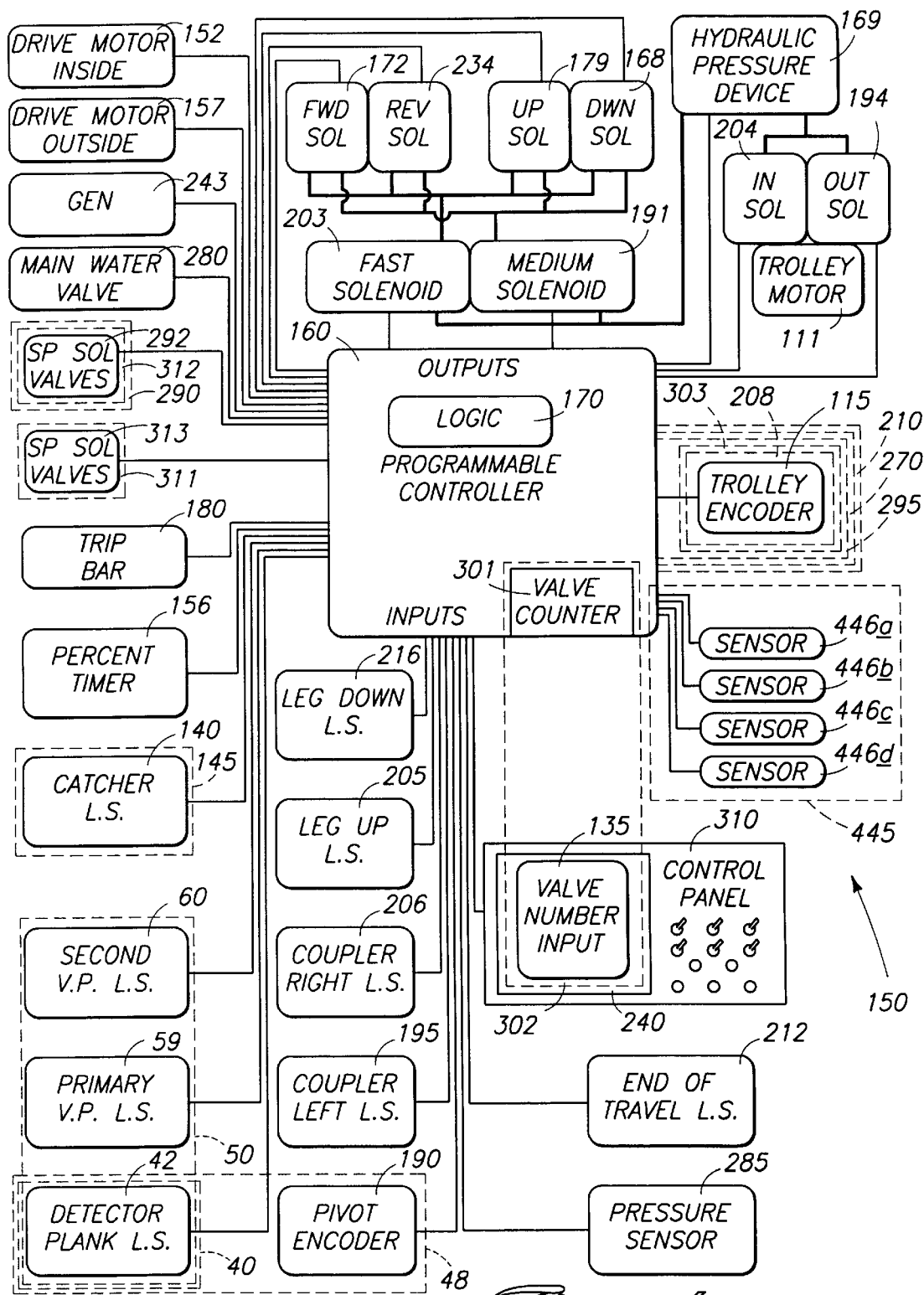
FIG. 14 is a control diagram of various components for operation of the present system.

An indexing sprocket 116 mounts to the inside of sprocket 107 on driveline 95 (FIG. 7). A trolley encoder 115 (FIG. 8) mounts to a spring tensioned pivoting mount 117 located on the roller assembly 33a. Indexer sprocket 119 mounts to the input shaft of encoder 115. An indexer roller chain 118 extends over sprockets 116 and 119 and connects back to itself Spring tensioned pivot mount 117 appropriately tensions trolley indexer roller chain 118. Trolley encoder 115 will measure any movement of driveline 95 and thus roller assemblies 33 and ultimately trolley assembly 39 along the length of rails 91 as part of a swing arm length measuring device 208 (FIG. 14). The previously discussed pivot mount associated with drive motor 111 (not well shown) is similar to tensioned pivot mount 117 except the spring and nut arrangement of spring tensioned pivot mount 117 is replaced with a nut on each side of the plate to lock the pivot mount in place as required to accommodate the torque of drive motor 111.

The reason that trolley drive 84 is mounted on the trolley assembly 39 is so that when the swing arm length adjuster 30 functions to enable straight line travel of the water delivery pipe 15, the drive components of trolley drive 84 remain oriented above the pivot pad 167 and consequently remote from potential entanglement with adjacent crops.

An access valve catcher 135 may be facilitated by the aforementioned swing arm length adjuster 30 as well as the aforementioned valve coupler adjuster 35. The access valve catcher 135 serves as part of the valve coupler 19 as shown best in FIGS. 7–10.

Figure 3:
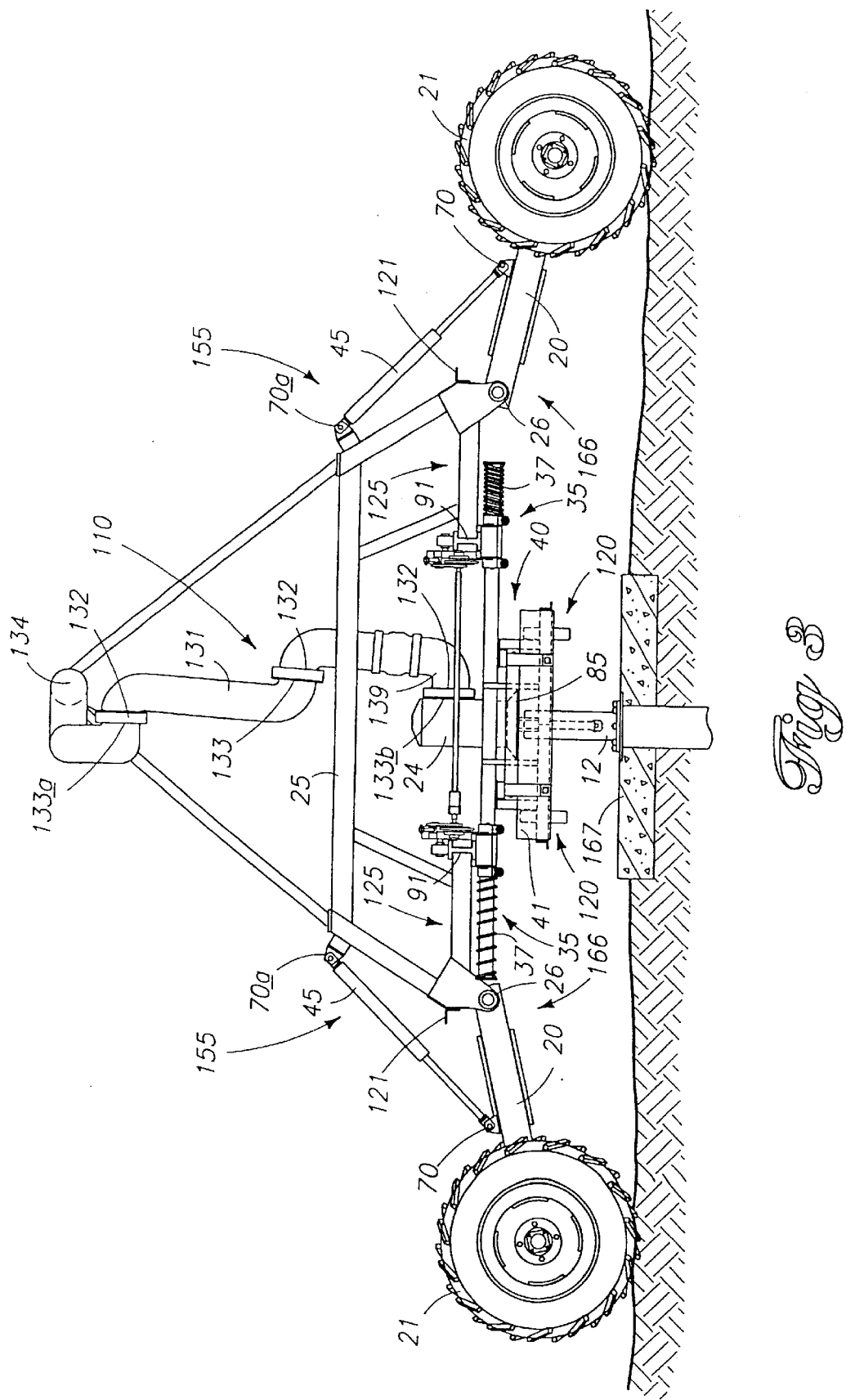
FIG. 3 is a view similar to the end elevation view of FIG. 2 with the valve coupler apparatus having been rolled forward until a valve catcher has contacted the access valve and consequently aligned the valve coupler with the access valve.

Three rectangular posts 136 are welded to trolley frame 31 and extend downward therefrom to a height slightly above the ground engaging elevation of ground support wheels 27. A "v"-configured catcher 137 (FIG. 9) is welded to the bottom of posts 136 in a mostly horizontal orientation with the mouth of catcher 137 facing the outer end of the swing arm 16 and thus away from pivot 17. Upon appropriate positioning of the valve coupler 19 relative to an access valve 12 by the access valve detector 40 as shown in FIGS. 2 and 2a, the trolley assembly 39 of the swing arm length adjuster 30 may be powered to move outward, away from the pivot 17. Consequently, "v"-configured catcher 137 travels until engaging an access valve 12 when one of two catcher plastic wear surfaces 138 mates against access valve body 97. A catcher plastic 138 is affixed along each of the two arms of the "v"-configured catcher 137 to minimize friction and wear between the "v"-configured catcher 137 and the valve body 97 of an access valve 12. The powered trolley assembly 39 forces the catcher plastic 138 against the side surface of access valve body 97, acting to move the catcher 137 in a direction perpendicular to the length of the swing arm length adjuster 30. Travel is provided by the valve coupler adjuster 35 until both catcher plastics 138 are in contact with access valve body 97 as shown in FIGS. 3 and 3A. Consequently, travel along the swing arm length adjuster 30 as well as along the valve coupler adjuster 35 halts. With both catcher plastics 138 engaging valve body 97, the valve catcher 135 has positioned itself to access valve 12 in two dimensions and consequently has aligned access valve 12 to the aforementioned guide 127 of valve coupler aligner 100.

Just prior to the engagement of the second catcher plastic 138 to access valve body 97, a catcher limit switch 140 (shown diagramatically in FIG. 14) engages access valve body 97 and subsequently is actuated. The limit switch 140 acts to indicate completion of the alignment of plastic cone 85 with access valve body 97. Consequently, horizontal position measuring device 145 has functioned to determine that the desired orientation between valve 12 and aligner 100 has been achieved.

It is advantageous to utilize valve catcher 135 in combination with valve coupler aligner 100 to align an access valve 12 to valve coupler body 24. Because of terrain variations in the ground support of cart 14a and the ground support of transport wheels 21, a small misalignment (a few inches or more) can result when aligning an access valve 12 to coupler body 24 utilizing the valve catcher 135. Therefore a "fine" secondary alignment is required as provided by valve coupler aligner 100. Conversely, utilizing the valve coupler aligner 100 by itself to align an access valve 12 to valve coupler body 24 would require an alignment cone 85 in the realm of thirty inches in thickness (rather than four inches in thickness) in order to provide the range of alignment available with the valve catcher 135. Thirty inches in thickness would also require twenty-six additional inches of clearance between the coupler body 24 and an access valve 12. Utilizing the valve coupler aligner 100 by itself would also require additional hardware to align the alignment cone 85 to an access valve 12 along the travel axis of the swing arm length adjuster 30.

Figure 8:
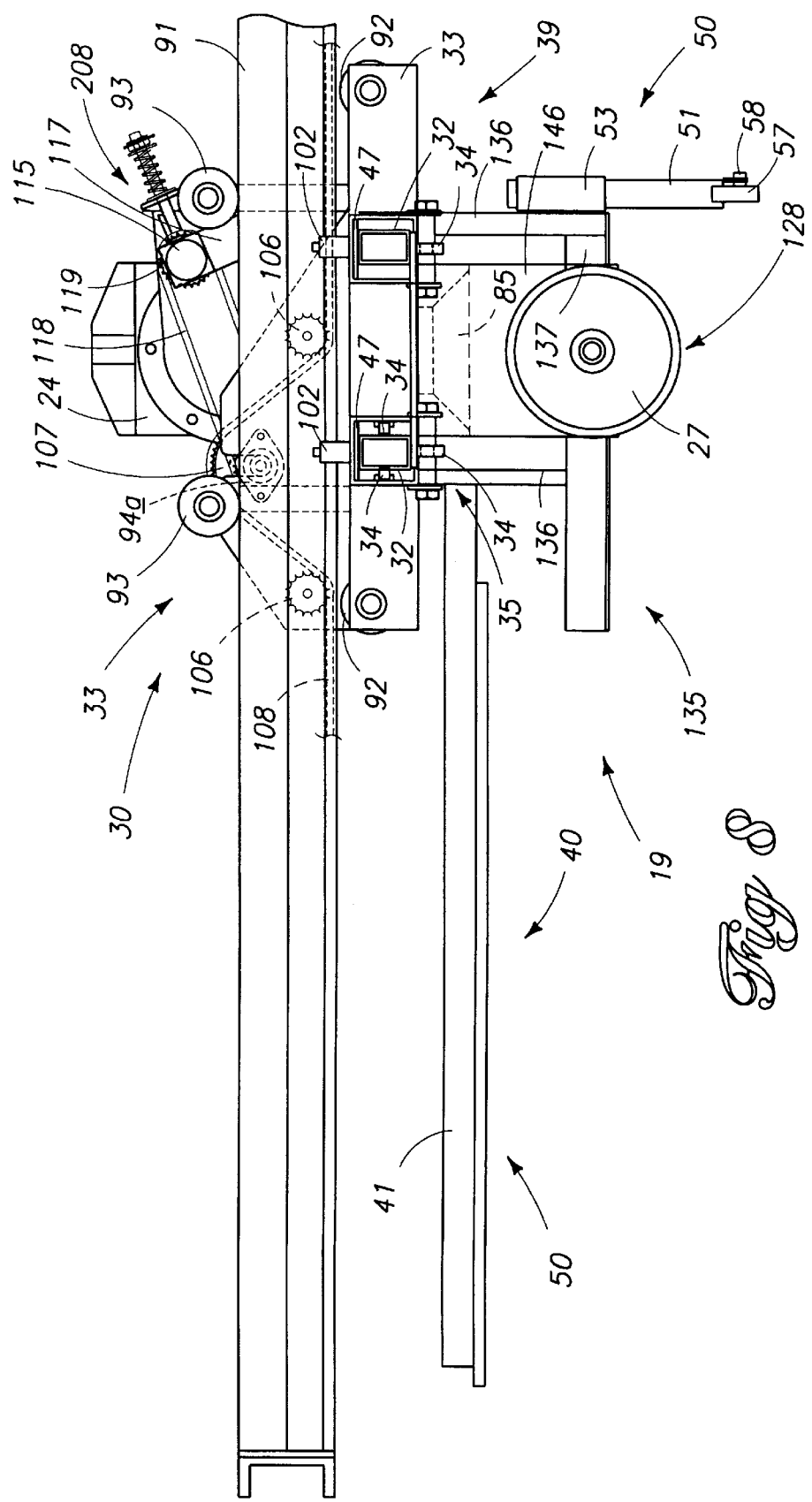
FIG. 8 is a side elevation view of the apparatus shown in FIG. 7.
Figure 9:
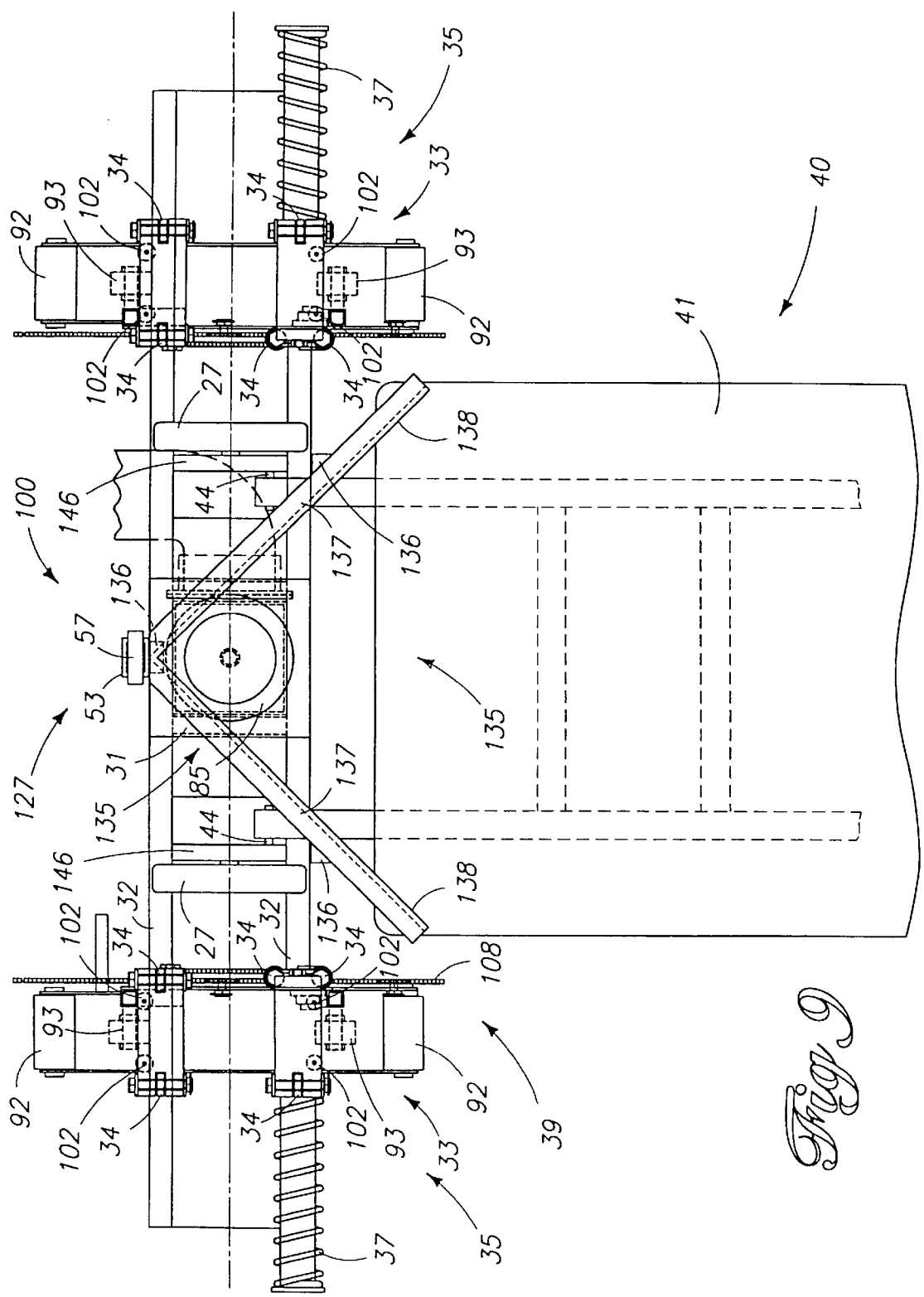
FIG. 9 is a bottom plan view of the apparatus shown in FIGS. 7 and 8.

To the inside of roller assemblies 33, bolted to rectangular tubes 32 of trolley assembly 39 are support wheel mounts 146 which extend downward and furnish an axle extending horizontally so that a support wheel 27 may mount on each side of the downward extension as shown in FIGS. 7–9. Support wheel mounts 146, support wheels 27, and trolley frame 31 serve as a ground support 128 for the coupler mounted end of the swing arm 16 when the transport wheels 21 have been raised in order to connect valve coupler body 24 to an access valve 12. When the coupler body 24 is connected to an access valve 12, the support wheels 27 are subsequently anchored from all ground movement except rotation about the access valve 12 as utilized by a valve coupler rotator connection 99 described later. With support wheels 27 anchored from travel, rails 91 travel anchored radially with respect to access valve 12 when the swing arm length adjuster 30 operates.

A valve coupler rotator connection 99, shown best in FIGS. 4a, 5 and 10, includes the aforementioned support wheels 27. Support wheels 27 are rotatable about a common axis with the coupler body 24 located between support wheels 27 along the axis. Such alignment provides pivotable ground support for the swing arm 16 at the coupler mounted end of the swing arm 16 so the swing arm 16 is freely rotatable about connection to an access valve 12 regardless of the longitudinal position of the previously described swing arm length adjuster 30 as indicated by the extreme positions shown in FIGS. 4A and 5. The aforementioned valve actuator 29 (FIG. 10) has features that allow rotation between the coupler body 24 and a stationary access valve 12 when the coupler body 24 is connected to the access valve 12. Consequently, the swing arm 16 may rotate when the valve coupler 19 is connected to a stationary access valve 12.

Figure 15:
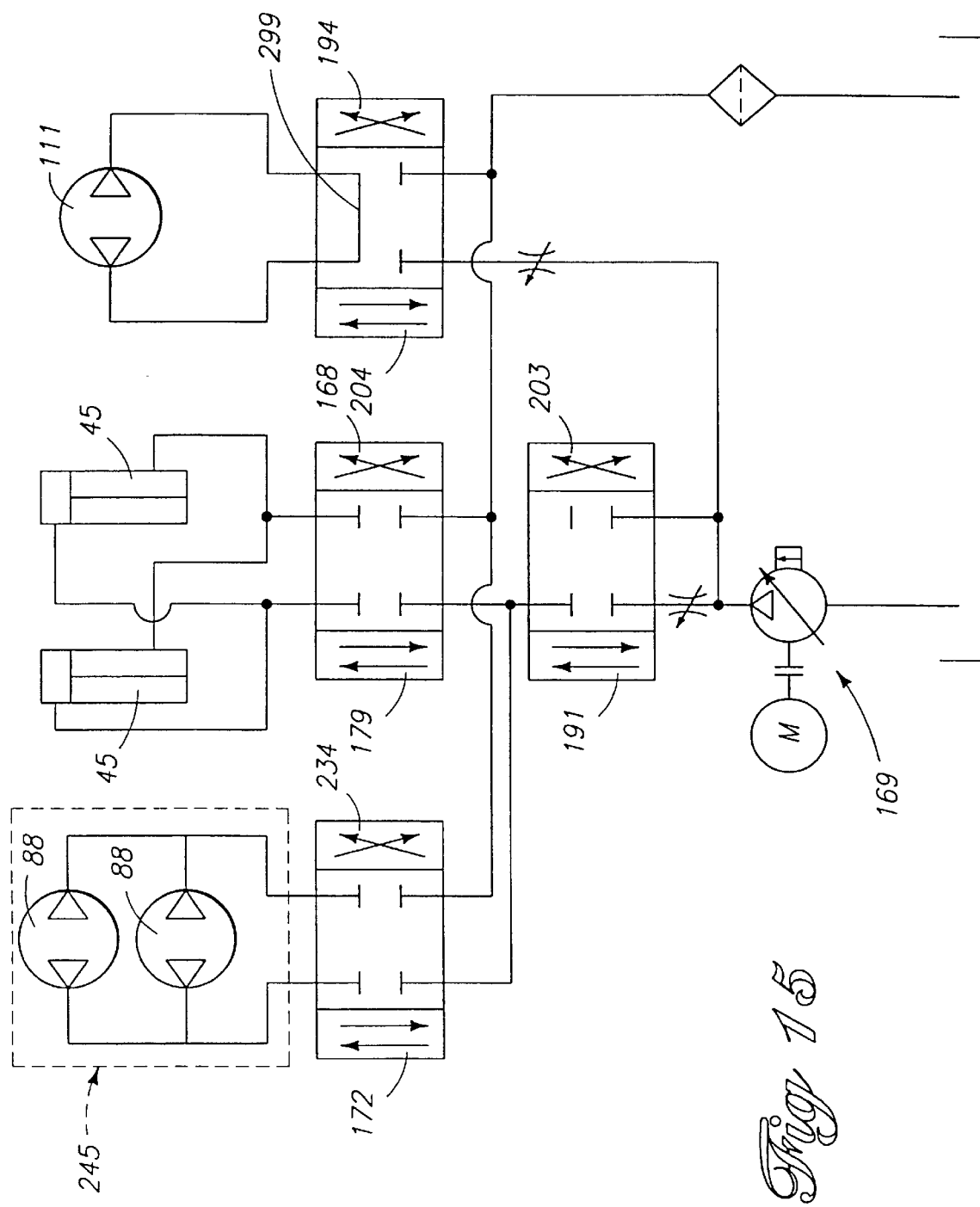
FIG. 15 is a flow chart for various components of a hydraulic system of the present invention.
Figure 16B:
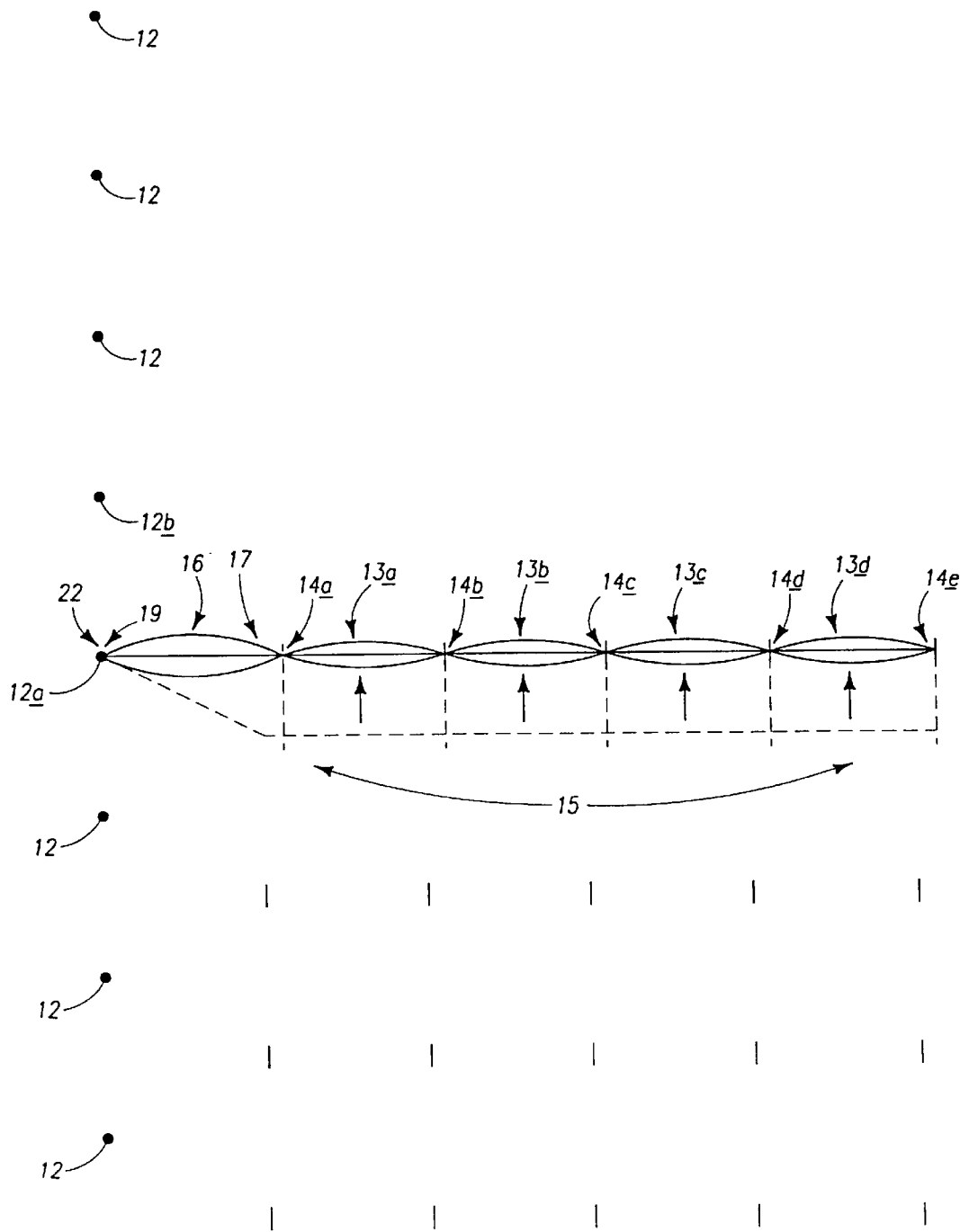
Figure 166:
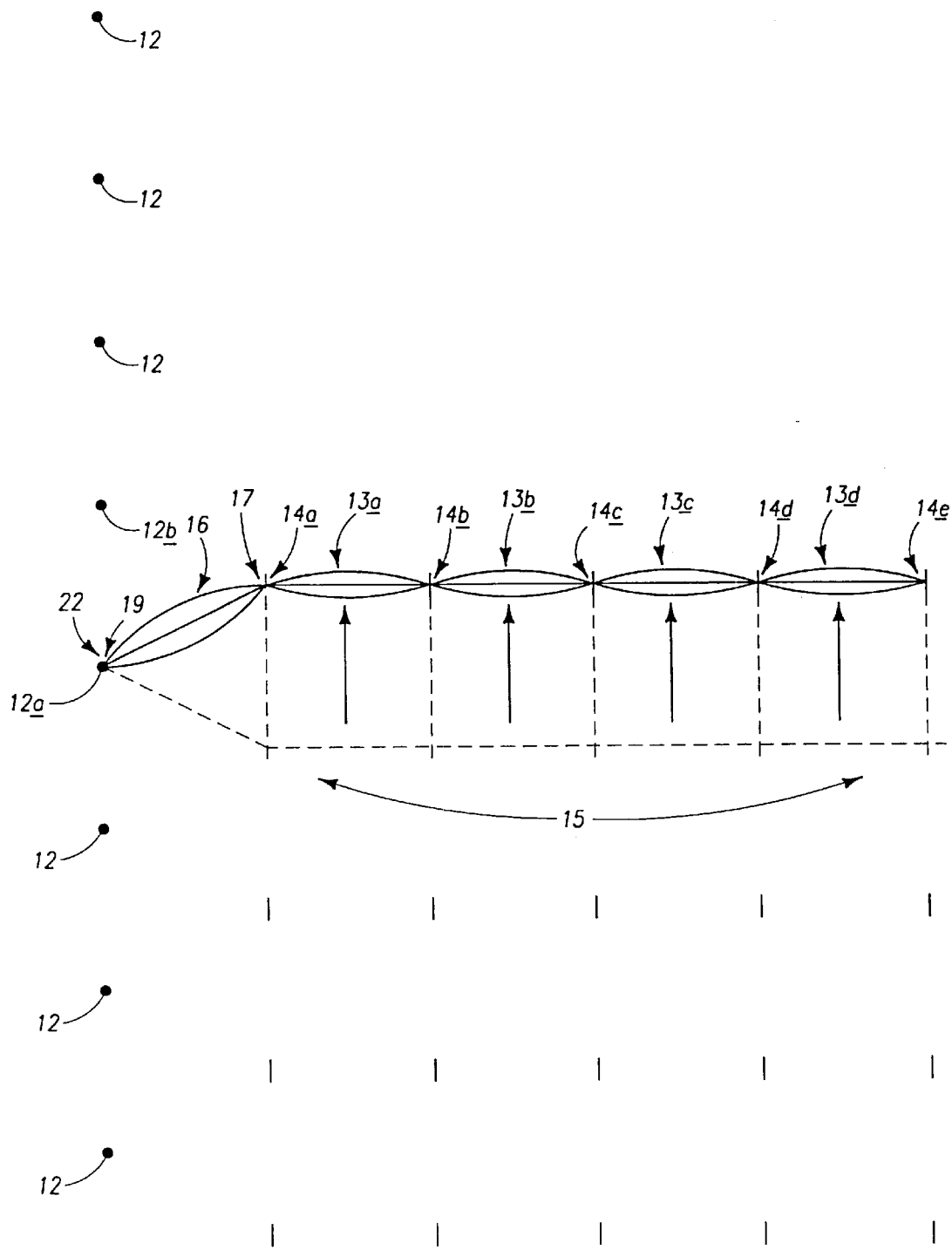
Figure 16D:
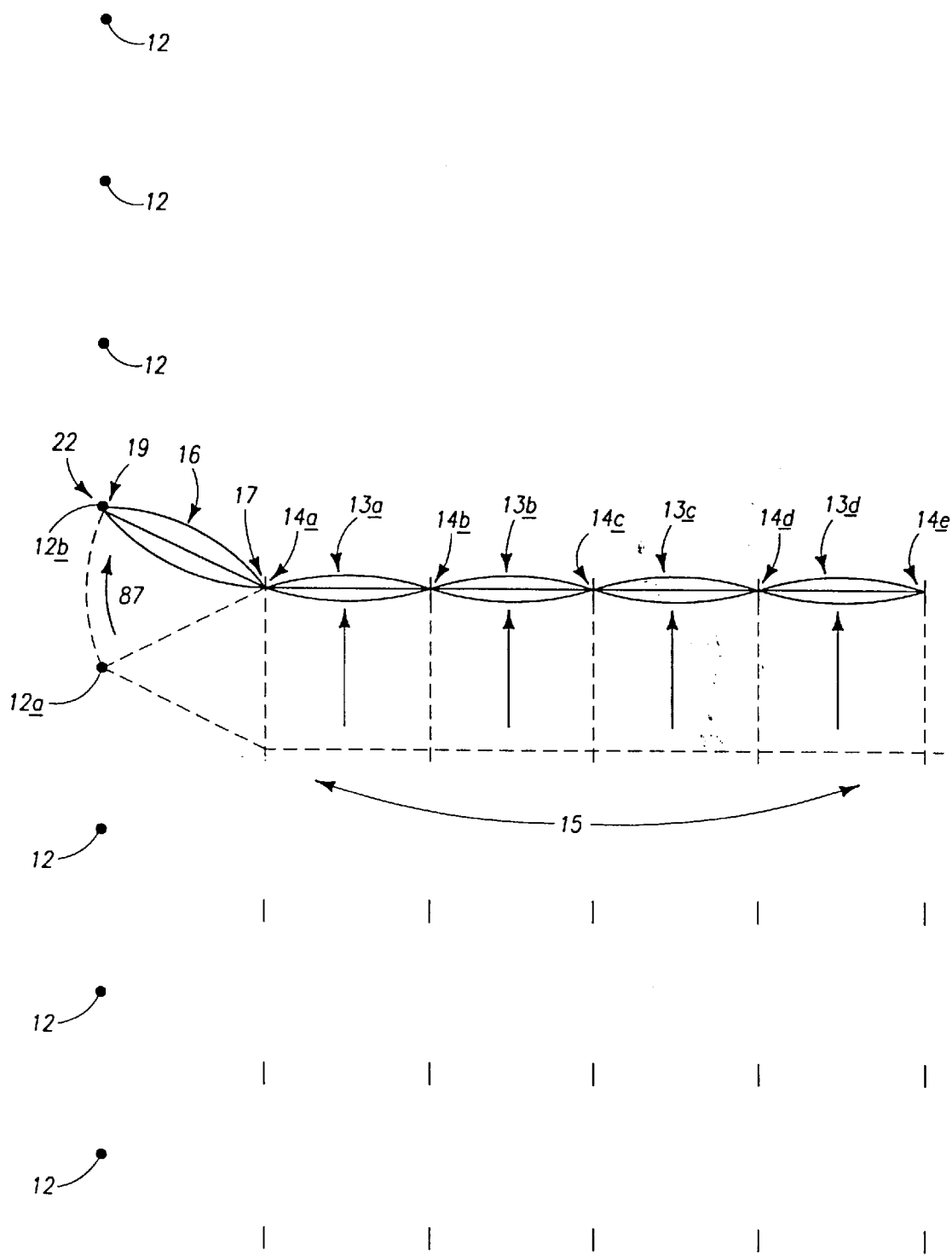

In a fully lowered position, as shown in FIGS. 1 and 1A, the previously mentioned transport wheels 21 may be rolled along the ground surface as part of a transporter 22 for transporting the swing arm outer end with the valve coupler 19 and swing arm length adjuster 30 mounted thereon between successively connectable access valves 12 as indicated by curved arrow 87 shown in FIG. 16D. Transporter 22 includes two hydraulic wheel motors 88 each mounted to the free end of transport wheel legs 20 as shown in FIG. 1A. A wheel hub 89 mounts the output shaft of each wheel motor 88 with a transport wheel 21 bolted to each wheel hub 89 as shown in FIG. 1. Hydraulic wheel motors 88 are plumbed in parallel. When no oil is flowing to motors 88 from a pressure device 169, parallel plumbing 245 as shown in FIG. 15 enables oil to flow between the two motors 88 such that the motors are free to simultaneously rotate in opposite directions. Consequently, the coupler mounted end of the swing arm may remain stationary as the transport wheels 21 rotate slightly in opposite directions to compensate for the varying distance between them generated when transport wheels 21 are raised or lowered in contact with the ground surface.

A rail truss 125 may be incorporated to structurally tie rails 91 of the swing arm length adjuster 30 to each other and with the supply pipe 36 of the swing arm 16 as shown in FIGS. 1–6. Each rail 91 may be supported toward the center of its length by a frame crossbeam 25 bolted along the outside face of each rail 91 and extend outward to support leg pivots 26. Frame crossbeam 25 extends upward from leg pivots 26 to support hydraulic cylinder mounts 70a. Crossbeam 25 also extends perpendicular to and across rails 91, tying together the cylinder mounts 70a and also the rails 91. An upper strut 121 is bolted to crossbeam 25 near each of the two cylinder mounts 70a. Each upper strut 121 extends upward and inward and bolts to the supply pipe 36 as best shown in FIG. 5. A lower strut 52 is bolted to frame crossbeam 25 near each leg mount 26. Each lower strut 52 extends upward and inward and bolts to the supply pipe 36. A basebeam 123 extends perpendicular to the length of rails 91 and is bolted to the ends of rails 91 tying them together. Basebeam 123 extends outward beyond the ends of rails 91 to a length similar to the length between leg mounts 26. Struts 239 (shown in FIGS. 6 and 12) extend between the ends of basebeam 123 and supply pipe 36. Struts 139 tie in to supply pipe 36 adjacent to the tie-in of Struts 52 and struts 121. A compression truss 249, shown in FIGS. 6 and 12, extends between the ends of basebeam 123 upward and ties in to a support truss 104a of swing arm supply pipe 36.

A rail overhang 275 serves as part of the swing arm length adjuster 30 to extend the length of the swing arm length adjuster 30 as shown in FIGS. 1A and 2A. Crossbeam 25 is configured to allow the trolley 39 as well as a portion of swing pipe 110 to pass underneath and outward beyond crossbeam 25 to a remote outer end of rails 91. Rails 91 are thus extended well beyond crossbeam 25. Consequently, the apparatus weight may be concentrated toward the inward end of the rails 91, reducing the cantilevered weight force when the trolley 39 is toward the inner ends of rails 91, as shown in FIG. 5, and the entire apparatus is ground supported by support wheels 27 as shown. (Rails 91, crossbeam 25 and legs 20 are constructed out of aluminum to further reduce the cantilevered weight force.) In addition to enabling the trolley 39 to travel outward of crossbeam 25, the rail overhang 275 including crossbeam 25 supports the transporter 22 which enables access valves 12 to pass between the transporter 22 and the outer end of the swing arm length adjuster 30 during operation of the transporter 22 for carrying the valve coupler 19 between access valves 12. (Crossbeam 25 functions as part of rail overhang 275 as well as part of rail truss 125.) Crossbeam 25 is supported by strut 121 and strut 52 to maintain the crossbeam 25 rigid despite rotation forces introduced by the configuration of transport wheels 21 and wheel legs 20.

Figure 12:
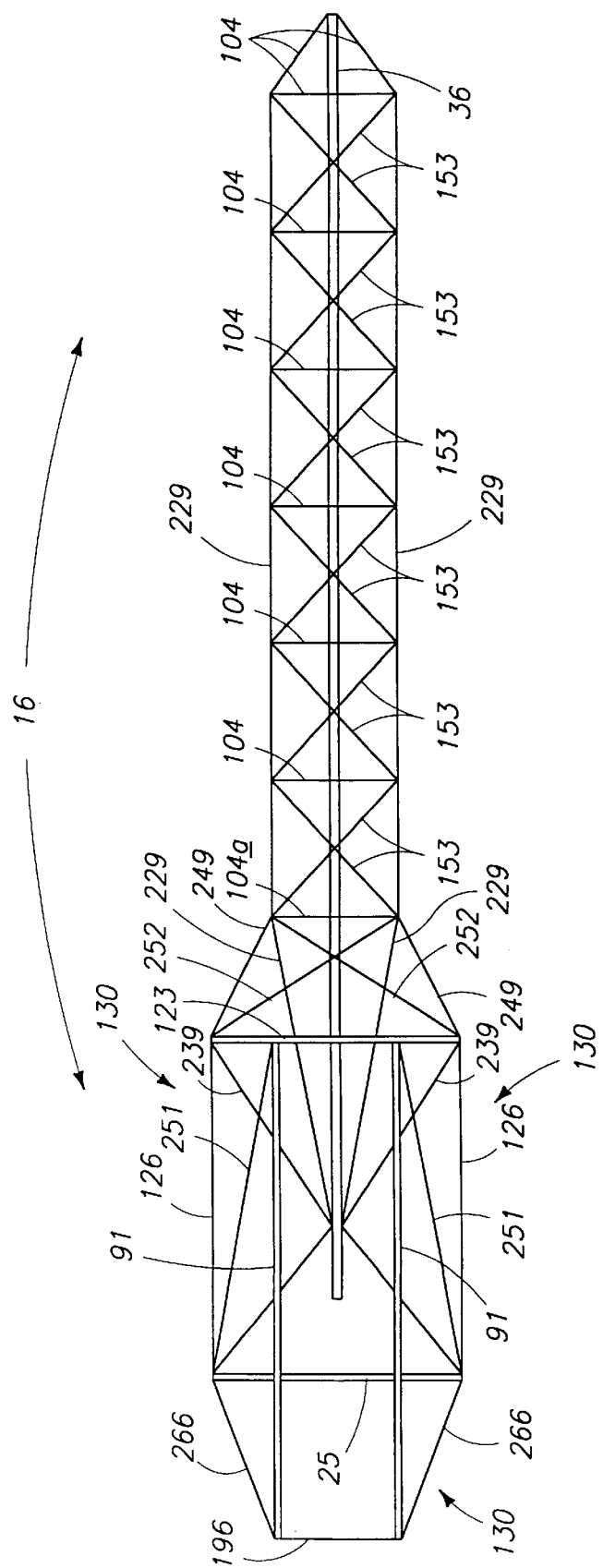
FIG. 12 is a fragmented bottom plan view showing a sway inhibitor with portions of the remaining structure removed for clarity.

A sway inhibitor 130 can be part of swing arm length adjuster 30 and can be part of swing arm 16. Inhibitor 130 affixes to rail truss 125 and rail overhang 275 (FIG. 12). Inhibitor 130 helps provide rigidity to adjuster 30 in a substantially horizontal plane, thus helping maintain rails 91 configured rectangularly relative to each other. Basebeam 123 is bolted along the inner ends of rails 91 and extends outward beyond each rail end to a length similar to that found between the leg pivots 26. Sway struts 126 are bolted between crossbeam 25 near leg pivots 26 and the ends of basebeam 123. Other sway struts 251 extend between crossbeam 25 near leg pivots 26 and the basebeam ends of rails 91. End sway struts 266 extend between crossbeam 25 near leg pivots 26 and end beam 196. End beam 196 extends between the outer ends of rails 91.

A swing pipe 110 can be utilized to operably flow water between coupler body 24 and supply pipe 36 (FIGS. 1–6). Swing pipe 110, which can be part of adjuster 30, acts as a pivotable link between coupler body 24 linearly traveling along the length of adjuster 30 and supply pipe 36, pipe 36 stationary relative to the travel of coupler body 24. Swing pipe 110 includes S-link pipe 131 which consists of a length of water conduit with a female coupling 132 fitted to one end to be secured to a male coupling 133a (inside of female coupling 132) fitted to supply pipe end box 134 with supply pipe end box 134 welded to the outer end of supply pipe 36. The remaining end of S-link pipe 131 is fitted with a male coupling 133 secured and inside of a female coupling 132 fitted to one end of a C-link pipe 139. C-link pipe 139 consists of a length of water conduit with female couplings 132 fitted to both ends. The end of C-link pipe 139 opposite to the end secured to S-link pipe 131 is secured to a male coupling 133b fitted to the side of coupler body 24, positioned horizontally and protruding in the same direction as male coupling 133a.

Figure 19:
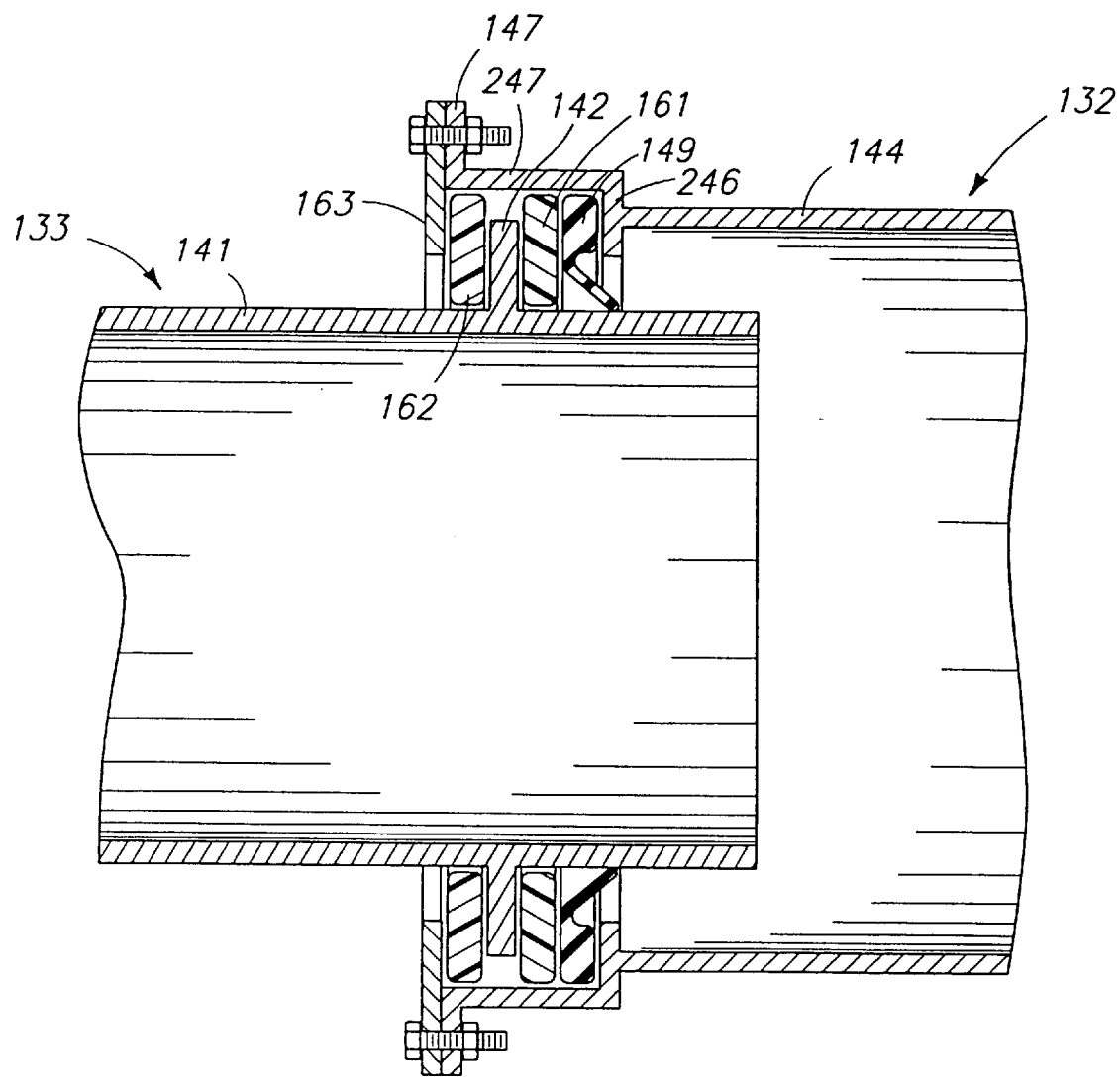
FIG. 19 is an enlarged fragmentary sectional view of a swing pipe pivotable connection taken on line 19—19 of FIG. 1.

All three male couplings 133 are basically identical consisting of a short length of pipe 141 with a ring 142 welded along the pipe length as shown in FIG. 19. All three female couplings 132 are identical, consisting of a pipe length 144 roughly as long as pipe 141. A ring 246 is welded to the outer end of pipe 144. Ring 246 has an internal diameter smaller than the internal diameter of the pipe 144 and also smaller than the external diameter of ring 142. A pipe 247 is welded to the outside diameter of ring 246. Pipe 247 has an internal diameter slightly larger than the external diameter of ring 142 so that ring 142 may be fitted inside pipe 247. A flange 147 with an internal dimension slightly larger than the diameter of pipe length 247 is welded to the outer end of pipe length 247. A two piece retaining ring 163 bolts to flange 147 for securing ring 142 in the cavity formed between retainer 163 and ring 246. A swing pipe seal 149 is fitted in the cavity and butts up against ring 246. A washer bearing 161 of nylon or another appropriate material resides between the face of seal 149 opposite ring 246 and a face of ring 142. A two piece washer bearing 162 also of nylon or another appropriate washer/bearing material resides between the other face of ring 142 and the face of retaining ring 163. Retaining ring 163 bolts to flange 147 securing female couplings 132 with male couplings 133. Washer bearings 161 and two piece washer bearings 162 offer a bearing surface for rotation between male coupling 133 and female coupling 132. Two piece washer bearing 162 also serves to accommodate water pressure in the swing pipe 110 which acts to expand the secured couplings and thus forces the face of ring 142 and the face of two piece retaining ring 163 against two piece washer ring 162. Additionally, paired couplings require a degree of travel perpendicular to their axis of rotation to allow full travel of the valve coupler adjuster 35. Washer bearings 161 and 162 are adequately sized to permit a limited degree of travel between male couplings 133 and female couplings 132 as required for operation of the valve coupler adjuster 35.

Swing pipe 110 is configured so that S-link pipe 131 and C-link pipe 139 reside predominantly toward the pivot 17 and travel in a substantially vertical plane during utilization of the swing arm length adjuster 30. Swing pipe 110 could also be configured so that S-link pipe 131 and C-link pipe 139 reside predominately away from pivot 17. C-link pipe 139 would then be positioned mostly horizontal and S-link pipe 131 would be positioned mostly vertical when coupler 24 is oriented along the swing arm length adjuster 30 as shown in FIG. 5. (This configuration would require modification of the structure supporting transport wheels 21 corresponding with modification required to crossbeam 25.) Configuring swing pipe 110 toward pivot 17 reduces the cantilevered weight force on various structural members resulting from the weight (including water) of swing pipe 110 when positioned toward the inner end of the swing arm length adjuster 30 as shown in FIG. 5. Swing pipe 110 could also be configured to travel in a substantially horizontal plane requiring structural modification to the swing arm length adjuster 30.

The pivot 17 as shown in FIGS. 11, 13, 16AA, 16B, 16C and 16D, and as shown best in FIG. 13 includes a universal pivot 154a mounted between the swing arm supply pipe 36 of swing arm 16 and a first delivery pipe span 13a of the water delivery pipe assembly 15. Universal pivot 154a incorporates a ball 164 attached to supply pipe 36 and seated in a ball socket 159. Ball socket 159 is mounted to first delivery pipe span 13a. Universal pivot 154a allows vertical angular movement between the swing arm supply pipe 36 and the first delivery pipe span 13a of the water delivery pipe assembly 15 as required to accommodate elevational variation in the terrain. Universal pivot 154a also allows horizontal angular movement between the trussed water supply pipe 36 and the first delivery pipe span 13a. Horizontal angular movement is required when the transporter 22 is utilized to transport the valve coupler 19 between access valves 12 and also as required when the water delivery pipe assembly 15 travels straight forward with the coupler body 24 connected to an access valve 12. Horizontal angular movement is further required to maintain the supply pipe 36 and first span 13a directionally aligned during operation of the delivery pipe rotator 103.

Lateral move water delivery pipe assembly 15 requires movable carts 14 mounted at both ends of one trussed delivery pipe 13 along water delivery pipe assembly 15 so that both ends of all delivery pipes will by [be?] movably ground supported. Middle delivery pipe span 13c serves this purpose as shown in FIG. 11. Middle delivery pipe span 13c is similar to delivery pipes 13 of water delivery pipe assembly 15 except that movable carts 14c and 14d are mounted at ends of pipe span 13c instead of just one end as is common to the remaining delivery pipes 13 along water delivery pipe assembly 15.

Water delivery pipes 217 and swing arm supply pipe 36 utilize truss rods 229 (FIGS. 6, 11, 12 and 13) stretched along the bottom of a series of support trusses 104 for the purpose of elevationally supporting each of the pipes 217 and 36 by tensioning truss rods 229 so as to constitute a trussed pipe span. Compression truss 249 ties into the swing arm 16 along the bottom of a support truss 104a and extends downward and outward with the other end of truss 249 mounted to the ends of basebeam 123. When the coupler body 24 approaches the position as shown in FIG. 5, significant weight from the transporter 22, swing arm length adjuster 30 and valve coupler 19 is cantilevered outward of the ground support of support wheels 27. Compression truss 249 serves to support the counterbalance of said cantilevered weight with the weight of the swing arm 16, subsequently placing compression truss 249 in a compression force.

Also a component of the aforementioned sway inhibitor 130, compression truss 249 incorporates cross members 252 (FIG. 12) to establish great strength in that plane to prevent sway between the basebeam 123, and thus the rail truss 125, and the swing arm 16. In addition, cross struts 153 (FIG. 12) are bolted between support trusses 104 (FIGS. 12 and 13) of the swing arm supply pipe 36 to further eliminate sway in the swing arm 16 and subsequently the rail truss 125.

An elevationally adjusting underboom 255 as shown in FIG. 13 serves to provide precision water application for most crop heights to the cropland underneath the swing arm 16. Adjusting underboom 255 includes an underboom 260. Underboom 260 includes an underboom supply pipe 256. Supply pipe 256 is supported along its length by a support truss 257 offering elevational rigidity to the supply pipe 256.

Elevationally adjusting underboom 255 also includes an elevation adjuster 265. Elevation adjuster 265 includes pivots 253 located between support truss 257 and the first cart 14a of water delivery pipe assembly 15. Pivots 253 enable underboom 260 to be pivoted up or down consequently raising or lowering the end of underboom 260 remote from pivots 253. A cable 254 is attached along supply pipe 256 and extends around a pulley 258 mounted to cart 14a and attaches to swing arm supply pipe 36. The, elevation adjuster 265 provides to maintain the supply pipe 256 a similar distance below swing arm supply pipe 36 regardless of varying elevation at the coupler mounted end of the swing arm, at cart 14a or at cart 14b. Maintaining supply pipe 256 elevationally close to supply pipe 36 enables consistent and thus much greater ground clearance.

The connector 18 and subsequently the water delivery pipe assembly utilize a control system 150 to actualize operation of the present system. The various electrical components and the relationship between them are illustrated in the control diagram as shown in FIG. 14. Hydraulic components and the relationship between them are illustrated in the flow chart as shown in FIG. 15.

Control system 150 includes programmable logic controller 160 hereafter referred to as plc 160. Plc 160 may be comprised of commercially available components arranged to interpret signal impulses and, according to the appropriate programmed response, initiate or stop operation of various electrically controlled components over selected time periods. Plc 160 includes logic 170 as the means to store the programmed information utilized for providing automated and sequential operation. Logic 170 is a commercially available component.

A power source provides the electricity to power the drive 10 of the water delivery pipe assembly 15 and the control components shown in FIG. 14. The power source may include a diesel generator 243 mounted to one of the movable carts 14a (FIG. 13). Alternately, electricity may be produced by a generator driven by a water powered motor. The water motor would be hydraulically connected to the water delivery pipe assembly 15 or the connector 18.

Describing operation of the present invention may best begin when the water delivery pipe assembly 15 and connector 18 are positioned as shown in FIG. 16A. (The dashed lines in FIGS. 16A–16D and 17A–17D illustrate previous positions of the connector 18 and the water delivery pipe assembly 15 where operational changes occur and also illustrate the paths traveled by the movable carts 14 preceding the present position shown.) The water delivery pipe assembly 15 has previously been applying water while traveling forward along the water main 11 and is now situated somewhere between ends of the field being irrigated. As shown in FIG. 16, valve coupler 19 has just been forwarded from a previous connection to an access valve 12 and has now been again connected along the series of access valves 12 to access valve 12a.

The valve coupler 19, when connected to access valve 12a, has subsequently opened the access valve 12a allowing the pressurized water in water main 11 to flow into and through the connector 18, through water delivery pipe assembly 15 and finally on to the ground surface. Subsequent to valve opening, the transport wheels 21 are further raised, now off of the ground, until triggering the leg up limit switch 205, having assumed a position similar to that shown in FIGS. 4, 4a and 5. In accordance with the triggering of leg up limit switch 205, plc 160 begins operation of drive motors 152 and 157 in response to input pulses from percentage timer 156.

Percentage timer 156 is a commercially available and conventionally employed component providing manually adjustable control for selectively prescribing the amount of water applied when the water delivery pipe assembly 15 traverses and subsequently irrigates a field. Percentage timer 156 accomplishes this by dictating the rate of simultaneous forward travel at movable carts 14a and 14e. Movable carts 14a and 14e are powered by drive motors 152 and 157, respectively. Drive motors 152 and 157 typically have only one forward speed. Consequently, percentage timer 156 dictates the rate of forward travel by regulating the percentage of time drive motors 152 and 157 operate. For example, percentage timer 156 might be manually set to power the motors 152 and 157 for ten seconds and then discontinue power for twenty seconds. Maximum operation time of drive motors 152 and 157 results in a minimum amount of water applied. More water is applied when the drive motors 152 and 157 are operated less percentage of the time.

When movable carts 14a and 14e (FIGS. 11 and 16A) simultaneously travel forward, the angular alignment between the first span 13a and the second span 13b as well as the angular alignment between span 13c and last span 13d along water delivery pipe assembly 15 will be altered because movable carts 14b and 14d remain stationary. The altered alignment is detected by means typical to the industry which operates the drive motors 158 of drive 10 to forwardly move the movable carts 14b and 14d. Movable carts 14b and 14d travel forward until first span 13a and second span 13b as well as span 13c and span 13d are once again in linear alignment at which points the drive motors 158 are independently switched off. The same means of control is employed for maintaining linear alignment along the lengths of trussed water delivery pipe 13 of the water delivery pipe assembly 15. Consequently, simultaneous forward travel of movable carts 14a and 14e initiates subsequent similar forward travel of all remaining movable carts 14 of the water delivery pipe assembly 15 and is commonplace to the industry.

As water delivery pipe assembly 15 travels, a guidance system is required to maintain delivery pipe assembly 15 at a constant distance from water main 11. At least three guidance systems are commercially available and commonplace to the industry at present. However, the unique operation of connector 18 of the present invention provides a novel and far less expensive way to maintain the water delivery pipe assembly 15 traveling in a path that is substantially parallel to water main 11.

Delivery pipe navigator 210 (FIG. 14) includes a straight line determiner 295. Straight line determiner 295 utilizes plc 160 to interpret information from the swing arm length measuring device 208 and consequently from trolley encoder 115 to determine the distance between a point on water delivery pipe 15 and water main 11. Utilizing plc 160, navigator 210 compares the distance determined by straight line determiner 295 with a given preferred distance between the point and the water main. Navigator 210 then initiates small adjustments in the travel direction of delivery pipe 15 to keep the path of the delivery pipe 15 substantially parallel to the water main 11.

If the information from straight line determiner 295 indicates that delivery pipe 15 has moved too close or too far away from water main 11, navigator 210 will act by halting operation of drive motor 157 of movable cart 14e or drive motor 152 of movable cart 14a (FIG. 11). Operation of drive motor 152 or drive motor 157 is halted for a determined length of time with said time elapsing only while drive motor 157 or drive motor 152 is actually under power as dictated by plc 160 in accordance with the input from percentage timer 156 as previously discussed. (Straight line determiner 295 can also provide the same function by determining a distance between a point on delivery pipe 15 and an axis running parallel to the water main 11. Navigator 210 then compares the determined distance with a given preferred distance between the point and axis and, accordingly, adjusts the travel direction of delivery pipe 15. As an example, determiner 295 can determine the distance between a point on delivery pipe 15 and a laser beam, the laser beam running parallel to water main 11. The laser beam is situated to run transverse to the delivery pipe 15 such that sensors are mounted on the delivery pipe 15 and detect the laser beam when delivery pipe 15 is off-course. Navigator 210 then implements a course correction.) Delivery pipe navigator 210 can utilize plc 160 to interpret information from the swing arm length measuring device 208 in order to function as a travel direction determiner 270. Travel direction determiner 270 serves to determine the travel direction of delivery pipe 15. By utilizing the travel direction of delivery pipe 15 in combination with the distance determined by straight line determiner 295, navigator 210 can calculate and implement much more accurate adjustments to the travel direction of delivery pipe 15 compared with utilizing the distance determined by straight line dterminer 295 only.

As an example, navigator 210 is configured to utilize straight line determiner 295 and travel direction determiner 270. Upon coupler 19 first being connected to an access valve 12 (FIG. 16A), determiner 295 is utilized. The position measurement of coupler body 24 along rails 91 is read from trolley encoder 115 by plc 160 which then multiplies the measurement by a constant to obtain the component of the measurement substantially representative of a distance perpendicular from the water main 11 to the delivery pipe 15. (The delivery pipe is approximated to be positioned exactly half way between access valves and, therefore, a constant is employed).

Next navigator 210 utilizes travel direction determiner 270. Determiner 270 compares the present distance between the delivery pipe 15 and water main 11 and a previous determined distance between delivery pipe 15 and water main 11, the previous distance as measured by straight line determiner 295 when the delivery pipe 15 was previously positioned as shown in FIG. 16B. (Determiner 295 attains the previous determined distance by simply reading the trolley encoder 115. Because the swing arm 16 is substantially perpendicular to the water main 11, no multiplication by a constant is necessary.) The distance traveled by delivery pipe 15 between each position where a measurement is made by straight line, determiner 295 is approximated to be identical (approximately 51 feet of delivery pipe travel). Therefore, travel direction determiner 270 simply compares the present distance measured with the previous distance measured and derives a slope representative of the direction of the path the delivery pipe has traveled.

Lastly, navigator 210 compares the present distance measured by straight line determiner 295 with a given preferred distance between delivery pipe 15 and water main 11 and in doing so derives a preferred slope. Navigator 210 subtracts the preferred slope from the present slope to determine the change in travel direction required of delivery pipe 15. Navigator 210 then implements that change in travel direction.

The above example of navigator 210 incorporates the two discussed approximations to greatly simplify calculations and to more easily illustrate the workings of navigator 210. The disclosure below illustrates a like example of navigator 210 absent the two approximations. (The improvement in accurately guiding delivery pipe 15 through exact calculation versus employing the two approximations is mostly negligable.)

Figure 20A:
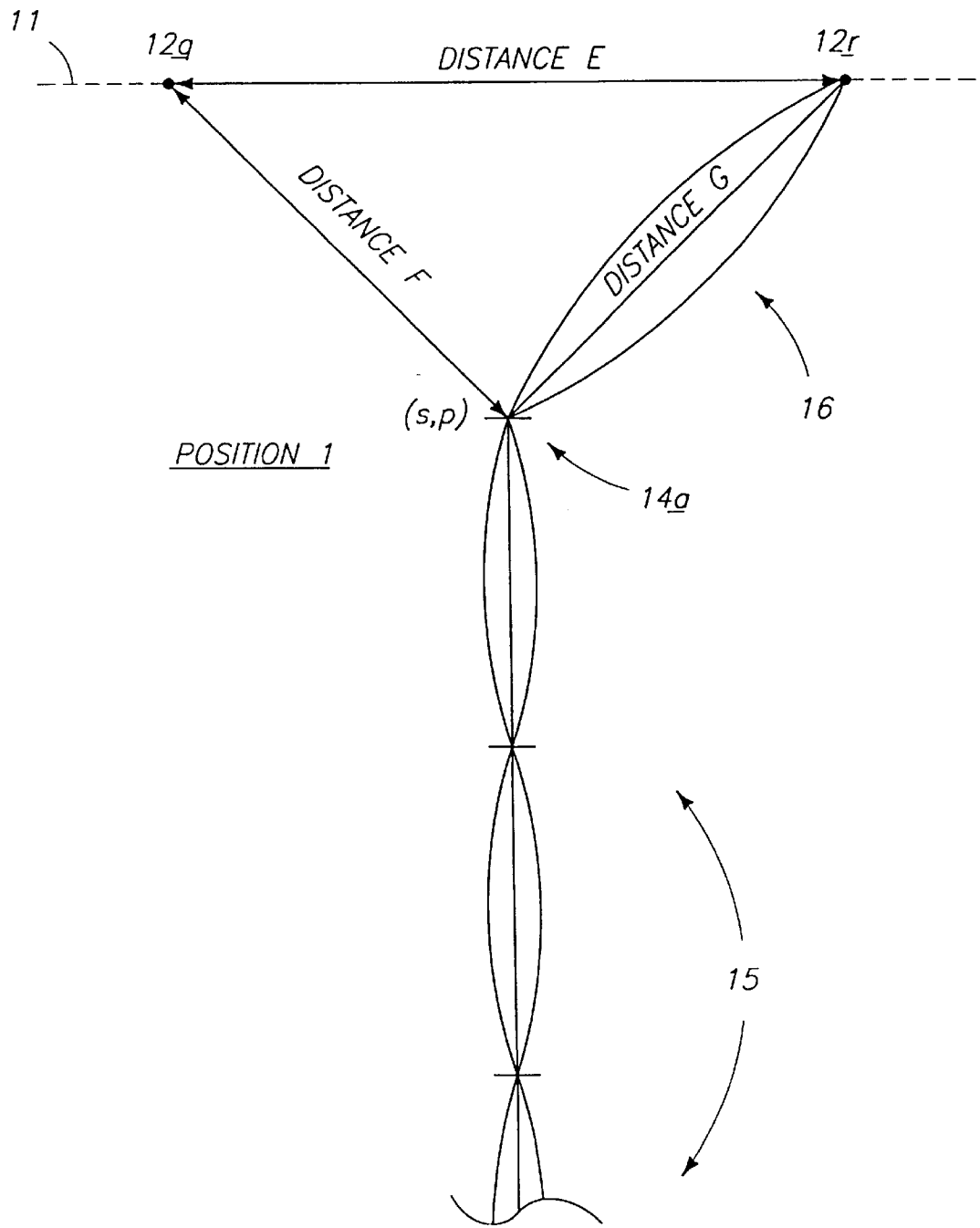

After making connection to the next forward access valve 12 as shown in FIG. 16A, plc 160 receives the position of trolley assembly 39 along rails 91 read from trolley encoder 115. Plc 160 then utilizes the reading from encoder 115 to calculate the relative geographic position of water delivery pipe assembly 15 or more specifically geographic coordinates for cart 14a. According to the geometric axiom, if the lengths of the three sides of a triangle and the coordinates of two of the comers are known, the third corner's coordinates can be determined. As shown in FIG. 20A, given the fixed locations of access valves 12q and 12r, the "Distance E" between the two access valves is known. The "Distance F" between access valve 12q and cart 14a is known because forward travel of cart 14a has been halted at a specified point in the extension of swing arm length adjuster 30. The present reading from encoder 115 translates a distance measurement "Distance G" between access valve 12r and cart 14a. Thus the length of all three sides of the triangle are known. Because access valves 12q and 12r are fixed, they may be assigned coordinates in an X-Y coordinate system and thus the coordinates of two of the three corners of the triangle are known. Therefore, plc 160 calculates the coordinates of the third comer of the triangle and thus the present coordinates of cart 14a (s,p). (Coordinate "p" represents the perpendicular distance from water main 11)

By establishing the exact coordinates of cart 14a, plc 160 may then subtract from these coordinates (s,p) a set of coordinates (f,g) which represent the position of cart 14a at the preceding geographic position where coordinates were derived and a travel direction adjustment may have been required. As shown in FIG. 20C, plc 160 subtracts from the coordinates of cart 14a (s,p) the coordinates (f,g) coordinates of cart 14a at the preceding geographic position where coordinates were derived. The difference between (f,g) and (s,p) represents the slope of a line D and thus the "Present Travel Direction" of the delivery pipe assembly 15. (The slope of a line is defined as the change in the Y coordinate divided by the change in the X coordinate.) At this time, plc 160 also subtracts the present coordinates (s,p) from preferred coordinates (j,k) that represent the optimum positioning of cart 14a (on the "Preferred Travel Path") for the next future position of cart 14a where coordinates would be derived and an adjustment in the travel direction may be required. The difference between coordinates (s,p) and (j,k) represents the slope of a line E and thus the "Preferred Travel Direction" of the delivery pipe assembly 15 in order to attain the preferred future positioning of cart 14a at coordinates (j,k) along the "Preferred Travel Path." Plc 160 then subtracts the "Present Travel Direction" (slope of line D) from the "preferred Travel Direction" (slope of line E) to obtain the change in travel direction (slope) required which could also be described as a "Course Correction."

Plc 160 then multiplies the "Course Correction" by a constant number to obtain a "Course Correction in Seconds of Operation." Plc 160 subsequently implements the appropriate "Course Correction in Seconds of Operation" to the delivery pipe assembly 15 to align the water delivery pipe assembly 15 to the "Preferred Travel Direction." Plc 160 adjusts the travel direction of water delivery pipe assembly 15 by halting operation of one of the drive motors 152 or 157 as previously discussed in the aforementioned procedure for making said adjustments. Whether the "Course Correction" is a positive or negative number will determine which of the operating drive motors 152 and 157 will be halted.

Utilizing an X-Y coordinate system and calculating the difference between line slopes is a precise way of incorporating straight line determiner 295 and travel direction determiner 270 to calculate course corrections. (For travel direction adjustments at the onset of an irrigation cycle, perhaps at a field end as shown in FIGS. 17A–17D, where no preceding distance from the water main coordinates are available, plc 160 makes travel direction adjustments according to only the "p" coordinate (distance from water main 11), as previously discussed, with somewhat less accurate results.

If the preceding course correction was implemented by halting operation of the outermost cart (while cart 14*a* remains in operation), a small compensation may be implemented to retain maximum precision when calculating the "Present Travel Direction." When course corrections involve halting the outermost cart, the delivery pipe 15 pivots about that cart in a path illustrated by dashed arc 315 in FIG. 20C. (Dashed arc 315 has been exaggerated for illustrative purposes.) Upon completing the course correction, operation of the outermost cart resumes and the delivery pipe 15 travels in a straight line to point (s,p), as shown by dotted line 316. Consequently, delivery pipe 15 will actually be headed at a slightly steeper slope away from the water main 11 than that calculated to be the "Present Travel Direction." Plc 160 may compensate for this slight error by multiplying the previous course correction by a constant number and then multiplying the calculated "Present Travel Direction" by that result to obtain the actual heading of delivery pipe 15.

Travel direction adjustments are preferably implemented at two positions of the water delivery pipe assembly 15 while the connector 18 is engaged to any given access valve 12. The two positions are distinct because at these positions two different sets of coordinates for the position of cart 14*a* are obtained. At these two positions, the swing arm length measuring device 208 and plc 160 are the only navigational hardware necessary to obtain the precise location of cart 14*a* and subsequently of water delivery pipe assembly 15. The first position and the derivation of the resultant coordinates has been previously discussed and is shown generally in FIG. 16A and specifically as "Position 1" in FIG. 20A. In "Position 1," coupling to access valve 12*a* has just taken place prior to any forward travel of delivery pipe assembly 15.

Figure 20B:
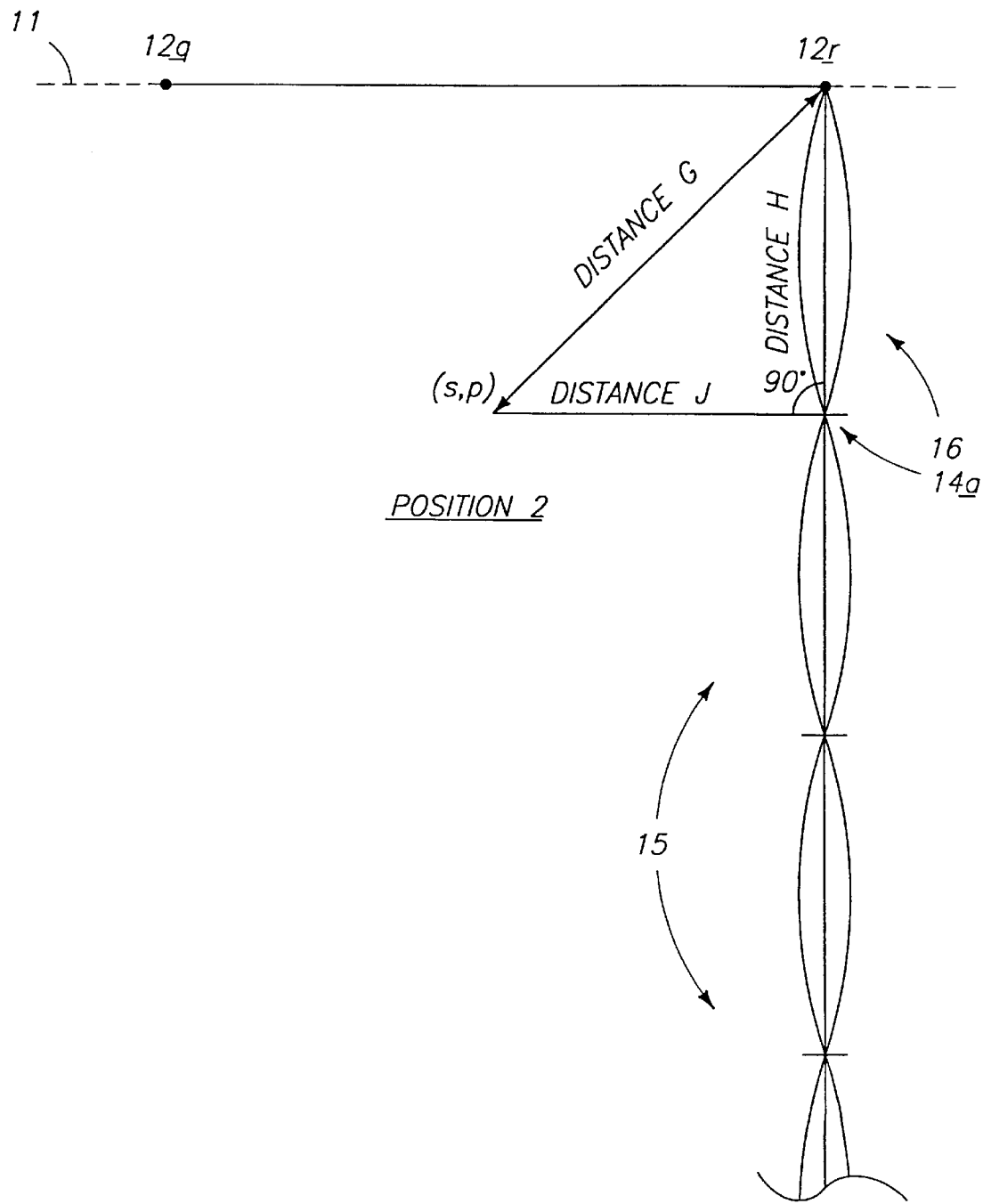
Figure 206:
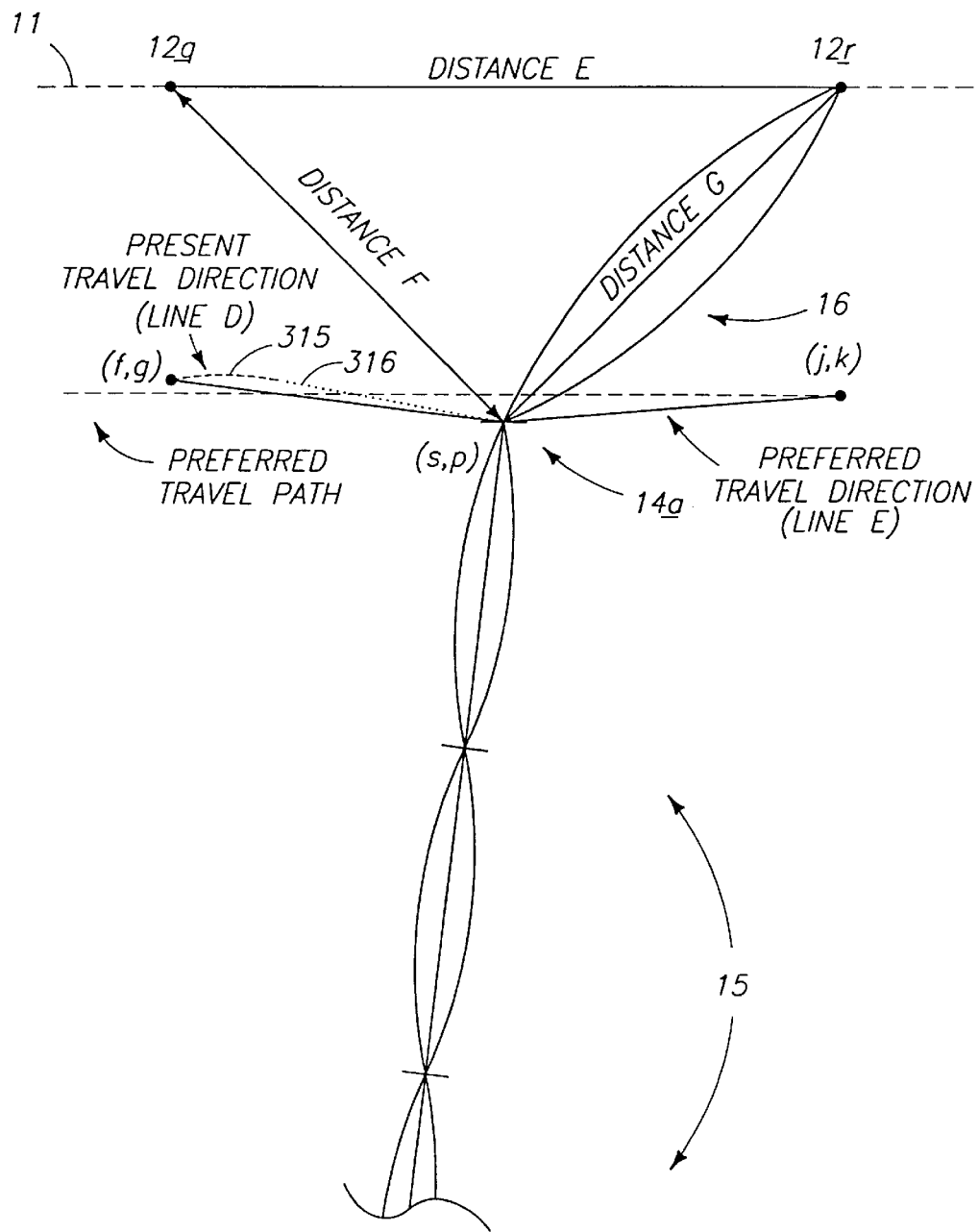

The second position is shown generally in FIG. 16B and is shown as "Position 2" in FIG. 20B. Here plc 160 may interpret information from swing arm length measuring device 208 and determine that delivery pipe assembly 15 has attained the closest proximity to an access valve 12. At this closest proximity, delivery pipe assembly 15 is exactly longitudinally aligned with the swing arm 16. Therefore, swing arm 16 will be exactly perpendicular to the travel direction of delivery pipe assembly 15. (Plc 160 may actually distinguish this positioning by recognizing the initial condition where the distance between delivery pipe assembly 15 and access valve 12*r* has just begun to increase again.) The distance between cart 14*a* and access valve 12*r* has been determined from the information supplied by encoder 115 of the swing arm length measuring device 208 and is shown in FIG. 20B as "Distance H." "Distance G" has already been supplied during the previous positioning where coordinates (s,p) were derived.

Given that the line representing "Distance H" is perpendicular to the travel direction of delivery pipe assembly 15 and thus perpendicular to a line between the present position of cart 14*a* and the previous position of cart 14*a* at coordinates (s,p), the length of this line designated "Distance J" may be calculated using the Pythagorean Theorem. Therefore, the lengths "Distance G," "Distance H" and "Distance J" have all been established. With the three lengths of the sides of the triangle known, and the coordinates of access valve 12*r* and the previous coordinates (s,p) of cart 14*a* also known, the coordinates of cart 14*a* in "Position 2 are calculated by plc 160. Subsequently the travel direction of delivery pipe assembly 15 may now be adjusted at "Position 2" according to the previously described procedure as shown in FIG. 20C.

Pivot angle measuring device 165 may measure the angular alignment between the swing arm 16 and the first span 13*a* of the water delivery pipe assembly 15 to alternately act as a travel direction determiner 270. However, this approach involves more hardware and is subject to inaccuracies related to misalignments along the delivery pipes 13 of the water delivery pipe assembly 15.

When the Water delivery pipe assembly 15 travels to the position shown in FIG. 16C, the trolley assembly 39 and coupler body 24 are located at the outward end of swing arm length adjuster 30, thus triggering the end-of-travel limit switch 212 to generate a signal. The signal from end-of-travel limit switch 212 instructs plc 160 to terminate operation of drive motors 152 and 157 as dictated by percentage timer 156. Forward travel of the water delivery pipe assembly 15 halts. (The signal from end-of-travel limit switch 212 may also indicate to zero trolley encoder 115, providing to maintain accuracy of encoder 115 if encoder 115 is of the incremental variety. Alternately, usage of an absolute type encoder may eliminate the need for limit switch 212.) Plc 160 now controls the connector 18 according to logic 170, to operate the valve coupler 19 and transporter 22. This is done in order to disconnect and transport the coupler body 24 across the ground to a position above the next access valve 12*b* as shown in FIG. 16D.

Just prior to actuation of limit switch 212, plc 160 may interpret the trolley position along tracks 91 according to trolley encoder 115 and initiate the closure of main water valve 280. Main water valve 280 may be a commercially available bladder type or butterfly type opening and closing water valve. Main water valve 280 may be configured to close at a slow rate over a time period around 45 seconds and to open more quickly as is preferable to commune with a typical water supply main pump 184 (FIG. 18).

Responsive to the triggered end-of-travel limit switch 212 and upon receiving a signal from a water pressure sensor 285 indicating that main water valve 280 has completely closed, plc 160 begins disconnection from access valve 12*a* by powering electrically actuated down solenoid 168 and by switching on the fast speed solenoid 203. With the down solenoid 168 actuated, the pressure side of a hydraulic pressure device 169 is connected to the set of hydraulic cylinders 45 (FIG. 15). Hydraulic pressure device 169 includes commonly available electrically powered pump and tank means for supplying fluid under pressure for operation of the hydraulic cylinders 45. The fluid from pressure device 169 serves to extend hydraulic cylinders 45. Extending hydraulic cylinders 45 lowers the transport wheel legs 20 along with transport wheels 21 and consequently raises the valve coupler body 24. When transport wheels 21 contact the ground and coupler body 24 begins to raise, that movement is detected by secondary limit switch 60 as part of vertical position measuring device 50. Plc 160 interprets the signal from limit switch 60, halts operation of down solenoid 168 and checks whether either coupler right limit switch 206 or coupler left limit switch 195 are actuated indicating that the coupler body 24 is not centered along the valve coupler adjuster 35. Actuated coupler switch left 195 or actuated coupler switch right 206 instruct plc 160 to power wheel motors 88 of transport 22 in the necessary direction via forward solenoid 172 or reverse solenoid 234 in unison with medium speed solenoid 191 to deactuate valve coupler adjuster 35. When either coupler switch left 195 or coupler switch right 206 is no longer actuated, plc 160 resets to zero the distance measured by pivot angle encoder 190. (The centering of coupler body 24 along coupler adjuster 35 slightly improves the accuracy of the ensuing measurement of the distance between access valves as measured by pivot angle encoder 190 in the utilization of access valve locator 48 as shown in FIGS. 13 and 14.) Plc 160 then switches off the just activated forward solenoid 172 or reverse solenoid 234 as well as medium speed solenoid 191 and switches on fast speed solenoid 203 and reactivates down solenoid 168. The swing arm outer end now raises at full speed until a leg down limit switch 216 triggers telling plc 160 that the swing arm outer end is fully raised off of the access valve. Plc 160 then switches off down solenoid 168.

When hydraulic cylinders 45 are fully extended, the connector 18 is positioned similar to the position shown in FIG. 1 except that the valve coupler 19 will be in a mostly vertical alignment with the access valve 12.

With the transport wheels 21 in the lowered position, the transporter 22 is operated by plc 160 which now actuates forward solenoid 172 to power the drive motors 88 in a forward direction. Fast speed solenoid 203 remains in operation from its use during the previous operation of lowering the transport wheels 21. Drive motors 88 power the transport wheels 21 in order to forwardly move the swing arm outer end with the valve coupler 19. The swing arm outer end moves along the ground in an arc path as indicated by arrow 87 shown in FIG. 16D about pivot 17 (FIGS. 11 and 13). (If delivery pipe 15 is traversing the field in the direction opposite that shown, plc 160 will actuate reverse solenoid 234 in place of forward solenoid 172 to move the swing arm outer end in the reverse direction between access valves.)

Coinciding with initiating forward travel, plc 160 also switches on trolley-in-solenoid 204. Consequently, trolley assembly 39 travels toward the inner end of rails 91. Trolley travel continues until positioned along the tracks as shown in FIG. 1A where position information from trolley encoder 115 instructs plc 160 to switch off trolley-in-solenoid 204. The trolley assembly 39 and in particular detector plank 41 are now appropriately positioned to detect the next access valve 12b.

Arc travel of the swing arm outer end continues at a speed approaching the capacity for the associated structure, around 2 miles per hour, until plc 160 interprets the change in angle as registered by angle encoder 190 to be such that the next access valve 12b is close ahead. In response, plc 160 switches off fast speed solenoid 203 and switches on medium speed solenoid 191. Consequently, drive motors 88 operate at a much slower r.p.m. and forward travel of the swing arm outer end is reduced to around 0.5 miles per hour in anticipation of stopping travel.

Arc travel of the swing arm outer end continues at the medium speed forward rate until plc 160 interprets the change in angle as registered by angle encoder 190 to be such that the detector plank 41 is now positioned directly above access valve 12b. In response, plc 160 switches off forward solenoid 172 and retains activation of medium speed solenoid 191, in anticipation of the next ensuing procedure. Subsequently the drive motors 88 stop operating. When drive motors 88 stop operating, forward travel of the swing arm outer end also stops.

(The distance between access valve 12a and access valve 12b may typically be 102 feet as would then be the distance between any two successive access valves 12 along water main 11. Sixty feet is the maximum distance available for the only commercially available automated connector lateral move irrigator.)

The valve coupler 19 is now positioned similar to the position shown in FIG. 1, and the connector 18 and water delivery pipe assembly 15 are positioned as shown in FIG. 16D. In further response to the change in pivot angle as registered by the pivot angle encoder 190, plc 160 switches on up-solenoid 179. The up-solenoid 179 connects hydraulic cylinders 45 to the intake side of hydraulic pressure device 169 causing hydraulic cylinders 45 to retract and subsequently cause transport legs 20 with transport wheels 21 to be pivoted upward. The upward pivoting legs 20 and transport wheels 21 cause the swing arm outer end including valve coupler body 24 to move in a downward direction. The swing arm outer end is lowered until valve detector plank 41 makes contact with the top edge of access valve 12b as is indicated by detector plank limit switch 42, functioning as vertical position measuring device 50 and valve detector 40 as shown in FIGS. 2, 2A and 14. Responsive to limit switch 42, plc 160 acts to switch off up-solenoid 179 and as a result hydraulic cylinders 45 stop retracting and the swing arm outer end ceases to lower and is positioned as shown in FIGS. 2 and 2A.

Valve coupler 19 is now vertically positioned to utilize the access valve catcher 135 (FIGS. 7–9). In further response to the actuation of detector plank limit switch 42, plc 160 now switches on trolley out solenoid 194. Subsequently trolley motor 111 operates to propel trolley assembly 39 including coupler body 24 and "v"-configured catcher 137, outwardly along rails 91 as part of the above-described access valve catcher 135. Outward travel continues until access valve body 97 triggers catcher limit switch 140 as part of horizontal position measuring device 145 (FIG. 14). Outward travel further continues until both plastic pads of "v"-configured catcher 137 are in contact with valve body 97. Plc 160 maintains active out-solenoid 194 to maintain contact between "v"-configured catcher 137 and access valve body 24 which serves to maintain plastic alignment cone 85 appropriately positioned directly above access valve body 97 (FIGS. 3 and 3A) and hold plastic cone 85 vertically aligned with coupler body 24 during further lowering of coupler body 24.

Plc 160 responds to activated catcher limit switch 140 by switching on up-solenoid 179 (medium speed solenoid 191 remains on). Consequently hydraulic cylinders 45 retract and the swing arm outer end lowers until vertical position detector wheel 57 contacts pivot pad 167 and continues lowering until a signal from primary vertical position limit switch 59 of vertical position measuring device 50 (FIG. 14) indicates to plc 160 that the swing arm outer end has been sufficiently lowered so that the upper rim of access valve body 97 is well inside the cone cavity of plastic alignment cone 85. Plc 160 responds to the signal from primary limit switch 59 by switching off trolley out-solenoid 194 thus terminating pressurized oil flow to trolley motor 111. In an unpowered state, trolley motor 111 freewheels as allowed by an "open spool" configured valve body 299 as shown in the hydraulic circuit of FIG. 15. Thus trolley assembly 39 may be freely moved along rails 91 as required during alignment of coupler body 24 to valve body 97.

Activation of primary vertical position limit switch 59 also instructs plc 160 to open main water valve 280. Main water valve 280 then begins to open in anticipation of water flow from access valve 12b.

Downward travel of swing arm outer end including coupler body 24 and plastic cone 85 continues as cone 85 meets and mates with the upper rim of valve body 97 effecting to gradually center coupler body 24 directly over the upper rim of valve body 97, functioning as the valve coupler aligner 100 (FIG. 10). Lowering continues as coupler body 24 slides over valve body 97 effectively locking coupler body 24 to valve body 97, functioning as coupler lock 350 (FIG. 10). Downward travel continues and actuator 29 (FIG. 10) is utilized to open access valve 12b and water begins flowing through connector 18 and water delivery pipe assembly 15. Further downward travel activates secondary limit switch 60 of vertical position measuring device 50 (FIG. 14) alerting plc 160 that ground support wheels 27 are almost in contact with pivot pad 167. Plc 160 responds to limit switch 60 by switching on fast-speed-solenoid 203 and switching off medium-speed-solenoid 225. Transport wheel legs 20 are raised quickly off of the ground until triggering leg-up limit switch 205 which indicates that the transport wheels 21 have been fully raised off of the ground. In response, plc 160 switches off fast-speed solenoid 203 and also switches off up-solenoid 179.

Figure 4:
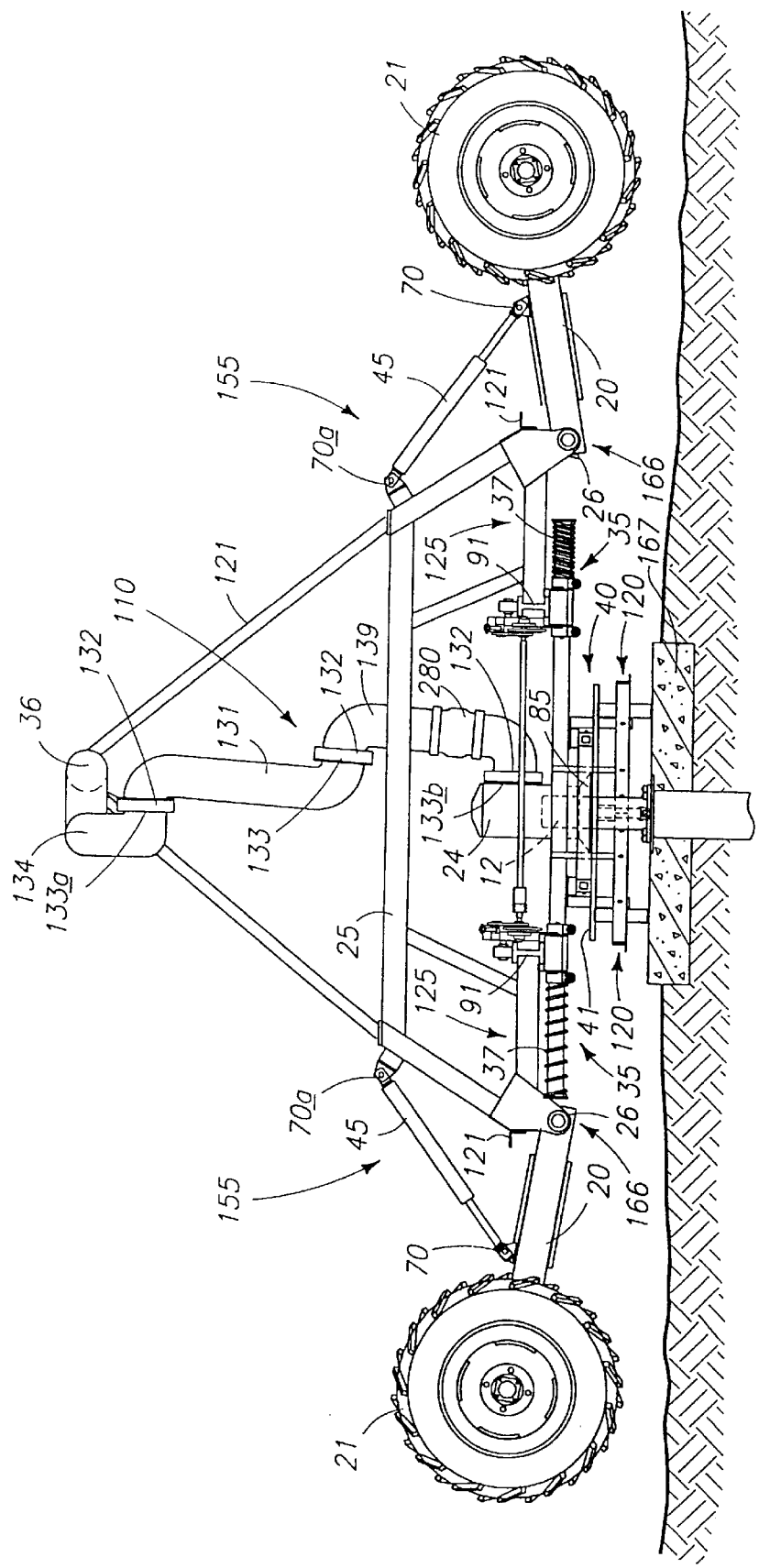
FIG. 4 is a view similar to the end elevation view of FIG. 3 with the valve coupler and swing arm apparatus having been lowered until ground supported by the pivot pad with the transport wheels fully raised off of the ground.

When hydraulic cylinders 45 are completely retracted as shown in FIGS. 4, 4A and 5, support wheels 27 have contacted the ground to support the swing arm outer end. Transport wheels 21 have been lifted off the ground surface and the valve 12b is open. Water flows from opened access valve 12b through the connector 18, through water delivery pipe assembly 15, and subsequently through water applicator 143 and onto the crop. In further response to a signal from leg-up limit switch 205, plc 160 may once again initiate forward travel and subsequent water application by the water delivery pipe assembly 15 by again powering drive motors 152 and 157 in response to input from percentage timer 156.

Figure 17A:
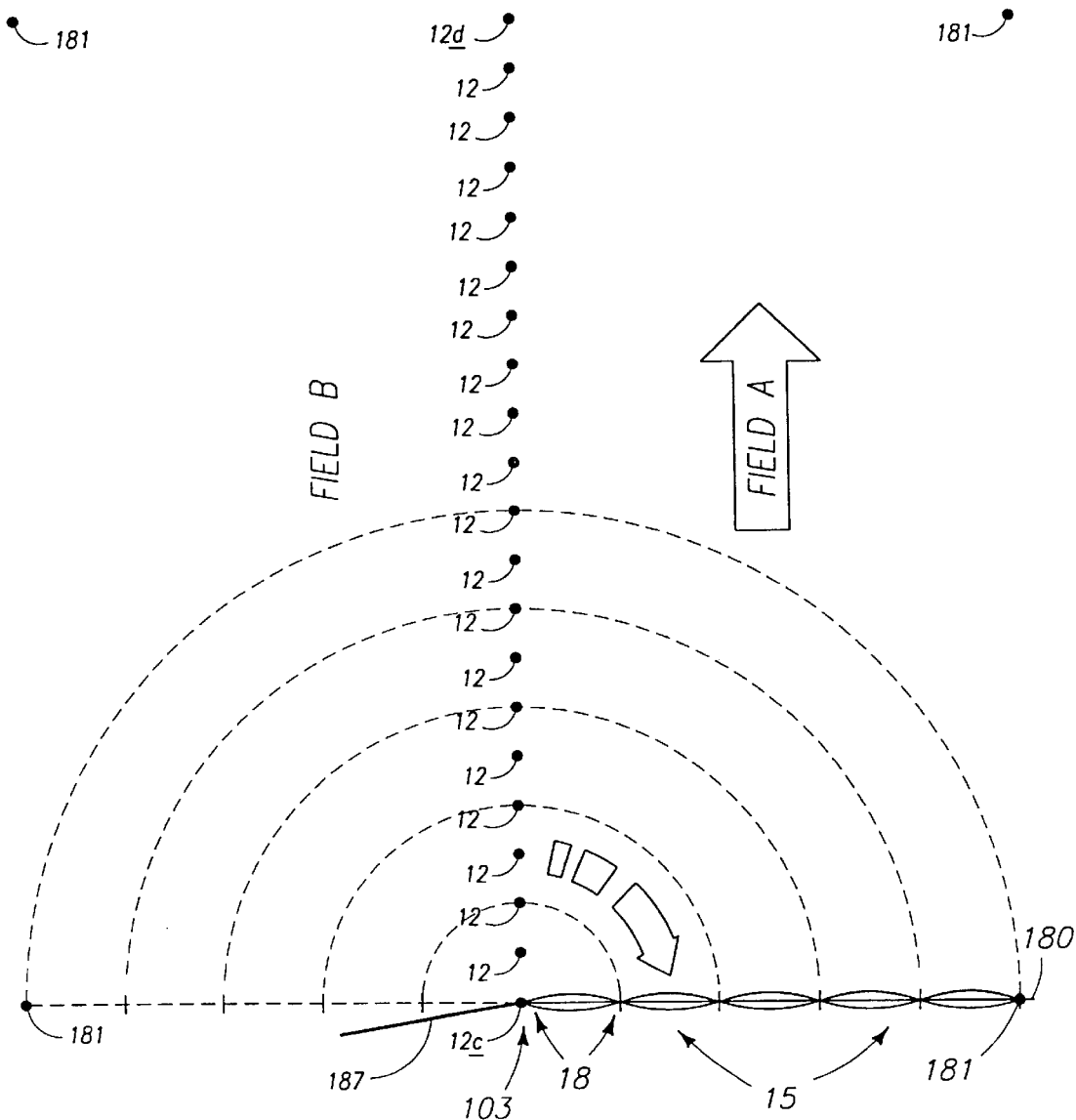
Figure 17B:
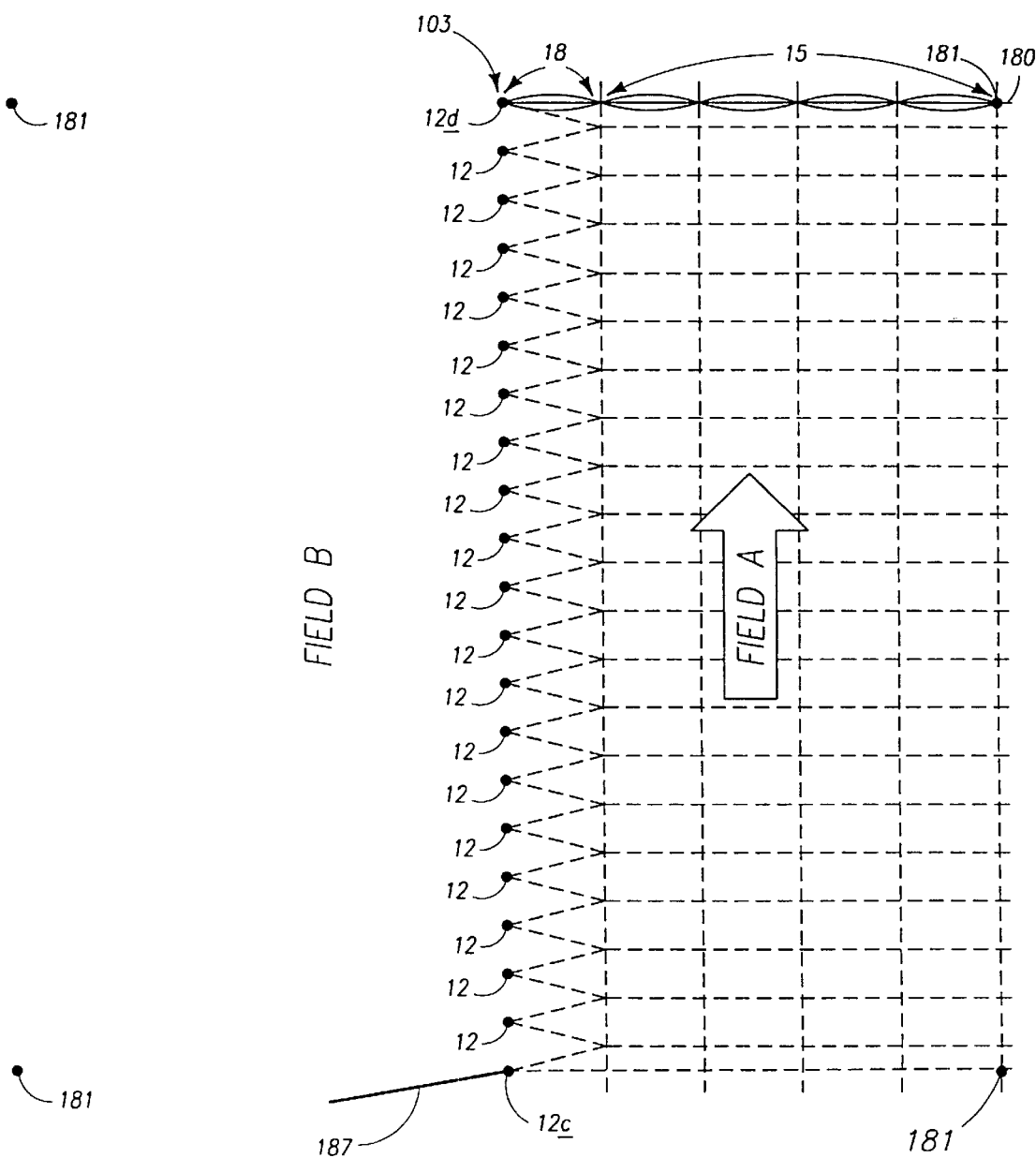
Figure 176:
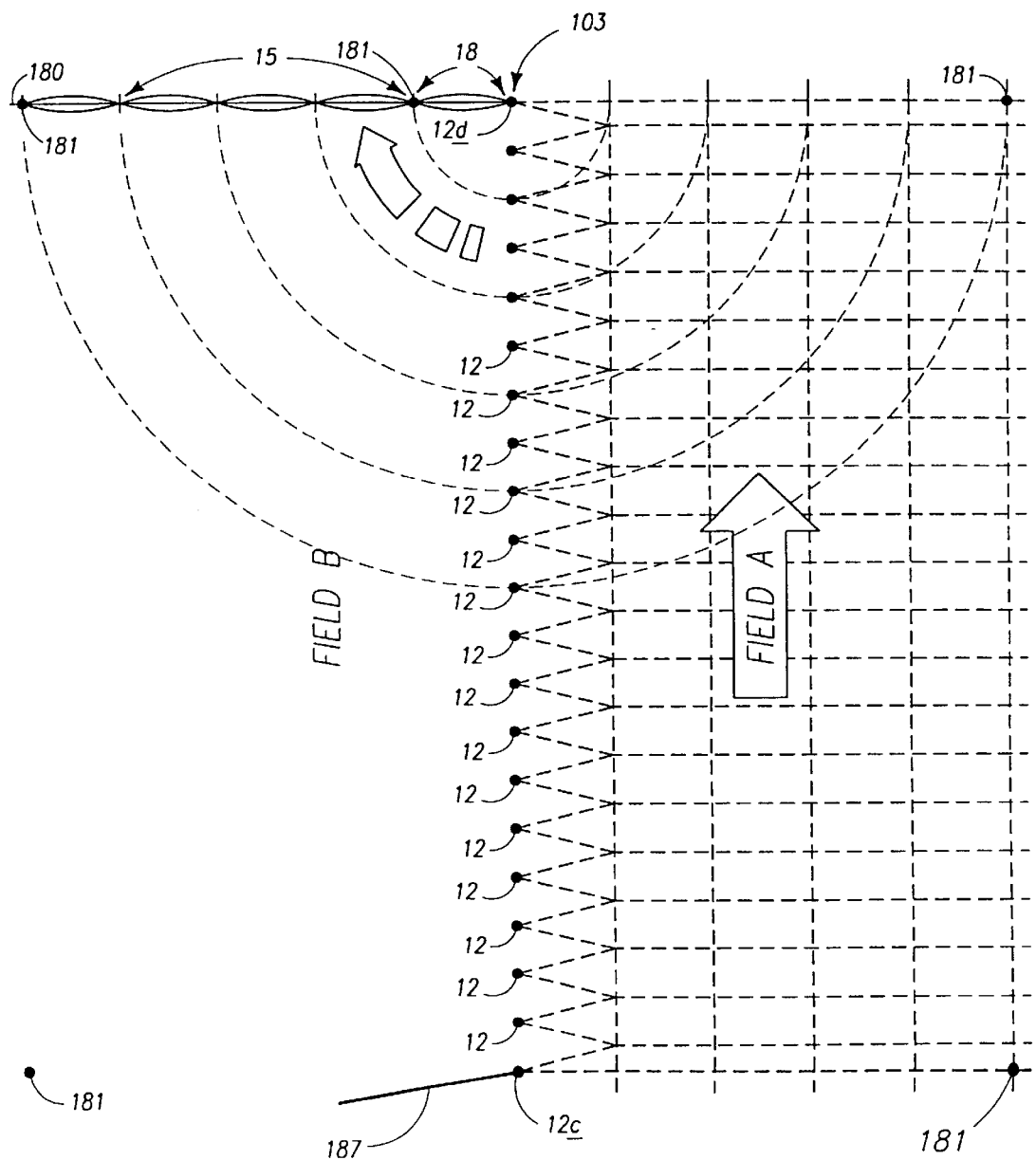

Connector 18 and water delivery pipe assembly 15 have now in effect been controlled to operate for one complete cycle of forward travel. Further forward travel and subsequent application of water will result by repeating the previously described operational procedure. Successive repetitions of the aforementioned operation correlating with each successive connection to an access valve 12 along the water main 11, enables the water delivery pipe assembly 15 to transverse and apply water across a field until connection is made to the last access valve 12d (FIG. 17B). Irrigation from water delivery pipe assembly 15 commences and continues about access valve 12d in the usual manner until a trip bar 180 mounted to cart 14e as shown in FIG. 11, engages a barricade 181 (FIG. 17B) subsequently signaling plc 160 to disregard percentage timer 156 and no longer power drive motors 152 and 157 thus halting forward travel of water delivery pipe assembly 15. (Barricade 181 is positioned in the travel path of the wheels of movable cart 14e so that if drive motor 157 fails to be shut off, the barricade will stop the cart 14e. Trip bar 180 as well as barricade 181 are commonplace to the industry.)

Plc 160 also responds to actuation of trip bar 180 by operating the main water valve 280. Main water valve 280 slowly closes until no water is flowing through connector 18, water delivery pipe assembly 15 and water applicator 143. With main water valve 280 closed, pressure will rise in water main 11 as detected by pressure sensor 186 which then activates a timer 183 (FIG. 18) that acts as a safety device. When connector 18 is being controlled to travel between successive access valves 12 and connector 18 subsequently fails to make connection to a next successive access valve 12 within a specified time, timer 183 will automatically shut off main pump 184. Consequently, a certain length of time after main water valve 280 has been completely closed, main pump 184 will automatically shut down.

The connector 18 and water delivery assembly 15 now remain idle until the farmer decides to initiate rotation of the connector 18 and delivery pipe assembly 15 to the adjacent field on the opposite side of water main 11, Field B.

To rotate connector 18 and delivery pipe assembly 15, the farmer manually latches adjustable trolley hitch 226 to basebeam tongue 231 with pin 227 (FIG. 5). Consequently trolley assembly 39 has been locked to basebeam 123 and trolley assembly 39 will no longer freewheel along rails 91. The farmer now manually prescribes a rotate direction in control panel 310 (FIG. 14), typically reverse, and plc 160 begins operation of the delivery pipe rotator 103. Plc 160 switches drive motor 157 to a full speed reverse setting. Consequently, movable cart 14e begins forward travel in a reverse direction. The remaining carts 14, with the exception of cart 14a, along the water delivery pipe assembly 15 remain longitudinally aligned with the last span 13e during operation of the delivery pipe rotator 103 by utilizing the same conventional means of alignment as utilized for that purpose during operation of the connector 18.

The alignment of supply pipe 36 to span 13a during operation of the delivery pipe rotator 103 is maintained by plc 160 with alignment information provided by angle encoder 190. At the onset of delivery pipe rotator 103, plc 160 reads the position at angle encoder 190, presuming span 13a to be longitudinally aligned to supply pipe 36. Plc 160 then monitors angle encoder 190 during operation of the delivery pipe rotator 103. When the information from angle encoder 190 suggests span 13a and supply pipe 36 to be sufficiently misaligned, plc 160 will switch on drive motor 152 in the appropriate (reverse) direction until supply pipe 36 and span 13a are once again aligned.

Operation of the delivery pipe rotator 103 is continued, until the water delivery pipe assembly 15 and swing arm 16 reach a position as shown in FIG. 17C. There the arm of trip bar 180 engages barricade 181 positioned at the end of the circular travel path of cart 14e. The trip bar 180 signals plc 160 indicating that operation of the delivery pipe rotator 103 may be discontinued. Plc 160 switches off drive motor 157. Subsequently the connector 18 may once again be operated. In order to do so, the farmer removes pin 227 thus releasing the trolley hitch 226 from the basebeam tongue 231, and also switches on forward irrigation in control panel 310 (FIG. 14) and restarts the pump 184.

With additional programing of logic 170, and a motor brake for locking trolley motor 111 from rotating, the transition from water delivery pipe travel to water delivery pipe rotation and back to delivery pipe travel again can be automated.

As shown in FIG. 17C, the delivery pipe rotates in a reverse direction in relation to the previous forward linear travel of the delivery pipe assembly 15. In some cases, it may be advantageous to rotate the water delivery pipe assembly 15 in the forward direction. Consequently, operation of the delivery pipe rotator 103 would result in the water delivery pipe assembly 15 rotating beyond Fields A and B in order to achieve the necessary position to begin operation of the connector 18 and subsequent irrigation.

With the addition of a center pivot sprinkler set 311 as part of water applicator 143 (FIGS. 13 and 14), water delivery pipe assembly 15 is operable to apply water while rotating about an access valve. Water can be applied while rotating delivery pipe 15 in either rotation direction between Fields A and B. Consequently, delivery pipe 15 may be operated to irrigate both as a lateral move irrigator and as a center pivot irrigator. Center pivot sprinkler set 311 includes a set of individual sprinklers 314 as shown in FIG. 13. Sprinklers 314 are mounted along the water delivery pipe 15 and also along underboom 260 and are configured to accommodate the need to linearly increase water output approaching the outer end (remote from access valve 12) of water delivery pipe 15. This configuration of sprinklers 314 of center pivot sprinkler set 311 is typical to center pivot irrigators and thus commonplace to the industry. Sprinkler solenoid valves 313 shown in FIG. 13 are mounted between sprinklers 314 and delivery pipe 15 to allow or restrict water flow through sprinklers 314. The farmer, when initiating the rotation of delivery pipe 15 in control panel 310, also manually initiates irrigation during that rotation. In response to the farmers instruction, plc 160 operates solenoid valves 313 to allow water to flow through sprinklers 314. At the same time, plc 160 operates sprinkler solenoid valves 292 of a lateral move sprinkler set 312 to halt water flow through sprinklers 291. (Sprinklers 291 were in operation during the preceding lateral travel of delivery pipe 15 along the succession of access valves 12.) Plc 160 also operates main water valve 280 to allow water to flow through delivery pipe 15 as required to irrigate during rotation. (Lateral move sprinkler set 312 could be utilized by itself to accommodate both lateral and center pivot irrigation by simply terminating water flow to an increasing number of the sprinklers 291 approaching the inner end of delivery pipe 15 during center pivot irrigation. This approach would be somewhat more affordable in equipment cost. However, the sprinkler configuration would not be tailored specific to center pivot irrigation and water application efficiency during center pivot operation would be less efficient as a result.)

Water delivery pipe assembly 15 may now begin forward travel across Field B. (With the resumption of lateral move irrigation, plc 160 reinstates operation of lateral move sprinkler set 312 and discontinues operation of center pivot sprinkler set 311 providing that sprinkler set 311 was in use during the preceding rotation of delivery pipe 15. Also, if delivery pipe 15 is not equipped with a sprinkler set 311 to incorporate center pivot irrigation, sprinkler set 312 will not require solenoid valves 292 to control water flow through sprinklers 291.) The water delivery pipe assembly 15 travels from the starting position as shown in FIG. 17C until the unit arrives at a position similar to that shown in FIG. 16C. The transporter 22 and valve coupler 19 are now operated by plc 160 in order to forward the connection to the next access valve 12 as shown in FIG. 16D.

Figure 17D:
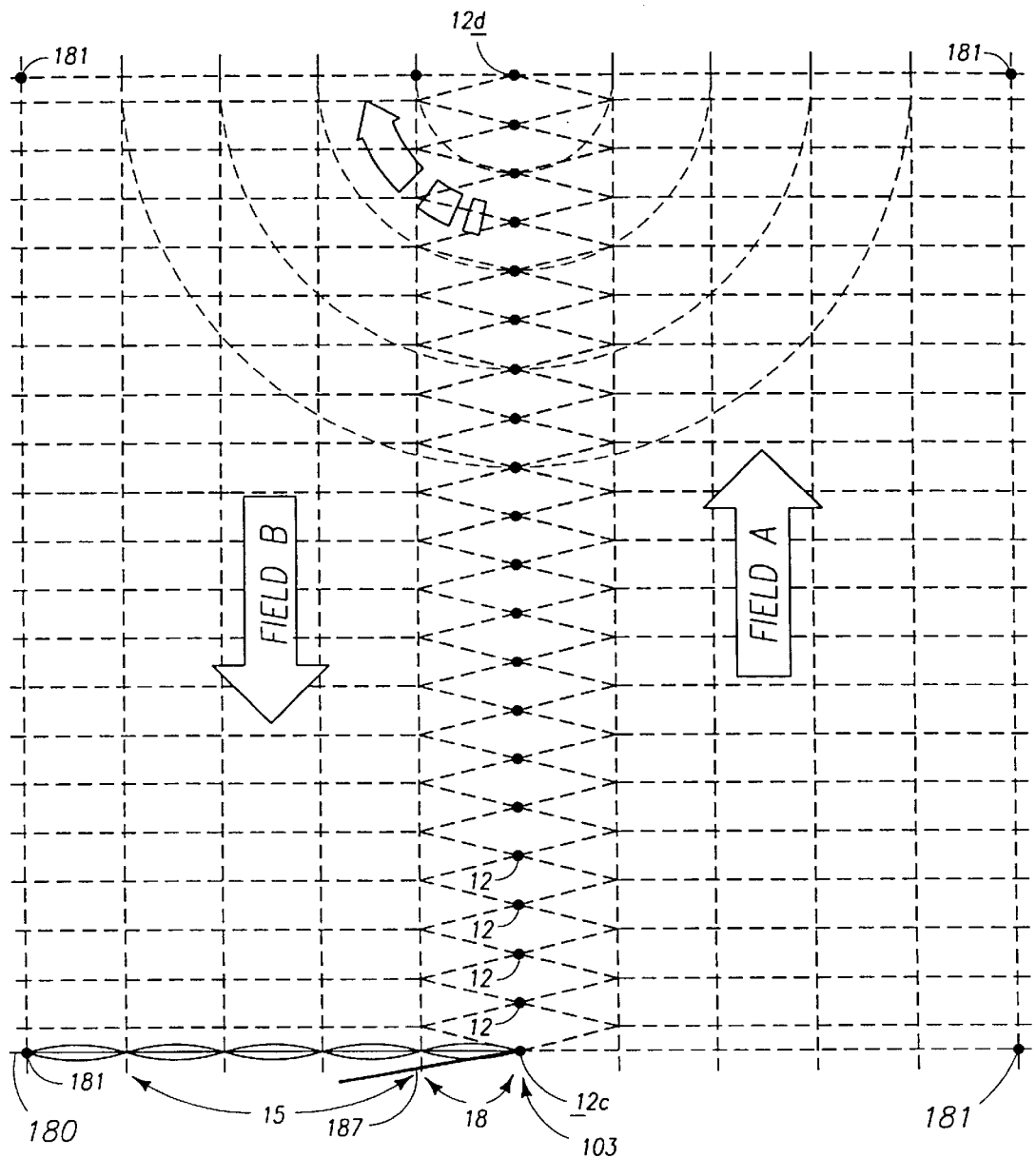

Water delivery pipe assembly 15 travels forward in conjunction with the repetitive operation of the connector 18, each repetition corresponding with each successive disconnection from an access valve 12. Travel transpires from the position at one end of the series of access valves 12 as shown in FIG. 17C to the position at the other end of the series of access valves 12 as shown in FIG. 17D. Once again, an end of field barricade 181 has been placed in the path of travel cart 14e and trip bar 180 engages barricade 181 which sends a signal to plc 160 indicating that the field end has been reached. The last access valve 12 available for connection during the irrigation of Field B is access valve 12c. Access valve 12c was the first access valve 12 to be connected to and opened at the onset of the irrigation process when the water delivery pipe assembly 15 began forward travel to irrigate Field A as shown in the aforementioned position in FIG. 17A.

From the position shown in FIG. 17D, the swing arm 16 and water delivery pipe assembly 15 may be rotated substantially 180 degrees about the connection to access valve 12c to the position shown in FIG. 17A. The delivery pipe rotator 103 is again operated by plc 160 according to the same operational procedure employed for rotating the swing arm 16 and water delivery pipe assembly 15 from the position shown in FIG. 17B to the position shown in FIG. 17C. Operation of delivery pipe rotator 103 is terminated when trip bar 180 engages another appropriately positioned end of field barricade 181. Actuation of trip bar 180 signals plc 160, which in response, discontinues operation of the water delivery pipe rotator 103 and resumes operation of the connector 18.

Both Field A and Field B have now been irrigated and the water delivery pipe assembly 15 is positioned to begin a second irrigation of Field A. The circuitous nature of the path traveled by the water delivery pipe assembly 15 of the present invention presents a distinct advantage over the travel path of suggested automated irrigation approaches including present commercially available approaches with the exception of my earlier patented irrigator (U.S. Pat. No. 4,877,189). Irrigation of a field with present commercially available automated lateral move irrigators leaves the water delivery pipe the full length of the field away from the original starting position. Presently available automated lateral move irrigators must then be rolled dry or while irrigating, backwards across the field.

The distance traveled, and the area covered by the present system of rotating the water delivery pipe assembly between fields and back to the original starting position, is superior to the commercially available approaches.

The most dramatic advantage associated with the present system also emerges from the circuitous nature of the path traveled by the water delivery pipe assembly. Many fields to be irrigated by presently available automated lateral move irrigators may now be irrigated with a water delivery pipe assembly 15 that is only half of the previously required pipe length. In addition, the number of access valves installed for operation of the present system will typically be about three fifths that required with prior commercially available systems.

When the coupler 19 is transported between access valves 12 (FIG. 16D) and when the delivery pipe rotator 103 is operated (FIGS. 17C and 17A), water flow through the water delivery pipe assembly 15 has been discontinued. Typically the pump would remain shut off when the delivery pipe rotator is operated. However, for the short duration of time required to forward access valve connection between two access valves, in many cases it is preferable to keep the pump operating and temporarily continue to flow a minimal amount of water to cool the pump. Typically, only about one percent of the water pumped needs be diverted for cooling purposes.

A preferred approach for diverting water from water main 11 is shown in FIG. 18. A water main diverter valve 185 is hydraulically connected somewhere along the water main 11 preferably near one of its ends. Water main diverter valve 185 is operated to open in response to a signal from a water main pressure sensor 186. Water main pressure sensor 186 monitors the pressure in the water main 11. When water flows through the water delivery pipe assembly 15 has been discontinued, the pressure in water main 11 rises dramatically as the pump continues to operate. Water main pressure sensor 186 detects the obvious pressure rise and responds by signaling the water main diverter valve 185 to open. When the water main diverter valve 185 is opened, water from water main 11 flows into a gravity applicator pipe 187. Gravity applicator pipe 187 may be a common piece of pipe running from the water main diverter valve 185 along the elevationally high side of a comparatively small irregular shaped field in the vicinity of the much larger Fields A and B as shown in FIGS. 17A–17D. Gravity applicator pipe 187 includes spaced outlet holes along its length which allow the intermittently supplied water to flow freely from the holes and into adjacent furrows extending out and downward into the adjacent small field. Utilizing a gravity applicator pipe is common to the gravity fed irrigation systems. Alternately, for many installations, instead of diverting water into a gravity applicator, the water could simply be dumped back down a well or back into the water source such as a river.

For some applications, another alternative is to divert the water into a small reservoir and subsequently pump the water back into the water main (not shown) when water is again flowing into and through the water delivery Pipe assembly 15.

The previously discussed sway inhibitor 130 enables the valve coupler 19 to be transported between valves at a much faster speed. Consequently, the amount of time water flow through water main 11 need be halted is reduced accordingly. As a result, many pumps which previously required flow diversion such as shown in FIG. 18, may now operate for this reduced amount of time without the need for the cooling water provided by flow diversion. Therefore, sway inhibitor 130 eliminates the need for and, thus, eliminates the cost and complexities of flow diversion in many instances.

The present system may also operate along a series of spaced access valves 12 mounted to a water main 11 wherein the water main 11 may elbow at a right angle in order to irrigate an L-shaped field or the water main 11 may elbow more than once incorporating a number of right angles (not shown). The elbows need not be right angles. Water mains other than straight maintain the characteristic of enabling circuitous travel irrigation of the water delivery pipe assembly 15.

For many irrigated lands, the optimum amount of water to be applied will vary in accordance with varying terrain and also varying soil types. For example, in most cases valleys will require less water applied than the adjacent hilltops. Therefore, it is often advantageous to vary the amount of water applied to account for the varying conditions. In addition, a farmer may chose to plant different crops thus with differing water requirements in the same field.

Additional controls may be incorporated with the present invention to selectively vary the amount of water applied about the area to be irrigated during lateral travel of the delivery pipe 15. A controllable sprinkler set 290 (FIGS. 13 and 14) may be employed in conjunction with plc 160 to selectively control the water flow from a set of sprinklers as part of the water applicator 143. Controllable sprinkler set 290 may utilize solenoid valves and sprinklers mostly identical to solenoid valves 292 and sprinklers 291 previously discussed for the operation of sprinkler set-A 312. Solenoid water valves 292 are typically open to water flow and may be closed upon activation of the solenoid by plc 160. Each sprinkler 291 is positioned along water delivery pipe assembly 15 so as to overlap its spray discharge pattern with those of adjacent sprinklers. Six to eight sprinklers may be collectively applying water to any one given spot.

Water flow through the sprinklers 291 may be restricted in a variety of ways. For example, the solenoid valve 292 of every other sprinkler could be closed when positioned over a selected area. Alternately, water flow through every third or every fourth solenoid valve 292 and thus sprinkler 291 may be discontinued and so on. Another option is to modulate the operation of desired sprinlders. In other words, to open and close prescribed solenoid valves 292 for timed periods over the ground specified to receive less water. This option would enable a finer adjustment compared with simply closing said solenoid valves.

Logic 170 is preferably programmable so that plc 160 will keep track of the geographic position of the water delivery pipe assembly 15 by keeping track of each connection to an access valve 12. For example, plc 160 will recognize the beginning of a field such as Field A as shown in FIG. 17D. The first access valve 12 of Field A as well as all access valves 12 will be designated an access valve number as part of an access valve identifier 302. A farmer initiating irrigation of Field A will manually enter the number (which corresponds to the first access valve 12 of Field A) into an access valve number input 135 of a manual programming keypad 240. Keypad 240 may preferably be electrically connected to plc 160. If for some reason the irrigation cycle is to be initiated somewhere other than at a field end, the number corresponding to the access valve 12 presently connected to connector 18 and subsequently water delivery pipe assembly 15 will be entered into the access valve number input 135 of manual programming keypad 240 by the farmer.

Plc 160 may recognize the beginning of Field B in the same way with the farmer entering the access valve number into the access valve number input 135. Once an access valve number has been supplied to the access valve number input 135, plc 160 may then utilize an access valve counter 301 which is also part of access valve identifier 302. Access valve counter 301 incorporates programming in logic 170 enabling plc 160 to recognize and subsequently count each successive connection by connector 18 to an access valve 12 along the succession of access valves 12 of water main 11. Utilizing the access valve number input 135 in combination with the access valve counter 301, plc 160 may keep track of the general geographic position of water delivery pipe assembly 15.

Alternately, the access valve identifier 302 may incorporate a bar code or some other identifying mark on each access valve, thus enabling plc 160 to determine the particular unique identity of that access valve and in that way keep track of the general geographic position of water delivery pipe assembly 15. With this approach the farmer is not required to make an entry into the access valve number input 135. This approach in effect replaces the combined workings of the access valve number input 135 and the access valve counter 301.

Plc 160 may further accurately track the geographic position of water delivery pipe assembly 15 by utilizing information available from the previously discussed swing arm length measuring device 208 as part of delivery pipe navigator 210. The information from swing arm length measuring device 208 may be utilized by plc 160 in the operation of an inter access valve measuring device 303.

Inter access valve measuring device 303 serves to measure the travel of the water delivery pipe assembly 15 after connection has been made to an access valve 12 and subsequently after that particular access valve 12 has been counted. As previously discussed, the exact geographic position of cart 14a may be derived when the water delivery pipe assembly 15 is positioned as illustrated in FIGS. 16A and 20A and also when positioned as shown in FIGS. 16B and 20B. The distance of cart 14a from the water main 11 and thus from the "Preferred Travel Path" will vary within plus or minus approximately 12 inches and is not a significant concern. The position of cart 14a and thus water delivery pipe assembly 15 along the length of the "Preferred Travel Path" is the significant measurement for the purpose of selectively varying water application. Given a distance of 102 feet between access valves, the exact position of cart 14a is known by plc 160 roughly every 51 feet. When the delivery pipe assembly 15 travels the approximate 51 feet from the position shown in FIGS. 16A and 20A to the position shown in FIGS. 16B and 20B, the trolley assembly 39 travels from a position at the outer end of rails 91 (FIG. 4A about 20 feet along rails 91 to a position at the inner end of rails 91 (FIG. 5A). When the water delivery pipe assembly 15 travels the 51 feet between the position shown in FIGS. 16B and 20B to the position of FIGS. 16D and 20A, the trolley assembly 39 travels about 20 feet along rails 91 from the inner end of rails 91 back to the outer end of rails 91. Plc 160 may utilize the swing arm length measuring device 208 and subsequently monitor trolley encoder 115 as the trolley assembly 39 travels along the rails 91 between the two positions where exact coordinates are known. Plc 160 will convert the travel of the trolley assembly into an approximation of the travel of cart 14a and thus of the water delivery pipe assembly 15. This approximation of the travel of delivery pipe assembly 15 is added to the previous position where exact coordinates were determined and consequently at any given moment, the position of water delivery pipe assembly 15 may be estimated by plc 160. Consequently, the geographic position of water delivery pipe assembly 15 along the "Preferred Travel Path" may be tracked by plc 160 with an accuracy within inches of the exact position.

Manual programming keypad 240 may also be utilized to enable the farmer to manually program in the sprinklers positioned along the length of the water delivery pipe assembly 15. Each sprinkler is preferably designated a sprinkler number. Manual programming keypad 240 further enables the farmer to program sprinkler operation as the water delivery pipe assembly 15 travel across a field. The farmer may program certain solenoid water valves 292 to be closed when sprinklers 291 associated with those valves are located above areas that have previously received an excess amount of irrigation water such as valley areas as discussed. Plc 160 will catalog the number of the sprinkler as entered by the farmer as well as the exact geographic position of water delivery pipe assembly 15 at each position where the farmer programs a change in sprinkler operation. The farmer may also program different settings for percentage timer 156 in conjunction with any location of water delivery pipe assembly 15. During operation, plc 160 serves to implement the individual percentage timer settings and also the variations in sprinkler operation as programmed by the farmer.

These implementations correspond to plc 160 counting and thus keeping track of the appropriate access valves as well as tracking the exact geographic position of the water delivery pipe assembly 15 by monitoring the position of the trolley assembly 39 along rails 91.

Figure 21A:
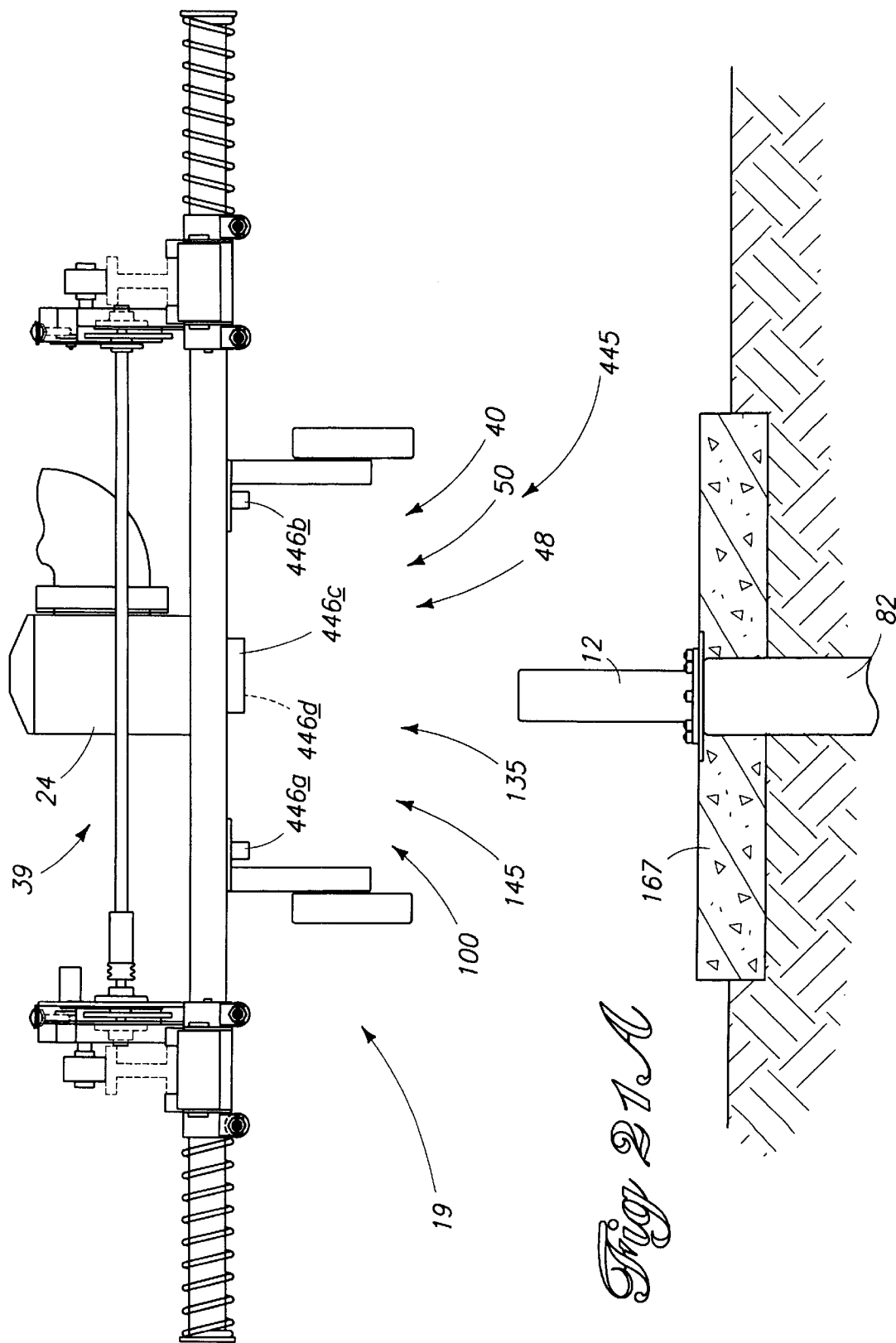
FIG. 21A is an end elevation of a trolley assembly with an access valve electronic detector.
Figure 21B:
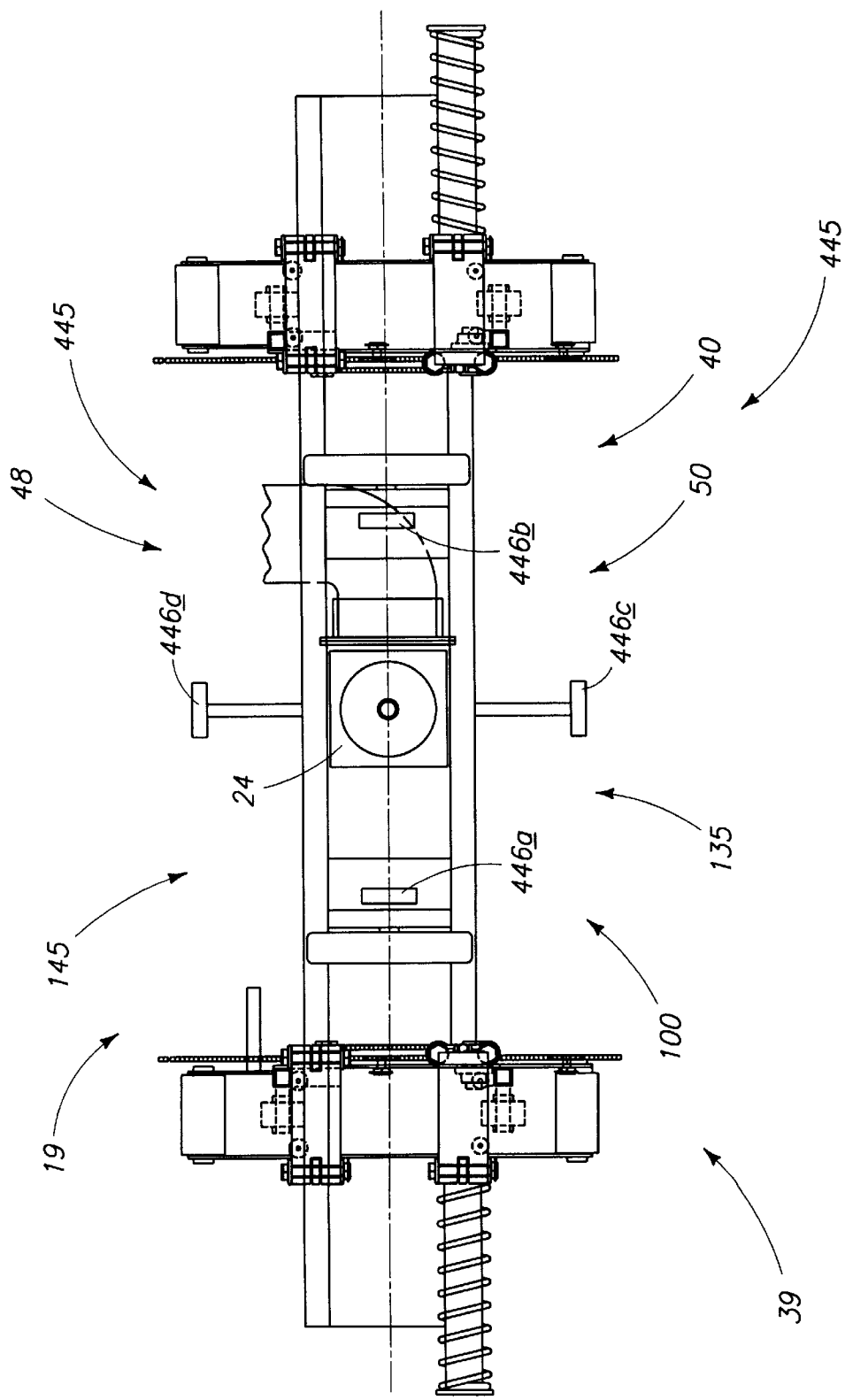
FIG. 21B is a bottom plan view of the apparatus shown in FIG. 21A.

An access valve electronic detector 445, illustrated in FIGS. 14, 21A and 21B, can be employed by the present invention as part of valve coupler 19. Access valve electronic detector 445 can be employed to function as any or all of: access valve locator 48, access valve detector 40, access valve catcher 135, horizontal position measuring device 145, valve coupler aligner 100 and vertical position measuring device 50.

In the example embodiment shown in FIGS. 21A and 21B, access valve electronic detector 445 provides to function as all of the suggested components: locator 48, detector 40, device 145, catcher 135, aligner 100 and measuring device 50. Access valve electronic detector 445 as shown includes four metal sensors 446a through 446d. (Detector 445 can alternately employ sensors which sense other than metal such as plastic, concrete etc. Also, a triangular arrangement of three sensors, or some other number and arrangement of sensors can be employed.) Sensors 446a through 446d are directionally aimed to electronically sense the presence of valve material beneath them. (For this example, access valve 12 is constructed of steel which is sensed). Each of sensors 446a through 446d is electrically connected to programmable logic controller 160 and each provides plc 160 with signal information regarding an access valve 12. The strength of the signal from each sensor 446a through 446d correlates to the proximity of each sensor to an access valve 12. The stronger the signal, the closer the access valve 12.

In accordance with programming, plc 160 provides analysis of the signal information from sensors 446a through 446d and responds when appropriate. As transporter 22 transports swing arm 16 with coupler 19 from one access valve 12 to the next forward access valve 12, the presence of the next forward access valve 12 causes one (or more) of the sensors 446a through 446d to provide a signal to plc 160. Plc 160 recognizes this signal as a detection of the access valve 12 and, thus, access valve electronic detector 445 here provides the functions of both access valve locator 48 and access valve detector 40. (For this example of electronic detector 445, in anticipation of the next forward access valve 12, the positioning of trolley 39 along rails 91 is modified from that shown in FIG. 1A. Trolley 39 is for this employment now positioned much closer to end beam 196 such that the coupler body 24 is positioned to reside approximately directly above the access valve 12 when the swing arm 16 with coupler body 24 is transported over the access valve 12.)

After detection of the access valve 12, plc 160 continues monitoring the information from sensors 446a through 446d to now align the access valve 12 with valve coupler body 24. When the signal strengths from sensors 446a and 446b indicate that the next forward access valve 12 is approximately centered between them, plc 160 responds by halting the forward travel of transporter 22. As such, electronic detector 445 has provided to function as valve catcher 135 by "catching" the valve 12. Through determining that access valve 12 is approximately centered between sensors 446a and 446b, electronic detector 445 here also has provided the function of horizontal position measuring device 145 which is to determine an orientation between an access valve 12 and valve coupler 19. Plc 160 now evaluates the signal strengths from sensors 446c and 446d and responds by controlling the powering of trolley 39 along rails 91 as needed (FIG. 1a) to move coupler body 24 inward or outward to center coupler body 24 over the access valve 12. As such, again electronic detector 445 has provided the function of valve catcher 135. Upon determining that the proper centering of coupler body 24 over access valve 12 has been achieved, electronic detector 445 again has provided the function of horizontal position measuring device 145.

After "catching" the access valve 12 and after determining that the access valve 12 has been caught, access valve electronic detector 445 now provides the function of aligner 100. Plc 160 implements the lowering of coupler body 24 onto the access valve 12 while continuing to monitor the information from sensors 446a through 446d. In response to the information, plc 160 employs the travel of trolley 39 and the travel of coupler adjuster 35 and/or transporter 22 as needed to maintain coupler body 24 centered over the access valve 12 until body 24 is locked onto valve 12. As such, the function of aligner 100 is provided.

Also after catching the access valve 12 and determining that the access valve 12 has been caught, electronic detector 445 now provides the function of vertical position measuring device 50. Upon plc 160 initiating the lowering of coupler body 24 onto valve 12, plc 160 monitors the information from sensors 446a through 446d to determine the proximity of coupler body 24 to access valve 12. (Valve 12, including flange 79, and flange 80 are all fabricated out of steel, the steel sensed by sensors 446a through 44d.) Plc 160 evaluates the increasing signal strengths from all of the sensors 446a through 446d. When the signal strengths reach a first determined level, plc 160 responses as if the primary limitswitch 59 has been activated (primary limitswitch 59 previously discussed, FIG. 14). When the signal strengths reach a second determined level, plc 160 responses as if the secondary limitswitch 60 has been activated (secondary limitswitch 60 previously discussed, FIG. 14). In other words, the determined signal strength level equates to the coupler body being positioned above the valve 12 where the limitswitch 59 or limitswitch 60 would previously have engaged. Accordingly, electronic detector 445, functioning as vertical position measuring device 50, takes the place of limitswitch 59, limitswitch 60 and the associated mechanical mechanism.

In the above example embodiment, electronic detector 445 was described configured to sense an access valve 12. Electronic detector 445 can alternately be configured to sense any part of an access valve assembly 400. An example of assembly 400 is shown in FIG. 10. Assembly 400 of FIG. 10 includes access valve 12, riser pipe 82, flange 80 and pivot pad 167. Electronic detector 445 can be configured to sense any or all of these components or the materials they are fabricated from.

As another example, access valve assembly 400 includes other components or materials such as a metal object or objects, a magnet or magnets or other, these buried in the concrete of pivot pad 167. Electronic detector 445 is then configured to sense them. As another example, access valve assembly 400 includes components or materials such as a metal object or objects, a magnet or magnets or other, these located outward of pivot pad 167 relative to the associated access valve 12 and in the near vacinity of pivot pad 167 such that the wheels 21 (FIG. 1A) of transporter 22 roll to the outside of them relative to the associated access valve 12. Electronic detector 445 is then configured to sense the components or materials. In accordance with the above examples, access valve assembly 400 is defined to include an access valve 12 and any other component or material positioned such that transport wheels 21 roll to the outside of the component or material relative to the access valve 12.

The mechanical valve catcher 135 discussed earlier and shown in FIGS. 1A, 2A, 7, 8 and 9 acts against a side surface of an access valve 12. The mechanical catcher 135 can alternately be configured to act against any component or material or facet of the above defined access valve assembly 400, with the exception of the top rim of access valve 12.

An access valve assembly 400 can be described as a beacon 410 (FIG. 10). Beacon 410 provides as a reference object to be sensed by electronic detector 445. Accordingly, electronic detector 445 references beacon 410 in providing the functions of locator 48, detector 40, catcher 135, measuring device 145, aligner 100 and measuring device 50. Beacon 410 can be other than access valve assembly 400 as well. Beacon 410 can be a component or material placed such that transport wheels 21 roll over the component or material. Beacon 410 can also be any component or material placed such that transport wheels 21 roll to the inside of the component or material relative to the access valve 12. Detector 445 can be configured to sense beacon 410 and provide a one dimensional alignment, a two dimensional alignment or a three dimensional alignment between coupler body 24 and access valve 12. Detector 445 can be configured to sense beacon 410 and determine a one dimensional, a two dimensional or a three dimensional orientation between body 24 and valve 12. Beacon 410 is defined to include any component or material capable of being sensed by electronic detector 445.

In compliance with the statute, the invention has been described in language more or less specific as to structural features. It is to be understood, however, that the invention is not limited to the specific features shown, since the construction herein disclosed comprises a preferred form of putting the invention into effect. The invention is, therefore, claimed in any of its forms or modifications within the proper scope of the appended claims, appropriately interpreted in accordance with the doctrine of equivalents.

The embodiments of the invention in which an exclusive property or priveledge is claimed are defined as follows:

1. An apparatus to connect a movable irrigation water delivery pipe to a succession of water main access valves comprising:

a connector attached to the delivery pipe and configured to selectively connect the delivery pipe to the individual access valves;

wherein the connector comprises:

a swing arm mounted to the water delivery pipe;

a swing arm length adjuster mounted to the swing arm; and a sway inhibitor mounted to at least one of the swing arm or the swing arm length adjuster and configured to provide rigidity to at least one of the swing arm or the swing arm length adjuster.

2. The apparatus as defined by claim 1 wherein the swing arm length adjuster further comprises a trolley, one or more rails movably mounted by the trolley and a trolley drive mounted to the trolley configured to move the trolley along the rails.

3. An apparatus to connect a movable irrigation water delivery pipe to a succession of water main access valves comprising:

a connector attached to the delivery pipe and configured to selectively connect the delivery pipe to the individual access valves;

wherein the connector comprises:

a swing arm mounted to the delivery pipe;

a valve coupler mounted to the swing arm; and wherein the valve coupler comprises a valve coupler adjuster configured to allow travel of the valve coupler relative to the swing arm in a direction substantially perpendicular to the length of the swing arm.

4. An apparatus as defined by claim 3 wherein the valve coupler further comprises a valve catcher configured to directionally align the coupler with an access valve.

5. An apparatus as defined by claim 4 wherein the valve coupler further comprises an aligner and the valve catcher is configured to directionally align the aligner with the access valve.

6. An apparatus to connect a movable irrigation water delivery pipe to a succession of water main access valve assemblies comprising:

a connector attached to the delivery pipe and configured to selectively connect the delivery pipe to the individual access valve assemblies; and wherein the connector comprises a vertical position measuring device configured to determine achievement of an orientation between the connector and at least one of the access valve assemblies.

7. An apparatus as defined by claim 6 wherein an access valve assembly comprises an access valve and wherein the vertical position measuring device is further configured to determine achievement of an orientation between the connector and at least one access valve.

8. An apparatus as defined by claim 6 wherein an access valve assembly is defined by a top side and wherein the vertical position measuring device is further configured to determine achievement of an orientation between the connector and the top side.

9. An apparatus as defined by claim 6 wherein an access valve assembly comprises a pivot pad and wherein the vertical position measuring device is further configured to determine achievement of an orientation between the connector and the pivot pad.

10. An apparatus as defined by claim 6 wherein the vertical position measuring device is further configured to electronically sense at least one of the access valve assemblies.

11. An apparatus to connect a movable irrigation water delivery pipe to a succession of water main access valve assemblies comprising:

a connector attached to the delivery pipe and configured to selectively connect the delivery pipe to the individual access valve assemblies;

wherein the connector comprises:

a swing arm mounted to the delivery pipe, a valve coupler mounted to the swing arm; and wherein the valve coupler comprises an access valve detector configured to reference at least one of the access valve assemblies to detect at least one of the access valve assemblies.

12. An apparatus as defined by claim 11 wherein an access valve assembly is defined by a top side and wherein the access valve detector is further configured to reference the top side.

13. An apparatus as defined by claim 11 wherein the access valve detector is further configured to electronically sense at least one of the access valve assemblies.

14. An apparatus to connect a movable irrigation water delivery pipe to a succession of water main access valves comprising:

a connector attached to the delivery pipe and configured to selectively connect the delivery pipe to the individual access valves;

wherein the connector comprises:

a swing arm mounted to the water delivery pipe;

a swing arm length adjuster mounted to the swing arm;

a transporter mounted to at least one of the swing arm or the swing arm length adjuster and configured to transport the connector between access valves; and wherein the transporter is disposed between the delivery pipe and at least one of the access valves.

15. An apparatus as defined by claim 14 wherein the swing arm length adjuster is defined by at least one end and wherein the swing arm length adjuster comprises a rail overhang at the one end.

16. An apparatus to connect a movable irrigation water delivery pipe to a succession of water main access valves comprising:

a connector attached to the delivery pipe and configured to selectively connect the delivery pipe to the individual access valves; and wherein the connector comprises a transporter configured to ground support and move the connector and wherein the transporter comprises two transport wheels and wherein the transporter is further configured to independently raise and lower the two transport wheels.

17. An apparatus as defined by claim 16 wherein the transporter is further configured to pivot each wheel about a pivot point.

18. The apparatus as defined by claim 16 wherein the transporter is further configured to power each wheel with a hydraulic motor and wherein the hydraulic motors are connected in a parallel hydraulic circuit.

19. An apparatus to connect a movable irrigation water delivery pipe to a succession of water main access valves comprising:

a connector attached to the delivery pipe and configured to selectively connect the delivery pipe to the individual access valves;

wherein the connector comprises:

a valve coupler;

a swing arm mounted to the delivery pipe;

a swing arm length adjuster mounted to the swing arm and configured to movably support the valve coupler; and a swing pipe configured to hydraulically link the valve coupler with the swing arm.

20. An apparatus as defined by claim 19 wherein the swing pipe is further configured to move in a substantially vertical plane.

21. An apparatus as defined by claim 19 wherein the swing pipe is further configured to reside predominately toward the delivery pipe relative to the valve coupler.

22. An apparatus to connect a movable irrigation water delivery pipe to a succession of water main access valve assemblies comprising:

a connector attached to the delivery pipe and configured to selectively connect the delivery pipe to the individual access valves;

wherein the connector comprises:

a swing arm mounted to the water delivery pipe;

a valve coupler mounted to the swing arm; and wherein the valve coupler comprises a valve catcher configured to at least one of: act against a surface, other than a top edge, of at least one of the access valve assemblies to align the valve coupler with the at least one of the access valve assemblies; or, electronically sense at least one of the access valve assemblies to align the valve coupler with the at least one of the access valve assemblies.

23. An apparatus as defined by claim 22 wherein the valve catcher is further configured to align the valve coupler with at least one of the access valve assemblies along at least one of an axis substantially transverse to the length of the swing arm or an axis substantially parallel to the length of the swing arm.

24. An apparatus as defined by claim 22 wherein the valve catcher is further configured to align the valve coupler with at least one of the access valve assemblies in two dimensions.

25. An apparatus as defined by claim 22 wherein the valve coupler is movable relative to the swing arm in a direction away from the delivery pipe along an axis substantially parallel to the length of the swing arm.

26. An apparatus to connect a movable irrigation water delivery pipe to a succession of water main access valve assemblies comprising:
    a connector attached to the delivery pipe and configured to selectively connect the delivery pipe to the individual access valves;
    wherein the connector comprises:
        a swing arm mounted to the water delivery pipe;
        a valve coupler mounted to the swing arm; and
        wherein the valve coupler comprises a valve catcher configured to align the valve coupler to at least one of the access valve assemblies in two dimensions.

27. An apparatus as defined by claim 26 wherein the valve catcher is further configured to align the valve coupler with at least one of the access valve assemblies along at least one of an axis substantially transverse to the length of the swing arm or an axis substantially parallel to the length of the swing arm.

28. An apparatus as defined by claim 26 wherein the valve coupler is movable relative to the wing arm in a direction away from the delivery pipe along an axis substantially parallel to the length of the swing arm.

29. An apparatus to connect a movable irrigation water delivery pipe to a succession of water main access valve assemblies comprising:
    a connector attached to the delivery pipe and configured to selectively connect the delivery pipe to the individual access valve assemblies;
    wherein the connector comprises:
        a swing arm mounted to the water delivery pipe;
        a valve coupler mounted to the swing arm; and
        wherein the valve coupler comprises a horizontal position measuring device configured to reference at least one of the access valve assemblies to determine achievement of an orientation between the valve coupler and at least one of the access valve assemblies.

30. An apparatus as defined by claim 29 wherein the horizontal position measuring device is further configured to determine achievement of an orientation between the valve coupler and at least one of the access valve assemblies along at least one of an axis substantially transverse to the length of the swing arm or an axis substantially parallel to the length of the swing arm.

31. An apparatus as defined by claim 30 herein the horizontal position measuring device is further configured to determine achievement of an orientation in at least two dimensions between the valve coupler and at least one of the access valve assemblies.

32. An apparatus as defined by claim 30 wherein the horizontal position measuring device is further configured to electronically detect at least one of the access valve assemblies.

33. An apparatus to connect a movable irrigation water delivery pipe to a succession of water main access valve assemblies comprising:
    a connector attached to the delivery pipe and configured to selectively connect the delivery pipe to the individual access valve assemblies;
    wherein the connector comprises:
        a swing arm mounted to the water delivery pipe;
        a valve coupler mounted to the swing arm; and
        wherein the valve coupler comprises an electronic detector configured to reference a beacon to at least one of: align the valve coupler with at least one of the access valve assemblies; or, determine achievement of an orientation between the valve coupler and at least one of the access valve assemblies.

34. An apparatus as defined by claim 33 wherein at least one of the access valve assemblies comprises the beacon.

35. An apparatus as defined by claim 33 wherein the electronic detector is further configured to at least one of: provide a two dimensional alignment between the valve coupler and at least one of the access valve assemblies; or, determine achievement of a two dimensional orientation between the valve coupler and at least one of the access valve assemblies.

36. An apparatus for use with an irrigation water delivery pipe and a connector attached to one end of the delivery pipe, the connector configured to selectively connect the delivery pipe along a succession of water main access valves; the apparatus comprising:
    a sprinkler boom defined by one end with the end in fluid communication with the water delivery pipe such that the boom length extends outward of the delivery pipe and substantially toward the succession of access valves.

37. An apparatus as defined by claim 36 wherein the boom is configured to pass at least partially underneath the connector.

38. An apparatus as defined by claim 36 wherein the end is pivotably mountable to the delivery pipe.

39. An apparatus as defined by claim 36 wherein the boom is configured to pivot in a substantially vertical plane.

40. An apparatus as defined by claim 36 wherein the boom is configured to pass a controlled proximity to the underneath of the connector.

41. An irrigation system configured to operate along a succession of access valve assemblies and to operate about a pivot point, the irrigation system comprising:
    an irrigation water delivery pipe;
    a connector attached to the delivery pipe and configured to selectively connect the delivery pipe to the individual access valve assemblies;
    a lateral move sprinkler set located along the delivery pipe and configured to apply water during operation of the delivery pipe along the succession of access valve assemblies, and
    a center pivot sprinkler set located along the delivery pipe and configured to apply water during operation of the delivery pipe about the pivot point.

42. An irrigation system as defined by claim 41 wherein the pivot point comprises an access valve assembly.

43. A system to geographically position an irrigation water delivery pipe adjacent to a succession of water main access valve assemblies which are disposed along a first axis, the system comprising:
    a straight line determiner configured to determine a distance between the water delivery pipe and a second axis parallel to the first axis;

a travel direction determiner configured to determine a travel direction of the delivery pipe; and a delivery pipe navigator configured to use the determined distance and the determined travel direction to position the water delivery pipe.

44. The system as defined by claim 43 wherein the straight line determiner is further configured to determine a distance between the delivery pipe and at least one of the access valve assemblies.

45. The system as defined by claim 43 wherein the straight line determiner comprises a swing arm length measuring device.

46. The system as defined by claim 43 wherein the travel direction determiner comprises at least one of a swing arm length measuring device or a pivot angle measuring device.

47. The system as defined by claim 43 wherein the delivery pipe navigator is further configured to position the delivery pipe when the delivery pipe resides substantially at a closest distance to an access valve assembly.

48. The system as defined by claim 43 wherein the system further comprises a connector configured to selectively connect the delivery pipe to the individual access valve assemblies and the delivery pipe navigator is further configured to position the delivery pipe substantially upon connection of the connector to an individual access valve assembly.

49. An apparatus to geographically position an irrigation water delivery pipe, the apparatus comprising:

a connector attached to the delivery pipe and configured to selectively connect the delivery pipe along a succession of individual access valve assemblies;

wherein the connector comprises:

a swing arm mounted to the delivery pipe;

a valve coupler mounted to the swing arm and configured to connect to at least one of the individual access valve assemblies;

a straight line determiner configured to determine a distance between the delivery pipe and at least one of the individual access valve assemblies;

a delivery pipe navigator configured to use the determined distance to directionally position the water delivery pipe.

50. The apparatus as defined by claim 49 wherein the straight line determiner is further configured to determine a distance between the delivery pipe and the valve coupler when the valve coupler is connected to the at least one of the individual access valves.

51. The apparatus as defined by claim 49 wherein the apparatus further comprises a travel direction determiner configured to determine a travel direction of the delivery pipe and the delivery pipe navigator is further configured to use the determined travel direction.

52. The apparatus as defined by claim 51 wherein the travel direction determiner includes at least one of a swing arm length measuring device or a pivot angle measuring device.

53. The apparatus as defined by claim 49 wherein the delivery pipe navigator is further configured to directionally position the delivery pipe when the delivery pipe resides substantially at a closest distance to at least one of the access valve assemblies.

54. The apparatus as defined by claim 49 wherein the delivery pipe navigator is further configured to directionally position the delivery pipe substantially upon connection of the valve coupler to the at least one of the access valve assemblies.

55. A method of supplying water to an irrigation water delivery pipe adapted to travel adjacent to a succession of access valves, comprising the step of:

forwarding along the succession of access valves, a valve coupler mounted to a swing arm and configured to connect to at least one of the access valves, the swing arm mounted to the delivery pipe; and whereby the step of forwarding a valve coupler includes:

employing a swing arm length adjuster to accommodate a variable distance between the delivery pipe and the valve coupler when the valve coupler is engaged to the at least one of the access valves and the delivery pipe travels;

inhibiting sway in at least one of the swing arm or the swing arm length adjuster.

56. A method of supplying water to an irrigation water delivery pipe adapted to travel adjacent to a succession of water main access valve assemblies, comprising the step of:

forwarding along the succession of access valve assemblies, a valve coupler mounted to a swing arm and configured to connect to at least one of the access valve assemblies, the swing arm mounted to the delivery pipe; and whereby the step of forwarding a valve coupler includes:

aligning the valve coupler to at least one of the access valve assemblies by at least one of: acting against a surface, other than a top edge, of the at least one of the access valve assemblies; or, electronically sensing at least one of the access valve assemblies.

57. A method of irrigating farmland employing a movable irrigation water delivery pipe and a connector attached to the delivery pipe, the connector configured to selectively connect the delivery pipe to a succession of water main access valve assemblies, comprising the steps of:

applying water from the irrigation water delivery pipe;

applying water from a sprinkler boom defined by one end with the end in fluid communication with the water delivery pipe such that the boom length extends outward of the delivery pipe and substantially toward the succession of access valves.

58. The method of claim 57 wherein the step of applying water from a sprinkler boom includes passing the sprinkler boom at least partially underneath the connector.

59. The method of claim 58 wherein the step of applying water from a sprinkler boom includes controlling the proximity of the boom to an underneath side of the connector.

60. The method of claim 58 wherein the step of applying water from a sprinkler boom includes passing the sprinkler boom a controlled proximity underneath the connector.

61. A method of irrigating farmland employing a movable irrigation water delivery pipe and a connector attached to the delivery pipe, the connector configured to selectively connect the delivery pipe to a succession of water main access valve assemblies, comprising the steps of:

applying water from the delivery pipe when connected to an access valve assembly;

pivoting the delivery pipe about a pivot point while applying water from the delivery pipe.

62. The method of claim 61 wherein the step of pivoting the delivery pipe includes pivoting the delivery pipe about at least one of the access valve assemblies.

63. A method of geographically positioning an irrigation water delivery pipe, the delivery pipe adapted to travel adjacent to a succession of water main access valve assemblies which are disposed along a first axis, comprising the steps of:

determining the distance between the delivery pipe and a second axis substantially parallel to the first axis;

determining the travel direction of the delivery pipe;

positioning the delivery pipe employing the determined distance and determined travel direction.

64. The method of claim 63 wherein the step of determining the distance includes measuring a distance between the delivery pipe and at least one of the access valve assemblies.

65. The method of claim 63 wherein the step of determining the travel direction includes at least one of measuring a distance between the delivery pipe and at least one of the access valve assemblies or measuring an angular alignment between the delivery pipe and a swing arm mounted to the delivery pipe.

66. The method of claim 63 wherein the step of positioning the delivery pipe includes adjusting the travel direction of the delivery pipe when the delivery pipe is substantially at a closest distance to at least one of the access valve assemblies.

67. The method of claim 66 wherein the step of positioning the delivery pipe includes adjusting the travel direction of the delivery pipe substantially upon connection of a connector with at least one of the access valve assemblies, the connector attached to the delivery pipe.

68. A method of geographically positioning an irrigation water delivery pipe, the delivery pipe mounted by a swing arm with a valve coupler mounted to the swing arm, the valve coupler configured to selectively connect the delivery pipe to at least one access valve assembly of a succesion of access valve assemblies, comprising the steps of:

connecting the valve coupler to at least one of the access valve assemblies;

determining a distance between the delivery pipe and the connected-to access valve assembly a plurality of times;

positioning the delivery pipe employing the determined distance.

69. The method of claim 68 further comprising the additional step of determining the travel direction of the delivery pipe and wherein the step of positioning the delivery pipe further comprises employing the determined travel direction.

70. The method of claim 69 wherein the step of determining the travel direction includes at least one of measuring the distance between the delivery pipe and the at least one access valve assembly or measuring an angular alignment between the delivery pipe and the swing arm.

71. The method of claim 68 wherein the step of positioning the delivery pipe further comprises adjusting the travel direction of the delivery pipe when the delivery pipe is substantially at a closest distance to the at least one access valve assembly.

72. The method of claim 68 wherein the step of positioning the delivery pipe further comprises adjusting the travel direction of the delivery pipe substantially upon the connecting of the valve coupler to the at least one access valve assembly.

* * * * *